US009659188B2

(12) United States Patent
Cohen et al.

(10) Patent No.: US 9,659,188 B2
(45) Date of Patent: *May 23, 2017

(54) OBFUSCATING IDENTITY OF A SOURCE ENTITY AFFILIATED WITH A COMMUNIQUÉ DIRECTED TO A RECEIVING USER AND IN ACCORDANCE WITH CONDITIONAL DIRECTIVE PROVIDED BY THE RECEIVING USE

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William H. Mangione-Smith, Kirkland, WA (US); John D. Rinaldo, Jr., Bellevue, WA (US); Clarence T. Tegreene, Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 618 days.

This patent is subject to a terminal disclaimer.

(21) Appl. No.: 12/802,863

(22) Filed: Jun. 14, 2010

(65) Prior Publication Data
US 2011/0041061 A1 Feb. 17, 2011

Related U.S. Application Data

(63) Continuation-in-part of application No. 12/228,664, filed on Aug. 14, 2008, now abandoned, and a
(Continued)

(51) Int. Cl.
*G06F 21/62* (2013.01)
*G06Q 10/10* (2012.01)
*H04L 29/06* (2006.01)

(52) U.S. Cl.
CPC ....... *G06F 21/6263* (2013.01); *G06Q 10/107* (2013.01); *G06F 2221/2105* (2013.01); *G06F 2221/2111* (2013.01); *H04L 63/0861* (2013.01)

(58) Field of Classification Search
CPC . H04L 12/585; H04L 12/5865; H04L 12/588; H04L 51/12; H04L 63/0227;
(Continued)

(56) References Cited

U.S. PATENT DOCUMENTS 3,985,972 A   10/1976   Rolin et al.
4,218,738 A   8/1980   Matyas et al.
(Continued)

FOREIGN PATENT DOCUMENTS

CN   1688150 A   10/2005
CN   101184264 A   5/2008
(Continued)

OTHER PUBLICATIONS

"Sometimes, I just don't want them to know it's me calling . . . "; spoofcard.com; pp. 1-2; located at: http://www.spoofcard.com/; printed on Jul. 8, 2010.
(Continued)

*Primary Examiner* — Dung B Huynh

(57) ABSTRACT

A computationally implemented method includes, but is not limited to: receiving one or more conditional directives from a receiving user, the one or more conditional directives delineating one or more conditions for obfuscating identity of a source entity affiliated with one or more communiqués directed to the receiving user; and presenting at least a second communiqué in response to at least a reception of a first communiqué affiliated with the source entity and in accordance with the one or more conditional directives, the second communiqué being presented in lieu of presenting the first communiqué. In addition to the foregoing, other
(Continued)

method aspects are described in the claims, drawings, and text forming a part of the present disclosure.

31 Claims, 19 Drawing Sheets

Related U.S. Application Data continuation-in-part of application No. 12/228,873, filed on Aug. 15, 2008, now abandoned, and a continuation-in-part of application No. 12/287,268, filed on Oct. 7, 2008, now Pat. No. 8,224,907, and a continuation-in-part of application No. 12/454,113, filed on May 12, 2009, now abandoned, and a continuation-in-part of application No. 12/779,794, filed on Apr. 29, 2010, now abandoned, and a continuation-in-part of application No. 12/802,139, filed on May 27, 2010, and a continuation-in-part of application No. 12/802,136, filed on May 28, 2010.

(58) Field of Classification Search
CPC . H04L 63/102; H04L 63/0428; H04L 63/044; H04L 69/24; H04L 2209/60; H04L 2209/805; H04L 2463/101; H04L 9/321; H04L 9/3271; G06F 21/10; G06F 21/32; G06F 21/30; G06F 21/60; G06F 21/62; G06F 2221/2107; G06F 2221/2149; H04W 12/02; H04W 12/06; H04W 12/08; H04W 12/12; H04W 4/12; H04W 24/00
See application file for complete search history.

(56) References Cited

U.S. PATENT DOCUMENTS

| | | | |
|---|---|---|---|
| 5,493,692 A * | 2/1996 | Theimer et al. | 455/26.1 |
| 5,508,699 A | 4/1996 | Silverman | |
| 5,732,138 A | 3/1998 | Noll et al. | |
| 5,751,806 A | 5/1998 | Ryan | |
| 5,790,074 A | 8/1998 | Rangedahl et al. | |
| 5,812,639 A | 9/1998 | Bartholomew et al. | |
| 5,835,856 A | 11/1998 | Patel | |
| 5,933,498 A | 8/1999 | Schneck et al. | |
| 5,978,940 A | 11/1999 | Newman et al. | |
| 5,987,633 A | 11/1999 | Newman et al. | |
| 6,005,926 A | 12/1999 | Mashinsky | |
| 6,026,291 A | 2/2000 | Carlsson et al. | |
| 6,199,102 B1 | 3/2001 | Cobb | |
| 6,224,109 B1 | 5/2001 | Yang | |
| 6,351,745 B1 | 2/2002 | Itakura et al. | |
| 6,396,531 B1 * | 5/2002 | Gerszberg et al. | 348/14.01 |
| 6,493,696 B1 | 12/2002 | Chazin | |
| 6,496,931 B1 | 12/2002 | Rajchel et al. | |
| 6,510,236 B1 | 1/2003 | Crane et al. | |
| 6,522,889 B1 | 2/2003 | Aarnio | |
| 6,529,592 B1 | 3/2003 | Khan | |
| 6,563,913 B1 | 5/2003 | Kaghazian | |
| 6,571,279 B1 | 5/2003 | Herz et al. | |
| 6,591,291 B1 | 7/2003 | Gabber et al. | |
| 6,738,808 B1 | 5/2004 | Zellner et al. | |
| 6,816,885 B1 | 11/2004 | Raghunandan | |
| 6,857,021 B1 | 2/2005 | Schuster et al. | |
| 6,917,610 B1 | 7/2005 | Kung et al. | |
| 6,918,039 B1 * | 7/2005 | Hind et al. | 726/3 |
| 6,937,730 B1 | 8/2005 | Buxton | |
| 6,985,569 B2 | 1/2006 | Baker | |
| 6,990,590 B2 | 1/2006 | Hanson et al. | |
| 7,007,025 B1 | 2/2006 | Nason et al. | |
| 7,133,837 B1 | 11/2006 | Barnes, Jr. | |
| 7,159,011 B1 | 1/2007 | Knight et al. | |
| 7,203,315 B1 | 4/2007 | Livesay | |
| 7,225,342 B2 | 5/2007 | Takao et al. | |
| 7,248,885 B2 | 7/2007 | Benco et al. | |
| 7,275,090 B2 | 9/2007 | Oeda et al. | |
| 7,278,023 B1 | 10/2007 | Siegel et al. | |
| 7,308,251 B2 | 12/2007 | Karaoguz | |
| 7,310,816 B1 | 12/2007 | Burns et al. | |
| 7,327,312 B1 | 2/2008 | Harris | |
| 7,334,267 B2 | 2/2008 | Engstrom | |
| 7,363,024 B2 | 4/2008 | Jenkins | |
| 7,382,881 B2 | 6/2008 | Uusitalo et al. | |
| 7,389,541 B2 | 6/2008 | Jia et al. | |
| 7,400,878 B2 | 7/2008 | Hassan et al. | |
| 7,401,159 B1 | 7/2008 | Aviani et al. | |
| 7,458,095 B2 | 11/2008 | Forsberg | |
| 7,555,769 B1 * | 6/2009 | Shapiro | G06F 21/604 715/700 |
| 7,567,936 B1 | 7/2009 | Peckover et al. | |
| 7,587,480 B2 | 9/2009 | Gebhart et al. | |
| 7,614,081 B2 | 11/2009 | Prohel et al. | |
| 7,616,943 B2 | 11/2009 | Oesterling | |
| 7,623,639 B2 | 11/2009 | Thai et al. | |
| 7,627,334 B2 | 12/2009 | Cohen et al. | |
| 7,630,495 B2 | 12/2009 | Kiiveri et al. | |
| 7,634,295 B2 | 12/2009 | Hayaashi et al. | |
| 7,643,484 B2 | 1/2010 | Willman et al. | |
| 7,724,918 B2 | 5/2010 | Balakrishnan et al. | |
| 7,783,741 B2 | 8/2010 | Hardt | |
| 7,787,870 B2 | 8/2010 | Burgan et al. | |
| 7,797,024 B2 | 9/2010 | Sutardja | |
| 7,814,017 B2 | 10/2010 | Vancini et al. | |
| 7,827,245 B2 * | 11/2010 | Cohen | G06F 21/84 370/467 |
| 7,920,050 B2 | 4/2011 | Juels et al. | |
| 7,921,052 B2 | 4/2011 | Dabney et al. | |
| 7,940,302 B2 | 5/2011 | Mehrotra et al. | |
| 7,966,664 B2 | 6/2011 | Makkinejad | |
| 8,140,062 B1 | 3/2012 | Hildner et al. | |
| 8,190,126 B1 * | 5/2012 | Whitney | H04M 19/04 380/229 |
| 8,190,128 B1 | 5/2012 | Lundy et al. | |
| 8,626,848 B2 * | 1/2014 | Cohen et al. | 709/206 |
| 8,730,836 B2 | 5/2014 | Cohen et al. | |
| 8,850,044 B2 * | 9/2014 | Cohen et al. | 709/229 |
| 2001/0023432 A1 | 9/2001 | Council et al. | |
| 2001/0031631 A1 | 10/2001 | Pitts | |
| 2001/0034677 A1 | 10/2001 | Farhat et al. | |
| 2001/0034723 A1 | 10/2001 | Subramaniam | |
| 2001/0036822 A1 | 11/2001 | Mead et al. | |
| 2001/0047391 A1 * | 11/2001 | Szutu | 709/206 |
| 2002/0044067 A1 | 4/2002 | Ilcisin | |
| 2002/0069077 A1 | 6/2002 | Brophy et al. | |
| 2002/0077078 A1 | 6/2002 | Antti | |
| 2002/0077897 A1 | 6/2002 | Zellner et al. | |
| 2002/0081972 A1 | 6/2002 | Rankin | |
| 2002/0099822 A1 | 7/2002 | Rubin et al. | |
| 2002/0101997 A1 | 8/2002 | Curtis et al. | |
| 2002/0102523 A1 | 8/2002 | Pelletier | |
| 2002/0111845 A1 | 8/2002 | Chong | |
| 2002/0111954 A1 | 8/2002 | McCoy | |
| 2002/0143869 A1 | 10/2002 | Cohen | |
| 2002/0154055 A1 | 10/2002 | Davis et al. | |
| 2002/0163572 A1 | 11/2002 | Center, Jr. et al. | |
| 2002/0169664 A1 | 11/2002 | Walker et al. | |
| 2002/0169840 A1 | 11/2002 | Sheldon et al. | |
| 2002/0174073 A1 | 11/2002 | Nordman et al. | |
| 2002/0174363 A1 | 11/2002 | Chefalas et al. | |
| 2002/0177449 A1 | 11/2002 | McDonnell et al. | |
| 2002/0188562 A1 | 12/2002 | Igarashi et al. | |
| 2002/0198777 A1 | 12/2002 | Yuasa | |
| 2003/0008672 A1 | 1/2003 | Fujii | |
| 2003/0009593 A1 | 1/2003 | Apte | |
| 2003/0009687 A1 * | 1/2003 | Ferchau | G06F 21/57 726/22 |
| 2003/0014286 A1 | 1/2003 | Cappellini | |
| 2003/0014637 A1 | 1/2003 | Ellison et al. | |
| 2003/0021413 A1 | 1/2003 | Kiiveri et al. | |
| 2003/0040326 A1 | 2/2003 | Levy et al. | |
| 2003/0044050 A1 | 3/2003 | Clark et al. | |
| 2003/0086543 A1 | 5/2003 | Raymond | |
| 2003/0134645 A1 | 7/2003 | Stern et al. | |
| 2003/0145039 A1 | 7/2003 | Bonney et al. | |

(56) References Cited

U.S. PATENT DOCUMENTS

| | | |
|---|---|---|
| 2003/0149881 A1 | 8/2003 | Patel et al. |
| 2003/0154254 A1 | 8/2003 | Awasthi |
| 2003/0158960 A1 | 8/2003 | Engberg |
| 2003/0177357 A1 | 9/2003 | Chamberlin et al. |
| 2003/0217118 A1 | 11/2003 | Kobayashi et al. |
| 2003/0217151 A1 | 11/2003 | Roese et al. |
| 2003/0217287 A1 | 11/2003 | Kruglenko |
| 2003/0220978 A1 | 11/2003 | Rhodes |
| 2003/0224754 A1 | 12/2003 | Herzog |
| 2003/0227386 A1 | 12/2003 | Pulkkinen et al. |
| 2003/0233329 A1 | 12/2003 | Laraki et al. |
| 2003/0236095 A1 | 12/2003 | Ross |
| 2004/0015553 A1* | 1/2004 | Griffin ............... H04L 12/1827 709/206 |
| 2004/0030932 A1 | 2/2004 | Juels et al. |
| 2004/0064692 A1 | 4/2004 | Kahn et al. |
| 2004/0064734 A1 | 4/2004 | Ehrlich |
| 2004/0083166 A1 | 4/2004 | Pailles |
| 2004/0111625 A1 | 6/2004 | Duffy et al. |
| 2004/0128301 A1 | 7/2004 | Thint et al. |
| 2004/0139204 A1 | 7/2004 | Ergezinger et al. |
| 2004/0162821 A1* | 8/2004 | Buckwalter et al. ............ 707/3 |
| 2004/0162904 A1* | 8/2004 | Eida et al. .................... 709/228 |
| 2004/0165702 A1 | 8/2004 | Finnigan |
| 2004/0177122 A1 | 9/2004 | Appelman et al. |
| 2004/0177280 A1* | 9/2004 | Maruyama et al. .......... 713/202 |
| 2004/0178880 A1 | 9/2004 | Meyer et al. |
| 2004/0181683 A1 | 9/2004 | Jia et al. |
| 2004/0203776 A1 | 10/2004 | Jun |
| 2004/0236838 A1* | 11/2004 | Tout ............... 709/207 |
| 2004/0248588 A1 | 12/2004 | Pell et al. |
| 2004/0254998 A1 | 12/2004 | Horvitz |
| 2004/0255127 A1 | 12/2004 | Arnouse |
| 2004/0266398 A1 | 12/2004 | Adamczyk et al. |
| 2005/0004871 A1 | 1/2005 | Dort |
| 2005/0008135 A1 | 1/2005 | Bressler |
| 2005/0014485 A1* | 1/2005 | Kokkonen et al. .......... 455/411 |
| 2005/0021826 A1 | 1/2005 | Kumar |
| 2005/0027618 A1 | 2/2005 | Zucker et al. |
| 2005/0027839 A1* | 2/2005 | Day et al. ..................... 709/223 |
| 2005/0031106 A1 | 2/2005 | Henderson |
| 2005/0044423 A1 | 2/2005 | Mellmer et al. |
| 2005/0048951 A1 | 3/2005 | Saito |
| 2005/0063544 A1 | 3/2005 | Uusitalo et al. |
| 2005/0075096 A1 | 4/2005 | Aljuraid |
| 2005/0084100 A1 | 4/2005 | Spies et al. |
| 2005/0091393 A1 | 4/2005 | Gleeson et al. |
| 2005/0091543 A1 | 4/2005 | Holtzman et al. |
| 2005/0097337 A1* | 5/2005 | Sesek ............... H04L 63/0428 713/186 |
| 2005/0100140 A1 | 5/2005 | Tsai |
| 2005/0114343 A1 | 5/2005 | Wesinger, Jr. et al. |
| 2005/0136903 A1 | 6/2005 | Kashima et al. |
| 2005/0172120 A1 | 8/2005 | Wang et al. |
| 2005/0192056 A1 | 9/2005 | Karaki |
| 2005/0198131 A1 | 9/2005 | Appelman et al. |
| 2005/0198171 A1* | 9/2005 | Landsman et al. .......... 709/206 |
| 2005/0204005 A1* | 9/2005 | Purcell ............... G06Q 10/107 709/206 |
| 2005/0204008 A1 | 9/2005 | Shinbrood |
| 2005/0204037 A1 | 9/2005 | Levy |
| 2005/0226468 A1* | 10/2005 | Deshpande et al. ......... 382/115 |
| 2005/0227705 A1 | 10/2005 | Rousu et al. |
| 2005/0232423 A1 | 10/2005 | Horvitz et al. |
| 2005/0246419 A1 | 11/2005 | Jaatinen |
| 2005/0275543 A1 | 12/2005 | Hisano |
| 2006/0005023 A1 | 1/2006 | Homer et al. |
| 2006/0026438 A1 | 2/2006 | Stern et al. |
| 2006/0031301 A1 | 2/2006 | Herz et al. |
| 2006/0031369 A1 | 2/2006 | Caron et al. |
| 2006/0034441 A1* | 2/2006 | Kraft ............... 379/142.01 |
| 2006/0041507 A1 | 2/2006 | Novack et al. |
| 2006/0052095 A1 | 3/2006 | Vazvan |
| 2006/0075037 A1* | 4/2006 | Rothschild .............. 709/206 |
| 2006/0075051 A1 | 4/2006 | Jain et al. |
| 2006/0079238 A1 | 4/2006 | Liu et al. |
| 2006/0099967 A1 | 5/2006 | Colvin et al. |
| 2006/0109983 A1* | 5/2006 | Young et al. ................ 380/252 |
| 2006/0116142 A1 | 6/2006 | Cofta |
| 2006/0123245 A1 | 6/2006 | Avidan et al. |
| 2006/0148400 A1 | 7/2006 | Farrow |
| 2006/0152374 A1 | 7/2006 | Singer et al. |
| 2006/0167991 A1 | 7/2006 | Heikes et al. |
| 2006/0168059 A1 | 7/2006 | Chang et al. |
| 2006/0173957 A1 | 8/2006 | Robinson et al. |
| 2006/0176821 A1 | 8/2006 | Hemesath et al. |
| 2006/0199575 A1 | 9/2006 | Moore et al. |
| 2006/0227955 A1 | 10/2006 | Thai et al. |
| 2006/0237531 A1* | 10/2006 | Heffez et al. ................ 235/382 |
| 2006/0248011 A1 | 11/2006 | Hecht-Nielsen et al. |
| 2006/0256959 A1 | 11/2006 | Hymes |
| 2006/0274896 A1* | 12/2006 | Livesay ...................... 380/255 |
| 2006/0276175 A1* | 12/2006 | Chandran ............ H04M 1/66 455/411 |
| 2006/0276226 A1 | 12/2006 | Jiang |
| 2007/0022165 A1* | 1/2007 | Daniels et al. .............. 709/206 |
| 2007/0024527 A1 | 2/2007 | Heikkinen et al. |
| 2007/0030824 A1 | 2/2007 | Ribaudo et al. |
| 2007/0032225 A1 | 2/2007 | Konicek et al. |
| 2007/0036314 A1 | 2/2007 | Kloberdans et al. |
| 2007/0074046 A1 | 3/2007 | Czajkowski et al. |
| 2007/0074590 A1 | 4/2007 | Smith |
| 2007/0118874 A1* | 5/2007 | Adams ............... H04L 12/5855 726/1 |
| 2007/0127658 A1 | 6/2007 | Gruchala et al. |
| 2007/0130323 A1 | 6/2007 | Landsman et al. |
| 2007/0140145 A1 | 6/2007 | Kumar et al. |
| 2007/0164102 A1 | 7/2007 | Haertel |
| 2007/0168430 A1 | 7/2007 | Brun et al. |
| 2007/0180122 A1 | 8/2007 | Barrett |
| 2007/0198639 A1 | 8/2007 | Litwin et al. |
| 2007/0203644 A1 | 8/2007 | Thota et al. |
| 2007/0204026 A1 | 8/2007 | Berger |
| 2007/0208816 A1 | 9/2007 | Baldwin et al. |
| 2007/0208947 A1 | 9/2007 | Sudo et al. |
| 2007/0220273 A1* | 9/2007 | Campisi ............ G06K 9/00006 713/186 |
| 2007/0242827 A1 | 10/2007 | Prafullchandra et al. |
| 2007/0243880 A1 | 10/2007 | Gits et al. |
| 2007/0245263 A1 | 10/2007 | Hale et al. |
| 2007/0250571 A1 | 10/2007 | Griffin, Jr. |
| 2007/0250641 A1 | 10/2007 | Flannery et al. |
| 2007/0250920 A1* | 10/2007 | Lindsay ............... G06F 21/31 726/7 |
| 2007/0255704 A1 | 11/2007 | Baek et al. |
| 2007/0264974 A1* | 11/2007 | Frank et al. ................. 455/411 |
| 2007/0277235 A1 | 11/2007 | Barrett et al. |
| 2007/0282791 A1* | 12/2007 | Amzalag ............ G06Q 10/10 |
| 2007/0293202 A1 | 12/2007 | Moshir et al. |
| 2007/0294096 A1 | 12/2007 | Randall et al. |
| 2007/0297641 A1 | 12/2007 | Criddle et al. |
| 2008/0005325 A1 | 1/2008 | Wynn et al. |
| 2008/0010665 A1 | 1/2008 | Hinton et al. |
| 2008/0021962 A1* | 1/2008 | Ryan et al. .................. 709/206 |
| 2008/0037040 A1 | 2/2008 | Hashimoto et al. |
| 2008/0056468 A1 | 3/2008 | Fredlund et al. |
| 2008/0071544 A1 | 3/2008 | Beaufays et al. |
| 2008/0077431 A1* | 3/2008 | Calder ............... G06Q 10/06 705/2 |
| 2008/0086646 A1 | 4/2008 | Pizano |
| 2008/0107274 A1 | 5/2008 | Worthy |
| 2008/0108324 A1 | 5/2008 | Moshir et al. |
| 2008/0118150 A1 | 5/2008 | Balakrishnan et al. |
| 2008/0130630 A1 | 6/2008 | Shim et al. |
| 2008/0132255 A1 | 6/2008 | Benco et al. |
| 2008/0140769 A1* | 6/2008 | Matoba ..................... 709/203 |
| 2008/0146157 A1 | 6/2008 | Aaron |
| 2008/0147849 A1* | 6/2008 | Bruker ............... H04L 41/044 709/224 |
| 2008/0154697 A1 | 6/2008 | Guday et al. |
| 2008/0163365 A1 | 7/2008 | Austin et al. |
| 2008/0169903 A1 | 7/2008 | Fein et al. |
| 2008/0194290 A1 | 8/2008 | Lebert et al. |
| 2008/0196098 A1 | 8/2008 | Cottrell et al. |

(56) References Cited

U.S. PATENT DOCUMENTS

| | | |
|---|---|---|
| 2008/0207329 A1 | 8/2008 | Wallace et al. |
| 2008/0235336 A1 | 9/2008 | Stern et al. |
| 2008/0242265 A1 | 10/2008 | Cohen et al. |
| 2008/0247543 A1 | 10/2008 | Mick et al. |
| 2008/0248815 A1 | 10/2008 | Busch |
| 2008/0250129 A1 | 10/2008 | Carpenter et al. |
| 2008/0254817 A1 | 10/2008 | Tornkvist |
| 2008/0267099 A1 | 10/2008 | Curcio et al. |
| 2008/0274694 A1 | 11/2008 | Castell et al. |
| 2008/0282344 A1 | 11/2008 | Shuster |
| 2008/0294556 A1 | 11/2008 | Anderson |
| 2008/0294726 A1 | 11/2008 | Sidman |
| 2008/0300859 A1 | 12/2008 | Chen et al. |
| 2008/0306972 A1 | 12/2008 | Wilkin et al. |
| 2008/0318598 A1 | 12/2008 | Fry |
| 2009/0005072 A1 | 1/2009 | Forstall et al. |
| 2009/0006565 A1 | 1/2009 | Velusamy et al. |
| 2009/0081989 A1 | 3/2009 | Wuhrer |
| 2009/0083826 A1 | 3/2009 | Baribault |
| 2009/0099701 A1 | 4/2009 | Li et al. |
| 2009/0109037 A1 | 4/2009 | Farmer |
| 2009/0113005 A1 | 4/2009 | Gregg et al. |
| 2009/0131022 A1 | 5/2009 | Buckley et al. |
| 2009/0132419 A1 | 5/2009 | Grammer et al. |
| 2009/0158054 A1 | 6/2009 | Dijk et al. |
| 2009/0170532 A1 | 7/2009 | Lee et al. |
| 2009/0183215 A1 | 7/2009 | McCartie et al. |
| 2009/0195445 A1 | 8/2009 | DeHaas |
| 2009/0204580 A1 | 8/2009 | Seamon et al. |
| 2009/0215469 A1 | 8/2009 | Fisher et al. |
| 2009/0224970 A1* | 9/2009 | Tsau .................... 342/357.09 |
| 2009/0227268 A1 | 9/2009 | Sorensson et al. |
| 2009/0232288 A1 | 9/2009 | Forbes et al. |
| 2009/0234764 A1 | 9/2009 | Friesen |
| 2009/0248844 A1 | 10/2009 | Sommer et al. |
| 2009/0262987 A1* | 10/2009 | Ioffe et al. .................... 382/118 |
| 2009/0265326 A1* | 10/2009 | Lehrman et al. ............. 707/4 |
| 2009/0275363 A1 | 11/2009 | McGregor et al. |
| 2009/0298474 A1* | 12/2009 | George .................... 455/412.2 |
| 2009/0300774 A1* | 12/2009 | Makkinejad ......... G06F 21/629 726/27 |
| 2009/0307087 A1 | 12/2009 | Haas |
| 2009/0318112 A1 | 12/2009 | Vasten |
| 2009/0319172 A1 | 12/2009 | Almeida et al. |
| 2010/0009657 A1* | 1/2010 | Dingler et al. ............. 455/411 |
| 2010/0015991 A1 | 1/2010 | Evans et al. |
| 2010/0024042 A1 | 1/2010 | Motahari et al. |
| 2010/0042583 A1 | 2/2010 | Gervais et al. |
| 2010/0042685 A1 | 2/2010 | Yanovski et al. |
| 2010/0053169 A1 | 3/2010 | Cook |
| 2010/0071035 A1 | 3/2010 | Budko et al. |
| 2010/0146583 A1* | 6/2010 | Prehofer et al. .................. 726/1 |
| 2010/0174911 A1* | 7/2010 | Isshiki .................... G06F 21/31 713/182 |
| 2010/0183125 A1 | 7/2010 | Hayes, Jr. et al. |
| 2010/0205541 A1 | 8/2010 | Rapaport et al. |
| 2010/0257222 A1 | 10/2010 | Hamilton, II et al. |
| 2010/0274815 A1* | 10/2010 | Vanasco .................... 707/798 |
| 2010/0281051 A1 | 11/2010 | Sheffi et al. |
| 2010/0283728 A1 | 11/2010 | Hollemans et al. |
| 2010/0313253 A1 | 12/2010 | Reiss |
| 2011/0016053 A1* | 1/2011 | Dittmer .................. G06Q 20/10 705/44 |
| 2011/0069661 A1 | 3/2011 | Waytena, Jr. et al. |
| 2011/0143716 A1* | 6/2011 | Shaw ........................ 455/411 |
| 2011/0238767 A1 | 9/2011 | Murphy |
| 2012/0028659 A1* | 2/2012 | Whitney ............ H04M 1/72547 455/466 |
| 2012/0034930 A1 | 2/2012 | Zellner et al. |
| 2012/0135775 A1* | 5/2012 | Drozt et al. ................. 455/518 |
| 2012/0174233 A1 | 7/2012 | Waterson |
| 2013/0086225 A1 | 4/2013 | Gay |
| 2014/0047560 A1* | 2/2014 | Meyer ..................... G06F 21/62 726/28 |

FOREIGN PATENT DOCUMENTS

| | | |
|---|---|---|
| CN | 101268470 A | 9/2008 |
| CN | 101370209 A | 2/2009 |

OTHER PUBLICATIONS

"Spoof Caller ID with Telespoof.com"; Telespoof.com; Bearing a date of 2010; pp. 1-2; located at: http://www.telespoof.com/; printed on Jul. 8, 2010.

"Spoofkit is the ultimate windup kit available on the net today"; Spoofkit.com; Bearing dates of 2010-2014; pp. 1-6; located at: http://www.spoofkit.com/; printed on Jul. 8, 2010.

Chinese State Intellectual Property Office, Notification of First Office Action; App. No. 201110279028.X; Nov. 3, 2015, (received by our agent on Nov. 13, 2015); pp. 1-7 (machine translation provided).

Chinese State Intellectual Property Office, Notification of First Office Action; App. No. 201110279048.7; Sep. 16, 2015, (received by our agent on Sep. 17, 15); pp. 1-13 (machine translation provided).

Chinese State Intellectual Property Office, Notification of First Office Action, App. No. 2011/10279007.8 Jul. 17, 2015; pp. 1-23 (machine translation provided).

Chinese State Intellectual Property Office, Notification of First Office Action; App. No. 201110279036.4; Sep. 16, 2015, (received by our agent on Sep. 28, 2015); pp. 1-10 (machine translation provided).

* cited by examiner

104 Communiqué Presenting Module

- 206 Visual Displaying Module
- 208 Audio Indicating Module
- 210 Communiqué Intercepting Module
- 226 Source Entity Associated Word/Phrase Inclusion Determining Module
- 228 Source Entity Provision Determining Module

- 212 Source Entity Representation Inclusion Determining Module
- 214 Source Entity Name Inclusion Determining Module
- 216 Source Entity Address Inclusion Determining Module
- 218 Source Entity Telephone Number Inclusion Determining Module
- 220 Source Entity Identifier Inclusion Determining Module
- 222 Source Entity Image Inclusion Determining Module
- 224 Source Entity Voice Signature Inclusion Determining Module

- 230 Receiving User Device Location Determining Module
- 232 Receiving User Device Time Determining Module
- 234 Receiving User Device Environmental Condition Determining Module
- 236 Receiving User Device Third Party Proximity Determining Module

- 238 Receiving User Device Possession Determining Module
  - 240 Receiving User Device Possession Verification Determining Module
    - 241 Receiving User Device Possession Password Verification Determining Module
    - 242 Receiving User Device Possession Biometric Verification Determining Module

FIG. 2b

104 Communiqué Presenting Module

244 Communiqué Modifying Module

245 Representation Replacing Module

246 Name Replacing Module

247 Telephone Number Replacing Module

248 Address Replacing Module

249 Image Replacing Module

250 Voice Signature Replacing Module

252 Substitute Communiqué Providing Module

253 Previously Received Communiqué Providing Module

254 Receiving User Provided Communiqué Providing Module

255 Communiqué Accessing Interface Presenting Module

256 Audio Communiqué Accessing Interface Presenting Module

257 Audio Alert Providing Module

258 Visual Alert Providing Module

259 Vibrating Alert Providing Module

260 Visual Communiqué Accessing Interface Presenting Module

261 Visual Alert Providing Module

262 Audio Alert Providing Module

263 Vibrating Alert Providing Module

FIG. 2c

OBFUSCATING IDENTITY OF A SOURCE ENTITY AFFILIATED WITH A COMMUNIQUÉ DIRECTED TO A RECEIVING USER AND IN ACCORDANCE WITH CONDITIONAL DIRECTIVE PROVIDED BY THE RECEIVING USE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/228,664, entitled SYSTEM AND METHOD FOR TRANSMITTING ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 14, 2008, now abandoned.

For purposes of the USPTO extra-statutory requirements, the present application constitutes a continuation-in-part of U.S. patent application Ser. No. 12/228,873, entitled SYSTEM AND METHOD FOR TRANSMITTING ILLUSORY AND NON-ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 15, 2008, now abandoned.

For purposes of the USPTO extra-statutory requirements, the present application constitutes a continuation-in-part of U.S. patent application Ser. No. 12/287,268, entitled SYSTEM AND METHOD FOR TRANSMITTING ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Oct. 7, 2008, now U.S. Pat. No. 8,224,907.

For purposes of the USPTO extra-statutory requirements, the present application constitutes a continuation-in-part of U.S. patent application Ser. No. 12/454,113, entitled SYSTEM AND METHOD FOR MODIFYING ILLUSORY USER IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed May 12, 2009, now abandoned.

For purposes of the USPTO extra-statutory requirements, the present application constitutes a continuation-in-part of U.S. patent application Ser. No. 12/799,794, entitled SYSTEM AND METHOD FOR CONDITIONALLY TRANSMITTING ONE OR MORE LOCUM TENENTES, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Apr. 29, 2010, now abandoned.

For purposes of the USPTO extra-statutory requirements, the present application constitutes a continuation-in-part of U.S. patent application Ser. No. 12/802,139, entitled OBFUSCATING IDENTITY OF A SOURCE ENTITY AFFILIATED WITH A COMMUNIQUÉ IN ACCORDANCE WITH CONDITIONAL DIRECTIVE PROVIDED BY A RECEIVING ENTITY, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed May 27, 2010, which is currently co-pending, or is an application of which a currently co-pending application is entitled to the benefit of the filing date.

For purposes of the USPTO extra-statutory requirements, the present application constitutes a continuation-in-part of U. S. patent application Ser. No. 12/802,136, entitled OBFUSCATING IDENTITY OF A SOURCE ENTITY AFFILIATED WITH A COMMUNIQUÉ IN ACCORDANCE WITH CONDITIONAL DIRECTIVE PROVIDED BY A RECEIVING ENTITY, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed May 28, 2010, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

A computationally implemented method includes, but is not limited to receiving one or more conditional directives from a receiving user, the one or more conditional directives delineating one or more conditions for obfuscating identity of a source entity affiliated with one or more communiqués directed to the receiving user; and presenting at least a second communiqué in response to at least a reception of a first communiqué affiliated with the source entity and in accordance with the one or more conditional directives, the second communiqué being presented in lieu of presenting the first communiqué. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for receiving one or more conditional directives from a receiving user, the one or more conditional directives delineating one or more conditions for obfuscating identity of a source entity affiliated with one or more communiqués directed to the receiving user; and means for presenting at least a second communiqué in response to at least a reception of a first communiqué affiliated with the source entity and in accordance with the one or more conditional directives, the second communiqué being presented in lieu of presenting the first communiqué. In addition to the foregoing, other system aspects are described in the claims, drawings, and text forming a part of the present disclosure.

A computationally implemented system includes, but is not limited to: circuitry for receiving one or more conditional directives from a receiving user, the one or more conditional directives delineating one or more conditions for obfuscating identity of a source entity affiliated with one or more communiqués directed to the receiving user; and circuitry for presenting at least a second communiqué in response to at least a reception of a first communiqué affiliated with the source entity and in accordance with the one or more conditional directives, the second communiqué being presented in lieu of presenting the first communiqué. In addition to the foregoing, other system aspects are described in the claims, drawings, and text forming a part of the present disclosure.

A computer program product including a signal-bearing medium bearing one or more instructions for receiving one or more conditional directives from a receiving user, the one or more conditional directives delineating one or more conditions for obfuscating identity of a source entity affiliated with one or more communiqués directed to the receiving user; and one or more instructions for presenting at least a second communiqué in response to at least a reception of a first communiqué affiliated with the source entity and in accordance with the one or more conditional directives, the second communiqué being presented in lieu of presenting the first communiqué. In addition to the foregoing, other computer program product aspects are described in the claims, drawings, and text forming a part of the present disclosure.

A method for obfuscating identity of a source entity affiliated with communiqué directed to a receiving user, the obfuscation of the identity being in accordance with one or more conditional directives provided, at least in part, by the receiving user, the method includes receiving one or more conditional directives from a receiving user, the one or more conditional directives delineating one or more conditions for obfuscating identity of a source entity affiliated with one or more communiqués directed to the receiving user; and presenting, using one or more processors, at least a second communiqué in response to at least a reception of a first communiqué affiliated with the source entity and in accordance with the one or more conditional directives, the second communiqué being presented in lieu of presenting the first communiqué.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 2b and 2c show another perspective of the communiqué presenting module 104 of the computing device 10 of FIGS. 1a and 1b.

DETAILED DESCRIPTION

Figure 1A:
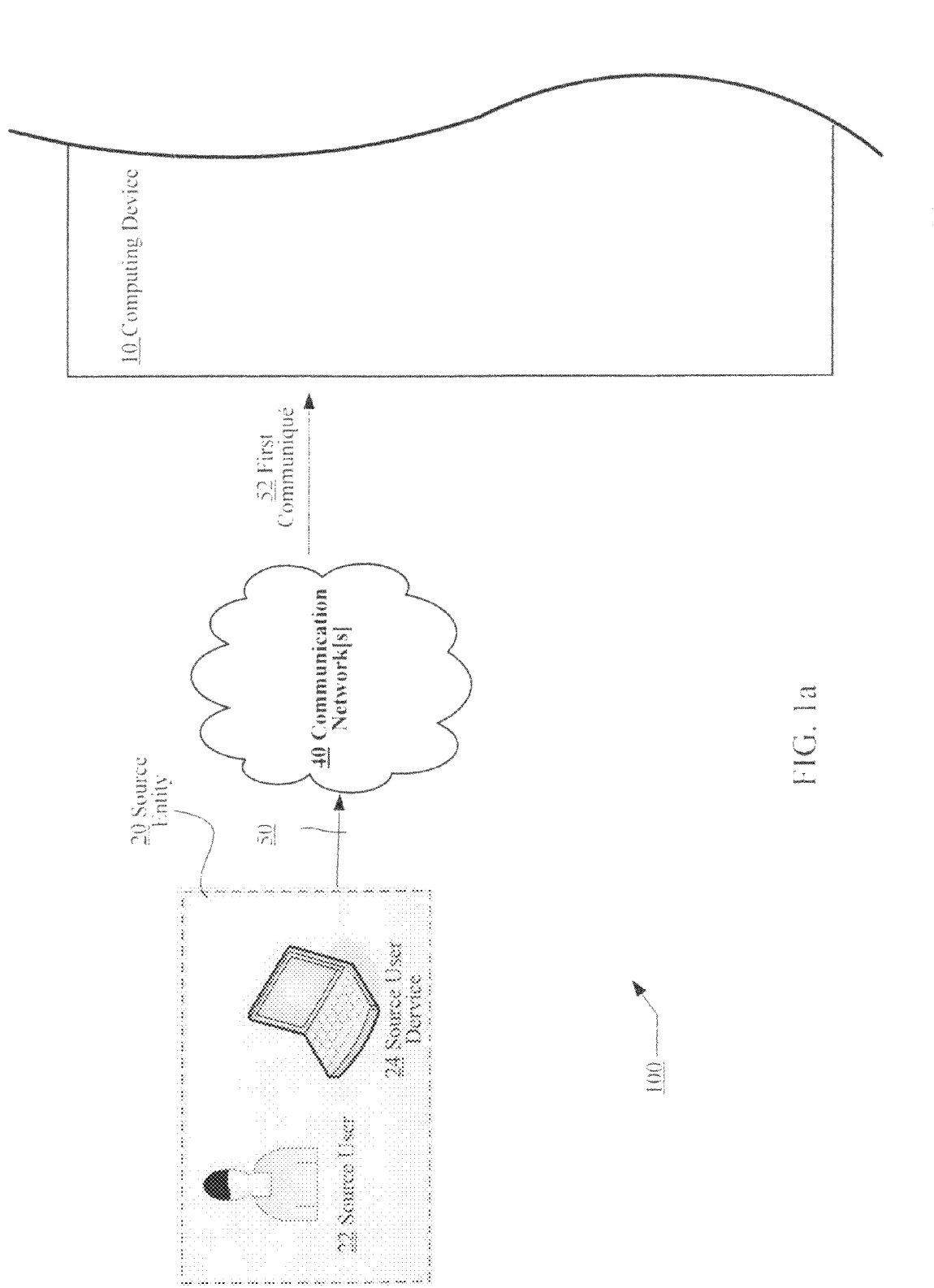
FIGS. 1a and 1b show a high-level block diagram of a computing device 10 operating in a network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In recent years, the computing/communication industry has enjoyed dramatic technological advancement and spectacular commercial popularity, providing numerous benefits for those who choose to enjoy the fruits of technological developments in the computing/communication sectors. For example, with the rapid development of personal communication devices such as cellular telephones, personal digital assistants (PDAs), Smartphones, laptop computers, desktop computers, and so forth, users of such devices are now able to maintain 24/7 connectivity with other users at relatively low costs. Such connectivity may be via a variety of communication channels including, for example, telephone calls, emails, Voice over Internet Protocol (VoIP) calls, text messaging (e.g., short message service or SMS, or multimedia messaging service or MMS), instant messaging (IM), and so forth. Unfortunately, in addition to providing significant benefits to users, users of such technologies must also deal with a whole new set of issues and problems that have also arisen with this new computing/communication technology.

For example, users of such personal communication devices (e.g., cellular telephones, Smartphones, laptop and desktop computers, and so forth) face a number of privacy and security issues. One such issue that has surfaced with respect to users of personal communication devices is that communiqués (e.g., electronic communications including, for example, telephone calls, VoIP, emails, text messages, IMs, and so forth) received through these personal communication devices are often easily accessible by those other than the primary users (e.g., owners) of such devices. As a result, highly sensitive communiqués (e.g., confidential personal or business communiqués) that are directed to the primary users of such devices may often be accessed by others potentially causing embarrassing if not devastating consequences.

For example, it was extensively reported recently that a well-known and well-admired professional athlete was discovered having an extramarital affair by his spouse. It was widely reported that the spouse discovered this affair when she found a voice message from her husband's mistress on her husband's cellular telephone. Because the husband (i.e., famous professional athlete) in that incident had not erased or was not able to hide or disguise the voice message from his mistress, the husband had to endure significant public humiliation and substantial financial loss due to loss of commercial endorsement income.

Of course the need for maintaining communication or communiqué secrecy is not just limited to personal situations, but may also be necessary in professional/business context. For example, it may be inappropriate for a person to receive certain sensitive communiqués from particular parties (e.g., communiqués from certain clients or competitors, or communiqués from a particular websites or business) while at work or while at other locations (e.g., when meeting with clients).

According to various embodiments, methods, systems, and computer program products are provided for obfuscating identity of a source entity affiliated with a communiqué that is directed to a receiving user, the obfuscating of the identity of the source entity being based on one or more conditional directives provided by the receiving entity. More particularly, the methods, systems, and computer program products may be designed to receive one or more conditional directives from a receiving user, the one or more conditional directives delineating one or more conditions for obfuscating identity of a source entity affiliated with one or more communiqués directed to the receiving user; and to present at least a second communiqué in response to at least a reception of a first communiqué affiliated with the source entity and in accordance with the one or more conditional directives, the second communiqué being presented in lieu of presenting the first communiqué. In various embodiments, the methods, systems, and computer program products may be implemented at a computing/communication device of the receiving user.

For purposes of the following description, a "communiqué" may be in reference to any one of a variety of communication means including, for example, a telephone call, an email message, a text message (e.g., SMS or MMS), an instant message (IM), a Voice over Internet Protocol (VoIP) call, a voice message, a video message, and so forth. As will be further described herein, a "source entity" may be in reference to any entity that may be the original or an intermediate source for a communiqué. In some cases, a source entity may include, for example, a source user who may be a human or robotic user and/or a source user device such as a cellular telephone, Smartphone, laptop or desktop computer, and so forth. In some cases, a source entity may be an organization such as a business or a trade or interest group. In some instances, a source entity may be a website. A "receiving user" may be a human or robotic user that is designated to receive one or more communiqués. In some cases where the receiving user is a robotic user, the robotic user may be a network device such as a network server for, for example, a voicemail service, a text messaging service, or a web-based application service.

A "conditional directive," as will be discussed herein, relates to a command or instruction to execute one or more actions when one or more conditions have occurred and/or detected. For example, a conditional directive may be a command to intercept a first communiqué directed to a receiving user and to present, in lieu of presenting the first communiqué, a second communiqué when, for example, one or more particular conditions are determined to have occurred. In some cases, a conditional directive may dictate that a first communiqué be intercepted and replaced by a second communiqué in order to obfuscate the identity of a source entity affiliated with the first communiqué so long as the first communiqué indicates its affiliation to the source entity. In other cases, and as will be described in greater detail herein, other conditions must be detected before presenting the second communiqué in lieu of the first communiqué in order to obfuscate the identity of the source entity.

Figure 1B:
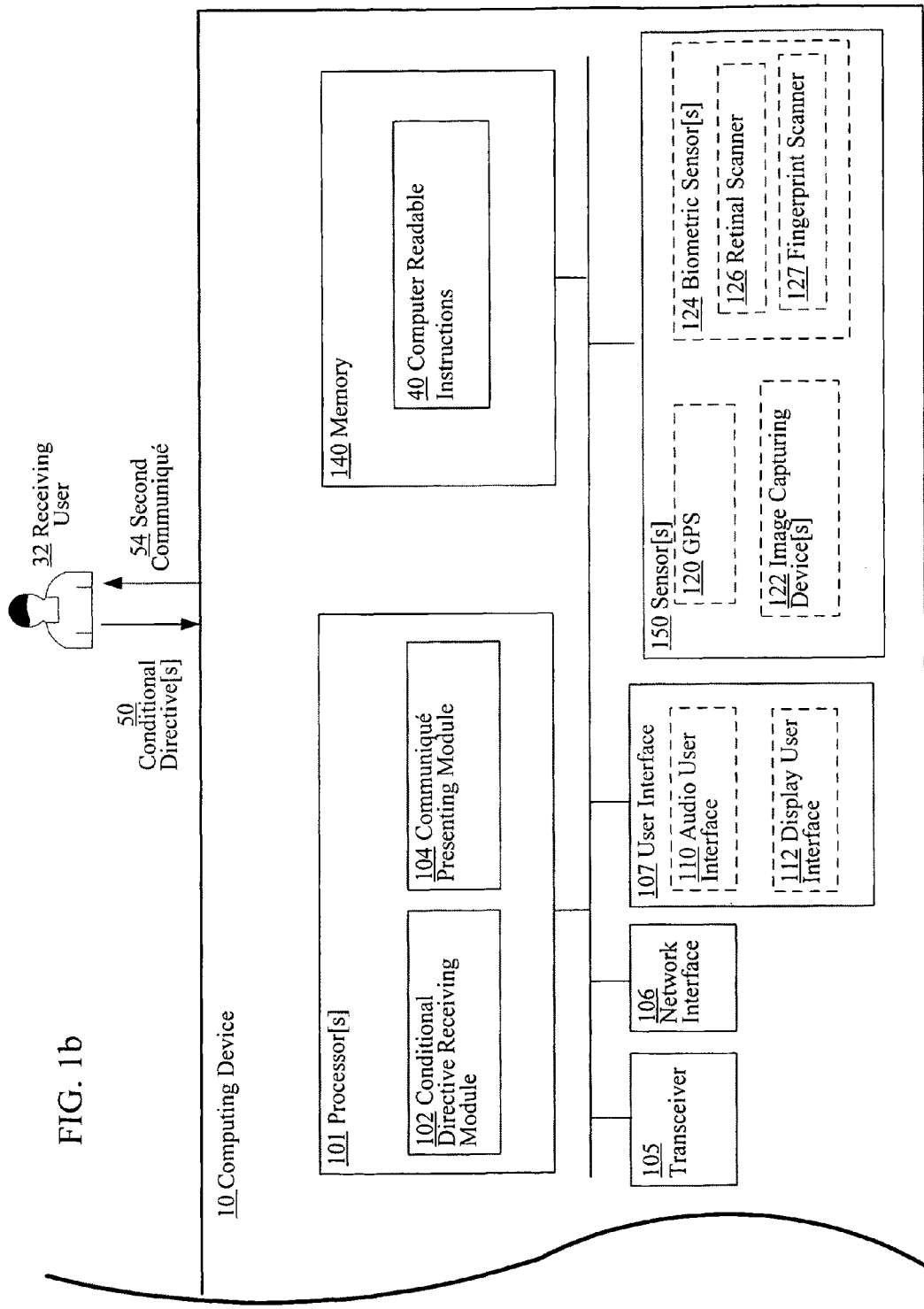

Turning now to FIGS. 1*a*, and 1*b* illustrating an example environment 100 in which the methods, systems, circuitry, and computer program products in accordance with various embodiments may be implemented by a computing device 10. Among other things, the methods, systems, circuitry, and computer program products implemented by the computing device 10 may be designed to receive one or more conditional directives 50 from a receiving user 32, the one or more conditional directives 50 delineating (e.g., indicating or defining) one or more conditions for obfuscating identity of a source entity 20 affiliated with one or more communiqués (e.g., first communiqué 52 in FIGS. 1*a* and 1*b*) directed to the receiving user 32. The methods, systems, circuitry, and computer program products, when implemented by the computing device 10, may also be designed to present at least a second communiqué 54 in response to at least a reception of a first communiqué 52 affiliated with the source entity 20 and in accordance with the one or more conditional directives 50, the second communiqué 54 being presented in lieu of presenting the first communiqué 52.

From another perspective, the computing device 10 may be a receiving user device (e.g., a communication device for a receiving user 32) that is designed to receive one or more conditional directives 50 from a receiving user 32, and to execute the one or more conditional directives 50 in order to obfuscate the identity of a source entity 20 affiliated with a communiqué (e.g., the first communiqué 52 in FIGS. 1a and 1b) directed to the receiving user 32. In various embodiments, the computing device 10 may be a communication device that includes one or more processors (e.g., microprocessors, controllers, etc.) and that is designed to receive and/or transmit communiqués. A computing device 10 may be any one of, for example, a cellular telephone, a landline telephone, a Smartphone, a personal digital assistant (PDA), a computer tablet, a laptop computer, a desktop computer, a workstation, and so forth.

The computing device 10 may be generally designed to facilitate communication in the form of communiqués between a receiving user 32 and one or more source entities 20 via one or more communication networks 40. As described above, a receiving user 32 may be a human user or robotic user (e.g., answering service server). In various embodiments, a source entity 20 may comprise of a human or robotic source user 22 and/or a source user device 24 (e.g., a laptop computer, a desktop computer, a workstation, a Smartphone, a cellular telephone, a personal digital assistant (PDA), or other computing/communication devices). In some embodiments, and from another perspective, the source entity 20 may be a website or an organization such as a business, a social group, a trade/technical group, or an interest group.

In some cases, the computing device 10 may be designed to receive one or more conditional directives 50 from a receiving user 32 through a user interface 107. In various embodiments, the user interface 107 may comprise of an audio, user interface 110 (e.g., microphone/speaker system) and/or a display user interface 112 (e.g., one or more of a display monitor including a touch screen, a keypad or keyboard, a mouse, and so forth). As will be further described herein, in order to facilitate or prompt the receiving user 32 to input the one or more conditional directives 50, the computing device 10 may, in some cases, present to the receiving user 32, via the user interface 107, a conditional directive input interface for inputting the one or more conditional directives 50. The conditional directive input interface that may be presented may be a visual conditional directive input interface (e.g., as provided through a display monitor of a display user interface 112 and/or an audio conditional directive input interface (e.g., as provided through a speaker/microphone system of an audio user interface 110).

In some embodiments, the conditional directive input interface that may be presented to the receiving user 32 may solicit one or more conditional directives 50 from the receiving user 32 that, at a minimum, at least identify the one or more source entities 20 whose identities are to be obfuscated with respect to communiqués that are affiliated with the one or more source entities 20 and that are directed (e.g., sent) to the receiving user 32. For these implementations, the conditional directive input interface that may be presented to the receiving user 32 may only require the receiving user 32 to provide a minimal amount of input data in order to generate the one or more conditional directives 50. For example, in some cases, the conditional directive input interface that may be presented to a receiving user 32 (e.g., via the user interface 107) may only obtain from the receiving user 32 data that merely indicates the one or more representations (e.g., identifiers such as names, email addresses, Internet Protocol addresses, telephone numbers, and so forth) of the source entity 20 that may be found in communiqués directed to the receiving user 32 that the receiving user 32 wishes to obfuscate.

In some implementations, and as will be further described herein, the conditional directive input interface that may be presented to the receiving user 32 may be designed to acquire from the receiving user 32 data that indicates the specific conditions associated with, for example, the computing device 10 that must be present in order to cause the identity of a source entity 20 affiliated with a communiqué (e.g., the first communiqué 52 of FIGS. 1a and 1b) directed to the receiving user 32 to be obfuscated. As will be further described herein, examples of conditions that may cause the computing device 10 to obfuscate the identity of a source entity 20 affiliated with a communiqué (e.g., the first communiqué 52 of FIGS. 1a and 1b) include, for example, whether the computing device 10 is the possession of the receiving user 32 or whether a third party is in the proximate vicinity of the computing device 10.

The one or more conditional directives 50 that may be received and executed by the computing device 10 may include a variety of directives for conditionally obfuscating the identity of a source entity 20 with respect to one or more communiqués that are directed to the receiving user 32. For example, in some embodiments, the one or more conditional directives 50 that may be received by the computing device 10 may include a directive to direct the computing device 10 to obfuscate the identity of a source entity 20 whenever the computing device 10 receives any communiqué (e.g., first communiqué 52 of FIGS. 1a and 1b) that is determined to be affiliated with the source entity 20. In some cases, the computing device 10 may determine whether a received communiqué, such as the first communiqué 52 of FIGS. 1a and 1b, is affiliated with the source entity 20 by determining whether the communiqué includes one or more representations (e.g., identifiers such as names, addresses such as email or IP addresses, telephone numbers, images, and so forth) of the source entity 20. Note that the phrase "to conditionally obfuscate the identity of a source entity" or similar such phrases included in the following are, unless indicated otherwise, in reference to the conditional obfuscation of the identity of a source entity 20 with respect to at least a communiqué (e.g., the first communiqué 52 of FIGS. 1a and 1b) directed to a receiving user 32.

In some embodiments, and as briefly discussed above, the one or more conditional directives 50 that may be received by the computing device 10 may include a directive to direct the computing device 10 to obfuscate the identity of a source entity 20 only when certain conditions are present. For example, in some embodiments the one or more conditional directives 50 may include a directive to direct the computing device 10 to obfuscate the identity of a source entity 20 (with respect to a received communiqué such as the first communiqué 52 of FIGS. 1a and 1b) only when the computing device 10 has reached certain times of the day or calendar year and/or whenever the computing device 10 is determined to be at one or more particular locations.

In some embodiments, the one or more conditional directives 50 that may be received by the computing device 10 may include a directive to direct the computing device 10 to obfuscate the identity of a source entity 20 (with respect to a received communiqué such as the first communiqué 52 of FIGS. 1*a* and 1*b*) only when the computing device 10 determines that the computing device 10 is not in the possession (e.g., control) of the receiving user 32. In still other embodiments, the one or more conditional directives 50 may include a directive to direct the computing device 10 to obfuscate the identity of a source entity 20 (with respect to a received communiqué such as the first communiqué 52 of FIGS. 1*a* and 1*b*) when the computing device 10 determines that the computing device 10 is in the proximate vicinity of a particular third party (e.g., a particular third party as specified by the receiving user 32).

In various embodiments, the one or more conditional directives 50 that may be received by the computing device 10 may direct the computing device 10 to obfuscate the identity of a source entity 20 with respect to a received communiqué (e.g., the first communiqué 52 of FIGS. 1*a* and 1*b*) by presenting (e.g., visually displaying and/or audibly indicating), in lieu of presenting the received communiqué (e.g., the first communiqué 52 of FIGS. 1*a* and 1*b*), a "replacement" communiqué (e.g., the second communiqué 54 of FIGS. 1*a* and 1*b*) that from at least a third party does not appear to be affiliated with the source entity 20. There are at least two ways to provide or generate the replacement communiqué (e.g., the second communiqué 54 of FIGS. 1*a* and 1*b*). One way to provide the replacement communiqué is to modify the original received communiqué (e.g., the first communiqué 52 of FIGS. 1*a* and 1*b*) so that all of the representations (e.g., identifiers) of the source entity 20 that may be included in the original received communiqué (e.g., the first communiqué 52 of FIGS. 1*a* and 1*b*) are replaced with substitute representations. Thus, in the first approach for providing the replacement communiqué (e.g., the second communiqué 54 of FIGS. 1*a* and 1*b*), the replacement communiqué is merely a modified version of the original received communiqué (e.g., the first communiqué 52 of FIGS. 1*a* and 1*b*).

The second way to provide the replacement communiqué is to provide or generate a distinct substitute communiqué that is unrelated to the original received communiqué (e.g., the first communiqué 52 of FIGS. 1*a* and 1*b*). Under this approach, the replacement communiqué (e.g., the second communiqué 54 of FIGS. 1*a* and 1*b*) that is provided may be a communiqué or a copy of a communiqué that was previously received by the computing device 10. In some cases, the replacement communiqué that may be presented by the computing device 10 may be a copy of the most recently received communiqué received by the computing device 10. These two different approaches for presenting the replacement or substitute communiqués, in lieu of presenting the original received communiqués affiliated with the source entity 20 will be described in greater detail with respect to the operations and processes to be described herein.

Referring back to the example environment 100 of FIGS. 1*a* and 1*b*, and as briefly described above, the computing device 10 may be designed to receive a first communiqué 52 that may be affiliated with a source entity 20 and that may be directed to a receiving user 32. The first communiqué 52 may be directly or indirectly received from the source entity 20 via one or more communication networks 40. The one or more communication networks 40 may include one or more of a local area network (LAN), metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, a Client/Server network, a virtual private network (VPN), and so forth.

In some embodiments, the reception of the first communiqué 52 may include the interception (e.g., seizing, capturing, or interrupting) of the first communiqué 52 in order to prevent the first communiqué 52 from being presented (e.g., visually displayed and/or audibly indicated) at least as is. As will be further described herein, if the first communiqué 52 is indeed intercepted, then the intercepting of the first communiqué 52 may be in accordance with the one or more conditional directives 50 as provided by the receiving user 32.

The first communiqué 52 that may be received and/or intercepted by the computing device 10 may be directed to (e.g., destined for or sent to) the receiving user 32 and may be any one of a variety of electronic communications including, for example, a telephone call, a VoIP call, a voice mail or message, an email, a text message (e.g., SMS or MMS), an IM, a video message, and so forth. Depending on whether the first communiqué 52 is an email, a telephone call, a VoIP call, a video call or some other type of communiqué, the first communiqué 52 may include various types of data including, for example, header data (which may identify the sender, the destination address and/or receiving party, subject heading, routing or path, and so forth), message content data (e.g., audio data if the first communiqué 52 is a telephone or VoIP call or text data if the first communiqué 52 is an email or text message), and/or metadata.

In various embodiments, the first communiqué 52 that may be received by the computing device 10 may be affiliated with the source entity 20 by indicating the source entity 20 in the form of one or more representations (e.g., identifiers) associated with the source entity 20. A representation of the source entity 20, which may be included in the first communiqué 52 in the form of header data, message content data, or metadata, may be any one of a name (e.g., an individual's legal name, a username, a business name, a website name), address (e.g., email address, uniform resource locator or URL, Internet Protocol or IP address, and so forth), a telephone number, an image (e.g., digital facial image or iconic figure), a voice signature, or any other identifier that may be associated with the source entity 20.

As described earlier, after receiving the first communiqué 52 and determining that the first communiqué 52 is affiliated with the source entity 20, the computing device 10 may present (e.g., audibly indicating and/or visually displaying) at least a second communiqué 54 in lieu of presenting the first communiqué 52 in accordance with the one or more conditional directives 50. In various embodiments, the computing device 10 may present the second communiqué 54 audibly and/or visually via a user interface 107, which may further include an audio user interface 110 (e.g., microphone/speaker system) and/or a display user interface 112 (e.g., a system that include a display monitor including a touch screen, a keypad or keyboard, a mouse, and/or other peripheral devices).

In some embodiments, the computing device 10 in accordance with the one or more conditional directives 50 may present the second communiqué 54 in lieu of presenting the first communiqué 52 only when certain conditions are detected. For example, the one or more conditional directives 50 as described earlier, may require that the second communiqué 54 be presented in lieu of presenting the first communiqué 52 only when it is determined that the computing device 10 is not in the possession of receiving user 32. In some cases, such a determination may be made by determining whether a verification (e.g., password or biometric verification) has been provided that indicates that the receiving user 32 has possession of the computing device 10.

In some cases, the one or more conditional directives 50 may require that the second communiqué 54 be presented in lieu of presenting the first communiqué 52 only when it is determined that the computing device 10 is the proximate vicinity of a specific third party (e.g., as specified by the receiving user 32). Such a determination may be made by, for example, processing audio and/or image data provided by an audio device such as a microphone and/or a image capturing device such as a digital camera or a webcam.

In some cases, the one or more conditional directives 50 may require that the second communiqué 54 be presented in lieu of presenting the first communiqué 52 only when it is determined that the computing device 10 is at one or more specified locations (e.g., workplace, home, etc.) or is at or has reached one or more points or intervals of time. In still other cases, the one or more conditional directives 50 may require that the second communiqué 54 be presented in lieu of presenting the first communiqué 52 only when it is determined that other types of conditions exists as will be further described herein.

Figure 2A:
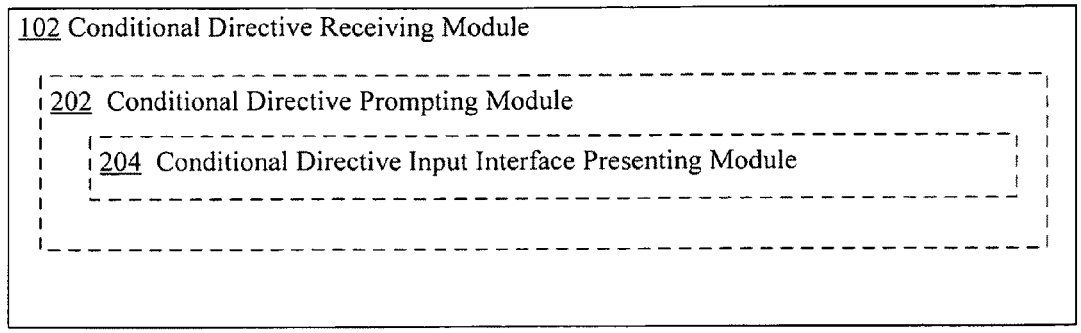
FIG. 2a shows another perspective of the conditional directive receiving module 102 of the computing device 10 of FIGS. 1a and 1b.
Figure 2D:
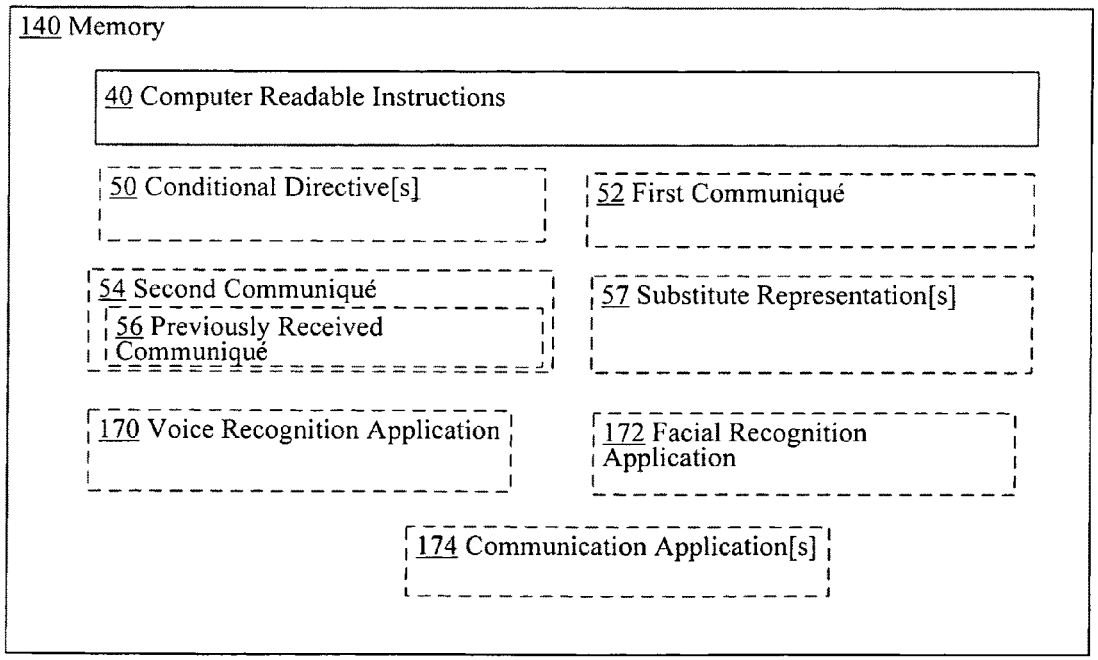
FIG. 2d shows another perspective of the memory 140 of the computing device 10 of FIGS. 1a and 1b.

In some embodiments, the computing device 10 after receiving the first communiqué 52 and determining that the first communiqué 52 is indeed affiliated with the source entity 20 may store the first communiqué 52 in a memory 140 (see FIG. 2d). For these embodiments, the stored or saved first communiqué 52 may then be, in some cases, subsequently retrieved from the memory 140 in order to be discretely presented to the receiving user 32 at the appropriate time and/or place.

As also indicated earlier, in various embodiments, the second communiqué 54 that is to be presented in lieu of presenting the first communiqué 52 may be provided or generated by modifying the first communiqué 52 in accordance with the one or more conditional directives 50. In some cases, the modification of the first communiqué 52 may involve replacement of one or more representations associated with the source entity 20 that may be included in the first communiqué 52 with one or more locum tenentes (e.g., placeholders, proxies, stand-ins, and so forth). Alternatively, the second communiqué 54 may be provided by providing a substitute communiqué that is a distinct and unrelated communiqué from the first communiqué 52. In some cases, and as will be further described herein, the substitute communiqué that may be provided may be a previously received communiqué that was directed to the receiving user 32. In some cases, the substitute communiqué that may be provided may be a communiqué that is supplied by the receiving user 32.

Regardless of whether the second communiqué 54 is merely a modified version of the first communiqué 52 or a communiqué that is distinct and unrelated from the first communiqué 52, the second communiqué 54 may at least not appear to be affiliated with the source entity 20. This means that in some embodiments, the second communiqué 54 to be presented may not include any representation (e.g., identifiers such as a name, email address, image, telephone number, voice signature, and so forth) of the source entity 20.

As described above, in embodiments where the second communiqué 54 is provided by modifying the first communiqué 52, the first communiqué 52 may be modified by replacing one or more representations of the source entity 20 that may be included in the first communiqué 52 with one or more locum tenentes. For example, replacing one or more representative addresses or names of the source entity 20 included in the first communiqué 52 with one or more substitute addresses or names. Note that the one or more locum tenentes (e.g., substitute addresses or substitute names) that are to replace the one or more representations (e.g., representative addresses and names) of the source entity 20 that may be included in the first communiqué 52 may be either fictional or non-fictional substitutes as will be further described herein. In cases where the first communiqué 52 is an audio communiqué such as a telephone call or a VoIP call, the voice signature of the source entity 20 (e.g., a human source user 22) may be modified. A "voice signature" may be in reference to the distinct patterns of speech (e.g., tone, pitch, rhythm, accent, and so forth) that each person's voice may be uniquely associated with.

In embodiments in which the second communiqué 54 is provided by providing a substitute communiqué that is a distinct communiqué unrelated to the first communiqué 52, the second communiqué 54 may be a direct or indirect substitute for the first communiqué 52. That is, in some embodiments, the second communiqué 54 that may be presented may be a direct substitute that is the same type of communiqué as the first communiqué 52. For example replacing an email that is affiliated with the source entity 20 with another email that at least should not appear to a third party to be affiliated with the source entity 20.

In other embodiments, however, the second communiqué 54 that may be presented may be an indirect substitute that is a different type of communiqué from the first communiqué 52. For example, replacing a text message that is affiliated with the source entity 20 with a voice message that does not at least appear to be affiliated with the source entity 20. In some embodiments, the second communiqué 54 that may be presented may be a copy of a communiqué (which may have been sent by a third party) that was previously received by the computing device 10. For these embodiments, the second communiqué 54 may be a copy of the most recently received communiqué received by the computing device 10 that was directed to the receiving user 32.

In embodiments in which the second communiqué 54 is provided by providing a substitute communiqué that is a distinct communiqué unrelated to the first communiqué 52 (rather than merely being a modified version of the first communiqué 52), the second communiqué 54 may be retrieved from a memory 140 (e.g., see FIG. 2d). In some cases, the second communiqué 54 retrieved from the memory 140 may be a second communiqué 54 that was supplied by the receiving user 32 or a previously received communiqué 56 directed to the receiving user 32 and that was previously received by the computing device 10.

In various embodiments, the second communiqué 54 that may be presented by the computing device 10 may include at least one of a textual or numerical content data. For these embodiments, the second communiqué 54 may be at least one of an email, an IM, or a text message. In alternative or the same embodiments, the second communiqué 54 that may be presented by the computing device 10 may include at least one of audio or image data. For these embodiments, the second communiqué 54 may be at least one of a telephone call, a video call, a VoIP call, or a voice mail.

In various embodiments, the presenting by the computing device 10 of the second communiqué 54, in lieu of presenting of the first communiqué 52, may also include the presentation of a communiqué accessing interface for accessing the second communiqué 54. For these embodiments, the communiqué accessing interface to be presented may be provided in order to covertly alert or indicate to the receiving user 32 that the second communiqué 54 is being presented in lieu of the first communiqué 52. The communiqué accessing interface that may be presented may be an audio and/or a visual interface for accessing the second communiqué 54 and may be presented through the audio user interface 110 (e.g., microphone/speaker system) and/or the display user interface 112 (e.g., a system comprising display monitor including a touch screen, a keypad or keyboard, a mouse, and so forth) of the computing device 10.

The type of communiqué accessing interface that may be presented may depend on the type of communiqué (e.g., the second communiqué 54) to be presented through the communiqué accessing interface. Examples of communiqué accessing interfaces that may be presented include, for example, an email application interface, an IM application interface, a VoIP interface, and so forth. In order to covertly alert the receiving user 32 that the second communiqué 54 is being presented as a replacement for the first communiqué 52, the communiqué accessing interface (e.g., audio communiqué accessing interface or a visual communiqué accessing interface) that may be presented may include an audio alert (e.g., background sound such as simulated natural sounds such as birds chirping), a visual alert (e.g., displaying a particular color or icon in the background of a display screen), and/or a vibration alert (e.g., particular rhythmic vibration) to discretely indicate to the receiving user 32 that the second communiqué 54 is being presented in lieu of the first communiqué 52. In some cases, such an alert, although may not specifically indicate that the second communiqué 54 is being presented in lieu of the first communiqué 52, may at least covertly indicate to the receiving user 32 that the second communiqué 54 that is being presented is a deception.

Turning specifically now to the computing device 10 of FIG. 1b. The computing device 10, as depicted, may include a variety of modules, sub-modules, and various other components. The computing device 10, in some embodiments, may be a network component device designed to communicate with one or more other network devices. The computing device 10 may be any one of a variety of computing/communication devices that can transmit/receive communiqués including, for example, a cellular telephone, a PDA, a Smartphone, a tablet computer, a laptop computer, a desktop computer, a workstation, and so forth.

As illustrated, the computing device 10 may include one or more processors 101 (e.g., one or more microprocessors and/or controllers), a memory 140 (which may be a storage medium) including computer readable instructions 40, a transceiver 105 (e.g., designed to transmit and receive communication signals), a network interface 106 (e.g., a network interface such as a network interface card or "NIC" for accessing one or more communication networks 40), a user interface 107 (which may further include an audio user interface 110 and/or display user interface 112) as described earlier, and/or one or more sensors 150. In various implementations, the one or more processors 101 may include certain logic blocks for executing the novel operations and processes to be described herein. For example, the one or more processors 101, when executing the computer readable instructions 40 of the memory 140, may include logic blocks including a conditional directive receiving module 102 and a communiqué presenting module 104.

As will be further described herein, the conditional directive receiving module 102 may be configured to receive one or more conditional directives 50 from a receiving user 32, the one or more conditional directives 50 delineating one or more conditions for obfuscating identity of a source entity 20 affiliated with one or more communiqués (e.g., first communiqué 52 of FIGS. 1a and 1b) directed to the receiving user 32, while the communiqué presenting module 104 may be configured to present at least a second communiqué 54 in response to at least a reception of a first communiqué 52 affiliated with the source entity 20 and in accordance with the one or more conditional directives 50, the second communiqué 54 being presented in lieu of presenting the first communiqué 52. Note that although the conditional directive receiving module 102 and the communiqué presenting module 104 illustrated in FIGS. 1a and 1b are depicted as being implemented by the one or more processors 101 executing computer readable instructions 40 (e.g., software), in alternative implementations, the conditional directive receiving module 102 and the communiqué presenting module 104 (and their sub-modules as depicted in FIGS. 2a, 2b, and 2c) may be implemented using hardware (e.g. circuitry such as application specific integrated circuit or ASIC), firmware, or a combination of hardware, software and/or firmware.

The computing device 10, in various embodiments, may include one or more sensors 150. For example, in some embodiments, the computing device 10 may include a global positioning system 120, one or more image capturing devices 122 (e.g., digital camera or a webcam) that may also be part of a display user interface 112, one or more audio capturing devices that may be part of an audio user interface 110, and one or more biometric sensors 124 (e.g., retinal scanner 126, fingerprint scanner 127, and so forth).

In various embodiments, the memory 140 that may be included in the computing device 10 may be designed for storing various types of data and computer readable programming instructions. For these embodiments, memory 140 may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

As illustrated in FIG. 2d, memory 140 may store, in addition to the computer readable instructions 40, other types of data in various alternative embodiments. For example, in some embodiments, memory 140 may store one or more conditional directives 50 provided by a receiving user 32, a first communiqué 52 directed to the receiving user 32 and determined to be affiliated with a source entity 20, a second communiqué 54 (which may be a previously received communiqué 56) to be presented in lieu of presenting the first communiqué 52, one or more substitute representations 57 (for replacing one or more representations of the source entity 20 that may be included in the first communiqué 52), a voice recognition application 170, a facial recognition application 172, and/or one or more communiqué applications 174 (e.g., email application, text messaging application, IM application, VoIP application, and so forth). In embodiments where the memory 140 includes the previously received communiqué 56, the previously received communiqué 56 may be a communiqué directed to the receiving user 32 that was previously received by the computing device 10. In some cases, the previously received communiqué 56 that may be stored in memory 140 may have been sent by a third party that may not be related to the source entity 20.

In embodiments where the memory 140 includes the one or more substitute representations 57, the one or more substitute representations 57 (e.g., one or more substitute names, addresses, telephone numbers, images, voice signatures, and so forth) may be used as one or more locum tenentes to replace one or more representations of the source entity 20 that may be included in a first communiqué 52 received by the computing device 10 and determined to be affiliated with the source entity 20. In some embodiments, the memory 140 may include the facial recognition application 172, and/or the voice recognition application 170. These applications may be used in some cases in order to, for example, determine that the first communiqué 52 received by the computing device 10 includes one or more representations (e.g., in the form of image representations and/or voice representations) of the source entity 20. Such applications may also or may alternatively be employed in order to determine whether, for example, a particular third party is in the proximate vicinity of the computing device 10.

Referring now to FIG. 2a illustrating a particular implementation of conditional directive receiving module 102 of the computing device 10 of FIGS. 1a and 1b. As illustrated, the conditional directive receiving module 102 may include one or more sub-modules including, for example, a conditional directive prompting module 202. In some embodiments, the conditional directive prompting module 202 may further include a conditional directive input interface presenting module 204. Although the conditional directive receiving module 102 is depicted in FIG. 1b as being implemented by one or more processors 101 executing computer readable instructions 40, as indicated earlier in various alternative implementations each of the sub-modules of the conditional directive receiving module 102, as well as the conditional directive receiving module 102 itself, may be implemented using hardware, software (e.g., computer readable instructions 40 executed by one or more processors 101), firmware, or any combination thereof. Specific details related to the conditional directive receiving module 102 as well as the above-described sub-modules of the conditional directive receiving module 102 will be provided below in reference to the operations and processes to be described herein.

Referring now to FIGS. 2b and 2c illustrating a particular implementation of the communiqué presenting module 104 of the computing device 10 of FIGS. 1a and 1b. As illustrated in FIGS. 2b and 2c, the communiqué presenting module 104 may include one or more sub-modules in various alternative implementations. For example, and as illustrated in FIG. 2b, the communiqué presenting module 104 may include, in various implementations, a visual displaying module 206, an audio indicating module 208, a communiqué intercepting module 210, a source entity representation inclusion determining module 212 (which may further include a source entity name inclusion determining module 214, a source entity address inclusion determining module 216, a source entity telephone number inclusion determining module 218, a source entity identifier inclusion determining module 220, a source entity image inclusion determining module 222, and/or a source entity voice signature inclusion determining module 224), a source entity associated word/phrase inclusion determining module 226, and/or a source entity provision determining module 228. In the same or alternative implementations, the communiqué presenting module 104 may include a receiving user device location determining module 230, a receiving user device time determining module 232, a receiving user device environmental condition determining module 234 (which may further include a receiving user device third party proximity determining module 236), and/or a receiving user device possession determining module 238 (which may include a receiving user device possession verification determining module 240 that may further a receiving user device possession password verification determining module 241 and/or a receiving user device possession biometric verification determining module 242).

As further illustrated in FIG. 2c, the communiqué presenting module 104 in various implementations may include a communiqué modifying module 244, a substitute communiqué providing module 252, and/or a communiqué accessing interface presenting module 255. In implementations where the communiqué presenting module 104 includes the communiqué modifying module 244, the communiqué modifying module 244 may further include a representation replacing module 245 (which may also include a name replacing module 246, a telephone number replacing module 247, an address replacing module 248, an image replacing module 249, and/or a voice signature replacing module 250). In implementations where the communiqué presenting module 104 includes the substitute communiqué providing module 252, the substitute communiqué providing module 252 may further include a previously received communiqué providing module 253 and/or a receiving user provided communiqué providing module 254. In implementations where the communiqué presenting module 104 includes the communiqué accessing interface presenting module 255, the communiqué accessing interface presenting module 255 may further include an audio communiqué accessing interface presenting module 256 (which may also include an audio alert providing module 257, a visual alert providing module 258, and/or a vibrating alert providing module 259) and/or a visual communiqué accessing interface presenting module 260 (which may also include a visual alert providing module 261, an audio alert providing module 262, and/or a vibrating alert providing module 263). Although the communiqué presenting module 104 is depicted in FIG. 1b as being implemented by one or more processors 101 executing computer readable instructions 40, in various alternative implementations, each of the sub-modules of the communiqué presenting module 104, as well as the communiqué presenting module 104 itself, may be implemented using hardware, software (e.g., computer readable instructions 40 executed by one or more processors 101), firmware, or any combination thereof. Specific details related to the above-described sub-modules of the communiqué presenting module 104 will be provided below in reference to the operations and processes to be described herein.

Figure 3:
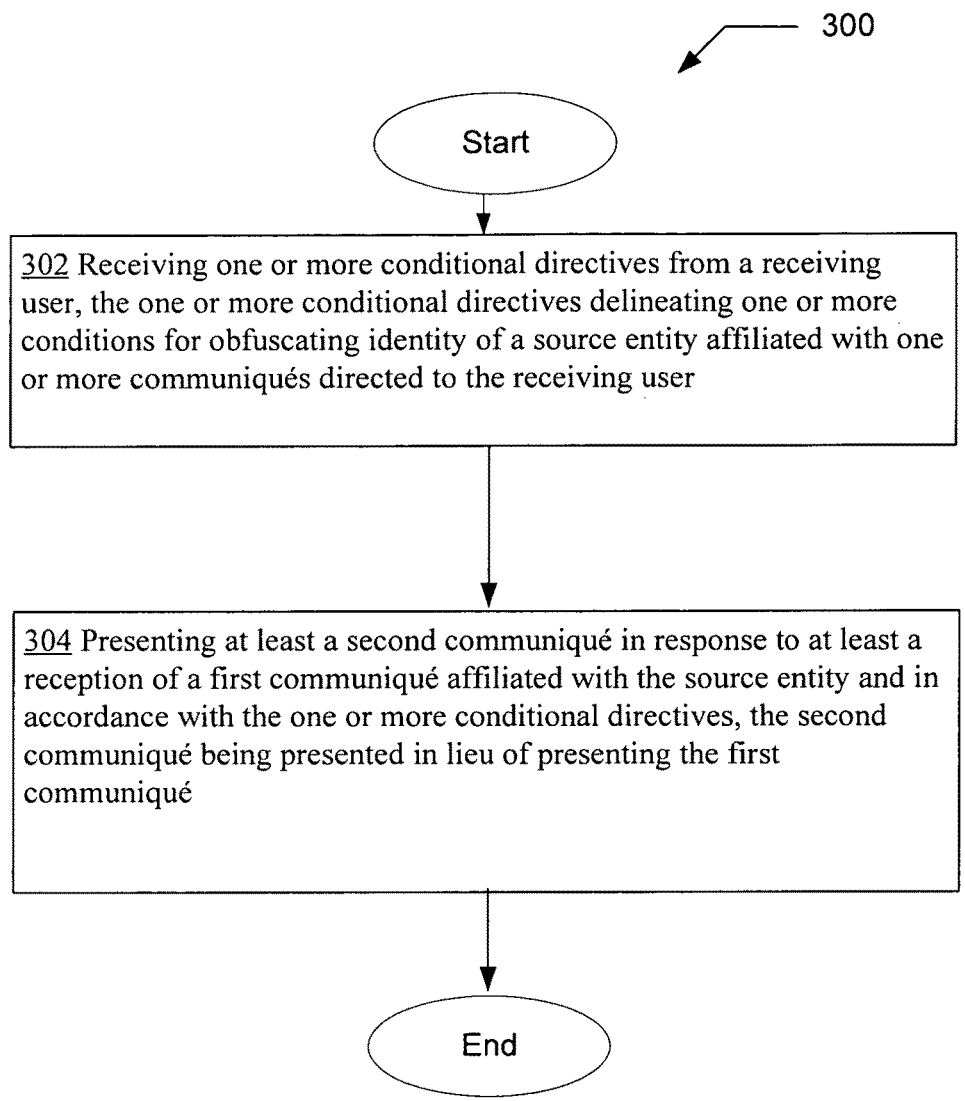
FIG. 3 is a high-level logic flowchart of a process.

A more detailed discussion related to the computing device 10 of FIGS. 1a and 1b will now be provided with respect to the processes and operations to be described herein. FIG. 3 illustrates an operational flow 300 representing example operations for, among other things, obfuscating identify of a source entity affiliated with a communiqué that is directed to a receiving user, the obfuscation of the identity of the source entity being in accordance with one or more conditional directives provided by the receiving user. In FIG. 3 and in the following figures that include various examples of operational flows, discussions and explanations will be provided with respect to the exemplary environment 100 described above and as illustrated in FIGS. 1a and 1b, and/or with respect to other examples (e.g., as provided in FIGS. 2a, 2b, 2c, and 2d) and contexts. However, it should be understood that the operational flows may be executed in a number of other environments and contexts, and/or in modified versions of FIGS. 1a, 1b, 2a, 2b, 2c, and 2d. Also, although the various operational flows are presented in the sequence(s) illustrated, it should be understood that the various operations may be performed in other orders other than those which are illustrated, or may be performed concurrently.

Further, in FIG. 3 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 3 as well as the other operations to be described herein may be performed by at least one of a machine, an article of manufacture, or a composition of matter.

In any event, after a start operation, the operational flow 300 of FIG. 3 may move to a conditional directive receiving operation 302 for receiving one or more conditional directives from a receiving user, the one or more conditional directives delineating one or more conditions for obfuscating identity of a source entity affiliated with one or more communiqués directed to the receiving user. For instance, and as an illustration, the conditional directive receiving module 102 of the computing device 10 of FIGS. 1a and 1b receiving one or more conditional directives 50 from a receiving user 32 (e.g., a human user or a robotic user such as an automated answering service machine), the one or more conditional directives 50 delineating one or more conditions for obfuscating identity of a source entity 20 (which may comprise of a source user 22 and/or a source user device 24) affiliated with one or more communiqués directed to the receiving user 32.

In addition to the conditional directive receiving operation 302, operational flow 300 may also include a communiqué presenting operation 304 for presenting at least a second communiqué in response to at least a reception of a first communiqué affiliated with the source entity and in accordance with the one or more conditional directives, the second communiqué being presented in lieu of presenting the first communiqué as further illustrated in FIG. 3. For instance, the communiqué presenting module 104 of the computing device 10 of FIGS. 1a and 1b presenting (e.g., visually displaying through a display monitor such as a touch screen and/or audibly indicating via a speaker system) at least a second communiqué 54 in response to at least a reception of a first communiqué 52 (e.g., as received via a network interface 106) affiliated with the source entity 20 and in accordance with the one or more conditional directives 50, the second communiqué 54 being presented in lieu of presenting the first communiqué 52.

Figure 4A:
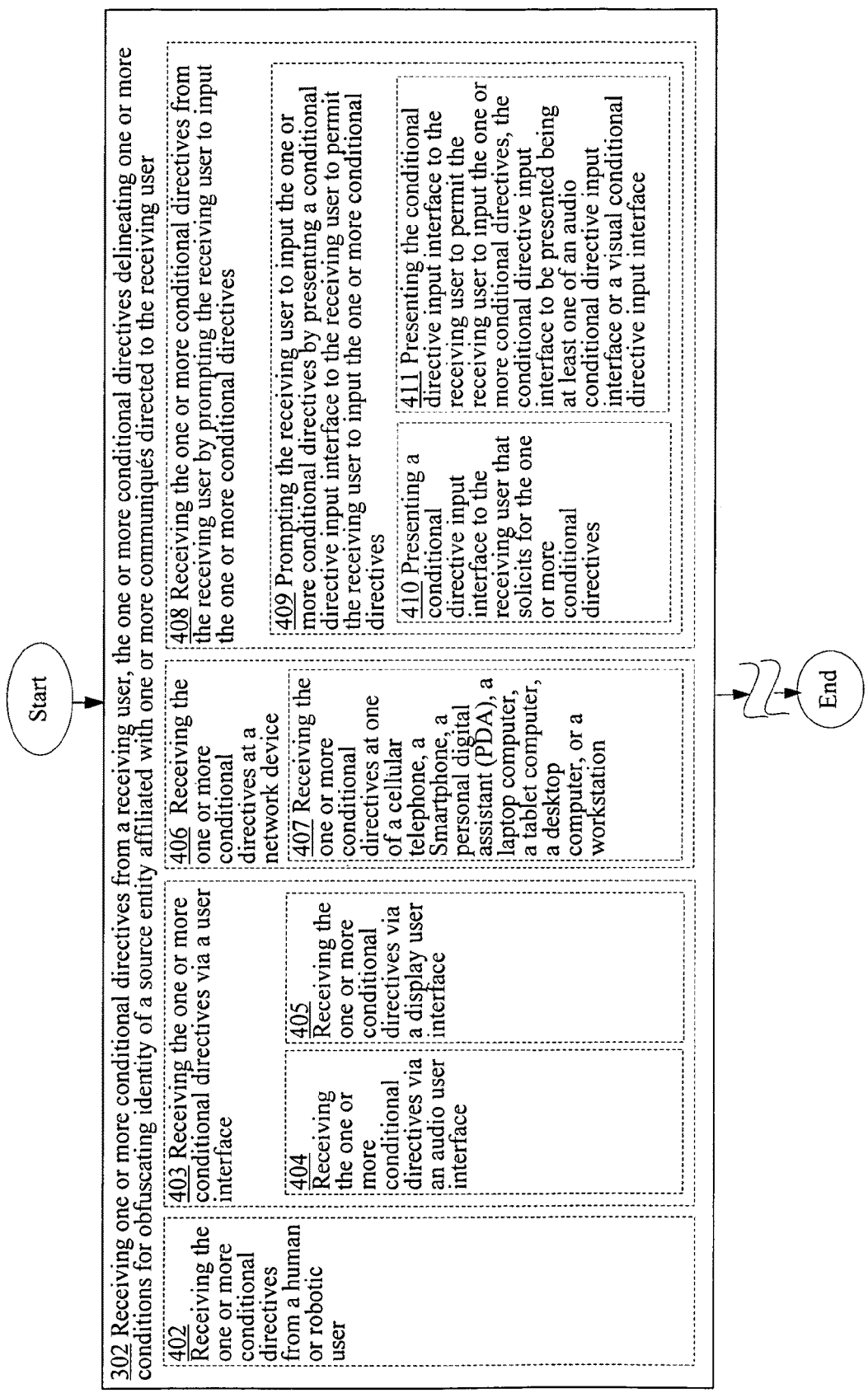
FIG. 4a is a high-level logic flowchart of a process depicting alternate implementations of the conditional directive receiving operation 302 of FIG. 3.

As will be further described herein, the conditional directive receiving operation 302 and the communiqué presenting operation 304 of FIG. 3 may be executed in a number of different ways in various alternative implementations. For example, FIGS. 4a, 4b, 4c, and 4d illustrate some of the various ways that the conditional directive receiving operation 302 of FIG. 3 may be executed in various alternative implementations. In some implementations, for example, the conditional directive receiving operation 302 of FIG. 3 may include an operation 402 for receiving the one or more conditional directives from a human or robotic user as depicted in FIG. 4a. For instance, the conditional directive receiving module 102 of the computing device 10 of FIGS. 1a and 1b receiving the one or more conditional directives 50 from a human or robotic user (an example of a robotic user includes, for example, an answering machine such as a server for an answering service).

In the same or different implementations, the conditional directive receiving operation 302 of FIG. 3 may include an operation 403 for receiving the one or more conditional directives via a user interface as further depicted in FIG. 4a. For instance, the conditional directive receiving module 102 of the computing device 10 of FIGS. 1a and 1b receiving the one or more conditional directives 50 via a user interface 107 (e.g., a display monitor such as a touchscreen, a keyboard or keypad, a mouse, a microphone/speaker system, and/or other hardware devices for interfacing with a human user).

Operation 403, in turn, may further include an operation 404 for receiving the one or more conditional directives via an audio user interface as further depicted in FIG. 4a. For instance, the conditional directive receiving module 102 of the computing device 10 of FIGS. 1a and 1b receiving the one or more conditional directives 50 via an audio user interface 110 (e.g., an audio system that includes a combination of microphone and speaker).

In the same or different implementations, operation 403 may include an operation 405 for receiving the one or more conditional directives via a display user interface as also depicted in FIG. 4a. For instance, the conditional directive receiving module 102 of the computing device 10 of FIGS. 1a and 1b receiving the one or more conditional directives 50 via a display user interface 112 (e.g., a display monitor including a touch screen, a keypad or keyboard, a mouse, and/or other hardware devices for visually interfacing with a human user).

In various implementations, the conditional directive receiving operation 302 of FIG. 3 may include an operation 406 for receiving the one or more conditional directives at a network device as depicted in FIG. 4a. For instance, when the computing device 10 of FIGS. 1a and 1b receives the one or more conditional directives 50 and the computing device 10 is a network device that may be designed to, for example, communicate through one or more communication networks 40 (e.g., a PTSN, a cellular network, WLAN, WiMAX, WMAN, and/or other types of communication networks 40).

In some implementations, operation 406 may include an operation 407 for receiving the one or more conditional directives at one of a cellular telephone, a Smartphone, a personal digital assistant (PDA), a laptop computer, a tablet computer, a desktop computer, or a workstation as depicted in FIG. 4a. For instance, when the computing device 10 of FIGS. 1a and 1b receives the one or more conditional directives 50 and the computing device 10 is any one of a cellular telephone, a Smartphone, a PDA, a laptop computer, a tablet computer, a desktop computer, or a workstation.

In some cases, the one or more conditional directives 50 that may be received through the conditional directive receiving operation 302 of FIG. 3 may be as a result of a prompting operation. For example, in some implementations the conditional directive receiving operation 302 of FIG. 3 may include an operation 408 for receiving the one or more conditional directives from the receiving user by prompting the receiving user to input the one or more conditional directives as depicted in FIG. 4a. For instance, the conditional directive receiving module 102 including the conditional directive prompting module 202 (see FIG. 2a) of the computing device 10 of FIGS. 1a and 1b receiving the one or more conditional directives 50 from the receiving user 32 by having the conditional directive prompting module 202 prompt (e.g., request, inquire, solicit, and so forth) the receiving user 32 to input the one or more conditional directives 50 via, for example, the user interface 107.

The receiving user 32 may be prompted to provide the one or more conditional directives 50 using various means in various alternative implementations. For example, in some implementations, operation 408 may further include an operation 409 for prompting the receiving user to input the one or more conditional directives by presenting a conditional directive input interface to the receiving user to permit the receiving user to input the one or more conditional directives as depicted in FIG. 4a. For instance, the conditional directive prompting module 202 including the conditional directive input interface presenting module 204 (see FIG. 2a) of the computing device 10 prompting the receiving user 32 to input the one or more conditional directives 50 by having the conditional directive input interface presenting module 204 present a conditional directive input interface (e.g., an interface that may be audibly presented through, for example, an audio system and/or visually presented through, for example, a display system) to the receiving user 32 to permit the receiving user 32 to input the one or more conditional directive 50.

In some implementations, operation 409 may further include an operation 410 for presenting a conditional directive input interface to the receiving user that solicits for the one or more conditional directives as depicted in FIG. 4a. For instance, the conditional directive input interface presenting module 204 of the computing device 10 presenting a conditional directive input interface to the receiving user 32 that solicits for the one or more conditional directives 50 (e.g., requests or asks for at least a portion of the one or more conditional directives 50). For example, the computing device 10 may request the receiving user 32 to provide the email addresses or phone numbers of a source entity 20 whose communiqués need to be screened in order to obfuscate the identity of the source entity 20.

In the same or different implementations, operation 409 may include an operation 411 for presenting the conditional directive input interface to the receiving user to permit the receiving user to input the one or more conditional directives, the conditional directive input interface to be presented being at least one of an audio conditional directive input interface or a visual conditional directive input interface as further depicted in FIG. 4a. For instance, the conditional directive input interface presenting module 204 of the computing device 10 presenting the conditional directive input interface to the receiving user 32 to permit the receiving user 32 to input the one or more conditional directives 50, the conditional directive input interface to be presented being at least one of an audio conditional directive input interface (e.g., as presented through a microphone/speaker system) or a visual conditional directive input interface (e.g., as presented through a display monitor/keyboard/mouse system).

Figure 4B:
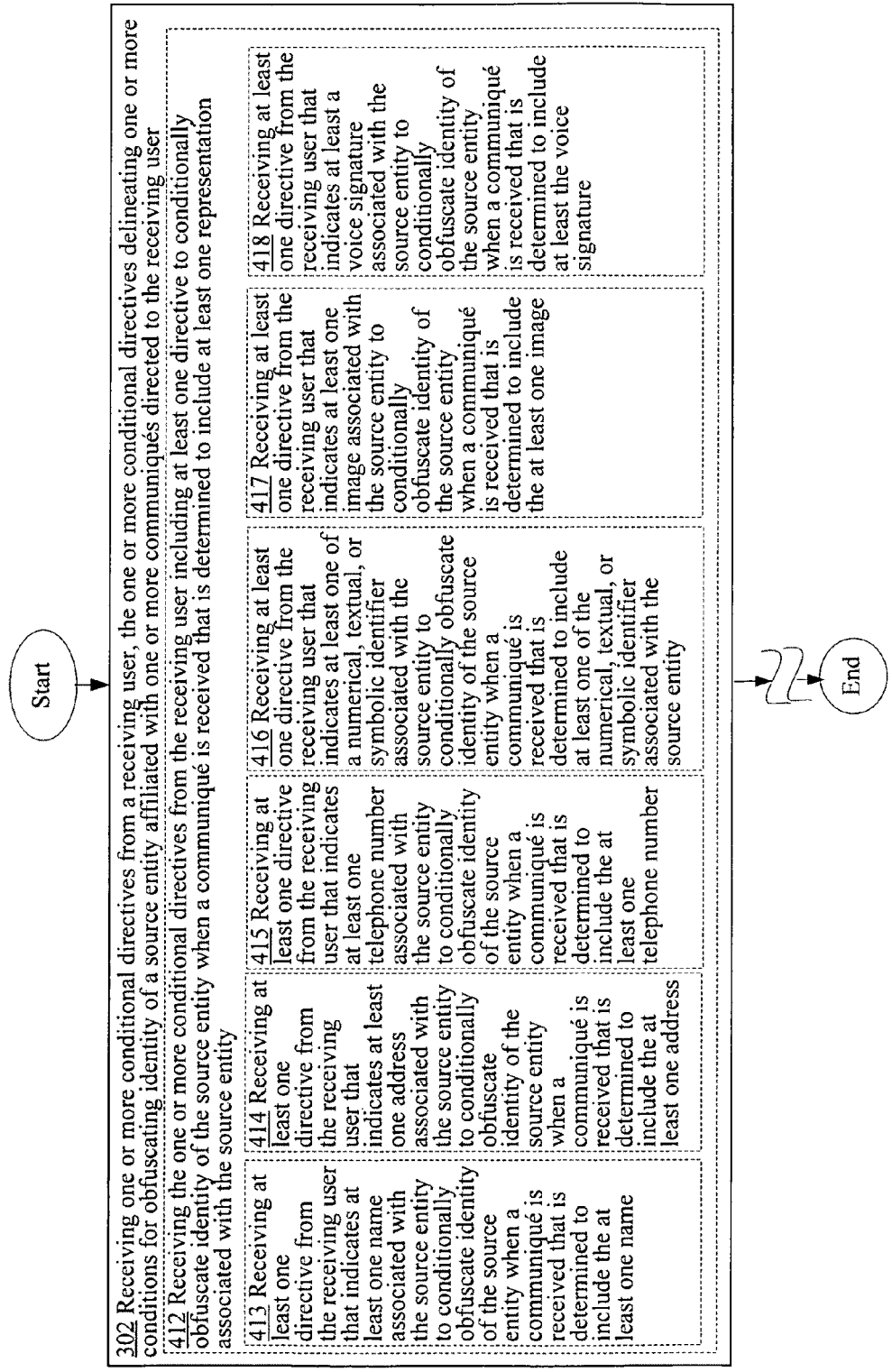
FIG. 4b is a high-level logic flowchart of a process depicting alternate implementations of the conditional directive operation 302 of FIG. 3.

The one or more conditional directives 50 that are received through the conditional directive receiving operation 302 of FIG. 3 may include a variety of directives for obfuscating the identity of a source entity 20 affiliated with a communiqué (e.g., first communiqué 52 of FIG. 1a) that is directed to the receiving user 32. For example, in some implementations, the conditional directive receiving operation 302 of FIG. 3 may include an operation 412 for receiving the one or more conditional directives from the receiving user including at least one directive to conditionally obfuscate identity of the source entity when a communiqué is received that is determined to include at least one representation associated with the source entity as depicted in FIG. 4b. For instance, the conditional directive receiving module 102 of the computing device 10 of FIGS. 1a and 1b receiving the one or more conditional directives 50 from the receiving user 32 including at least one directive to conditionally obfuscate (e.g., to conditionally disguise or hide) identity of the source entity 20 when a communiqué (e.g., a first communiqué 52 as depicted in FIG. 1a) is received that is determined to include at least one representation (e.g., an identifier) associated with the source entity 20.

As further depicted in FIG. 4b, operation 412 may further include one or more additional operations in various alternative implementations. For example, in some implementations, operation 412 may include an operation 413 for receiving at least one directive from the receiving user that indicates at least one name associated with the source entity to conditionally obfuscate identity of the source entity when a communiqué is received that is determined to include the at least one name as depicted in FIG. 4b. For instance, the conditional directive receiving module 102 of the computing device 10 of FIGS. 1a and 1b receiving at least one directive (e.g., conditional directive 50) from the receiving user 32 that indicates at least one name (e.g., a username, a website name, a business name, and/or a legal personal name) associated with the source entity 20 to conditionally obfuscate identity of the source entity 20 when a communiqué (e.g., an instant message) is received that is determined to include the at least one name.

In the same or different implementations, operation 412 may include an operation 414 for receiving at least one directive from the receiving user that indicates at least one address associated with the source entity to conditionally obfuscate identity of the source entity when a communiqué is received that is determined to include the at least one address as further depicted in FIG. 4b. For instance, the conditional directive receiving module 102 of the computing device 10 of FIGS. 1a and 1b receiving at least one directive from the receiving user 32 that indicates at least one address (e.g., email address, IP address, URL, and so forth) associated with the source entity 20 (e.g., an individual human user, a business, or a website) to conditionally obfuscate identity of the source entity 20 when a communiqué (e.g., an email message) is received that is determined to include the at least one address.

In the same or different implementations, operation 412 may include an operation 415 for receiving at least one directive from the receiving user that indicates at least one telephone number associated with the source entity to conditionally obfuscate identity of the source entity when a communiqué is received that is determined to include the at least one telephone number as further depicted in FIG. 4b. For instance, the conditional directive receiving module 102 of the computing device 10 of FIGS. 1a and 1b receiving at least one directive from the receiving user 32 that indicates at least one telephone number associated with the source entity 20 to conditionally obfuscate identity of the source entity 20 when a communiqué (e.g., a telephone call or a VoIP call) is received that is determined to include the at least one telephone number.

In the same or different implementations, operation 412 may include an operation 416 for receiving at least one directive from the receiving user that indicates at least one of a numerical, textual, or symbolic identifier associated with the source entity to conditionally obfuscate identity of the source entity when a communiqué is received that is determined to include at least one of the numerical, textual, or symbolic identifier associated with the source entity as further depicted in FIG. 4b. For instance, the conditional directive receiving module 102 of the computing device 10 of FIGS. 1a and 1b receiving at least one directive from the receiving user 32 that indicates at least one of a numerical, textual, or symbolic identifier associated with the source entity 20 to conditionally obfuscate identity of the source entity 20 when a communiqué (e.g., an email message, a text message, or an IM) is received that is determined to include at least one of the numerical (e.g., social security number), textual (e.g., employment position), or symbolic (e.g., business logo) identifier associated with the source entity 20.

In the same or different implementations, operation 412 may include an operation 417 for receiving at least one directive from the receiving user that indicates at least one image associated with the source entity to conditionally obfuscate identity of the source entity when a communiqué is received that is determined to include the at least one image as further depicted in FIG. 4b. For instance, the conditional directive receiving module 102 of the computing device 10 of FIGS. 1a and 1b receiving at least one directive from the receiving user 32 that indicates (e.g., includes) at least one image (e.g., digital facial image) associated with the source entity 20 to conditionally obfuscate identity of the source entity 20 when a communiqué (e.g., a video call or an email message) is received that is determined to include the at least one image.

In the same or different implementations, operation 412 may include an operation 418 for receiving at least one directive from the receiving user that indicates at least a voice signature associated with the source entity to conditionally obfuscate identity of the source entity when a communiqué is received that is determined to include at least the voice signature as depicted in FIG. 4b. For instance, the conditional directive receiving module 102 of the computing device 10 of FIGS. 1a and 1b receiving at least one directive from the receiving user 32 that indicates at least a voice signature (e.g., voice characteristics such as voice pattern, tone, accent, and so forth) associated with the source entity 20 to conditionally obfuscate identity of the source entity 20 when a communiqué e.g., a telephone call) is received that is determined to include at least the voice signature.

A "voice signature," which may also be referred to as "voice biometrics," relates to the particular combination of characteristics associated with a person's voice that makes each person's voice distinctive. For example, a typical individual will have a voice with certain distinct characteristics (e.g., speech pattern, pitch, tone, rhythm, accent, and so forth) that make that individual's voice relatively unique. By changing the voice signature (e.g., modifying voice characteristics such as tone, pitch, and so forth) of an individual's voice, the voice may be disguised and the identity of the individual that the original voice belongs to may be obfuscated.

Figure 4C:
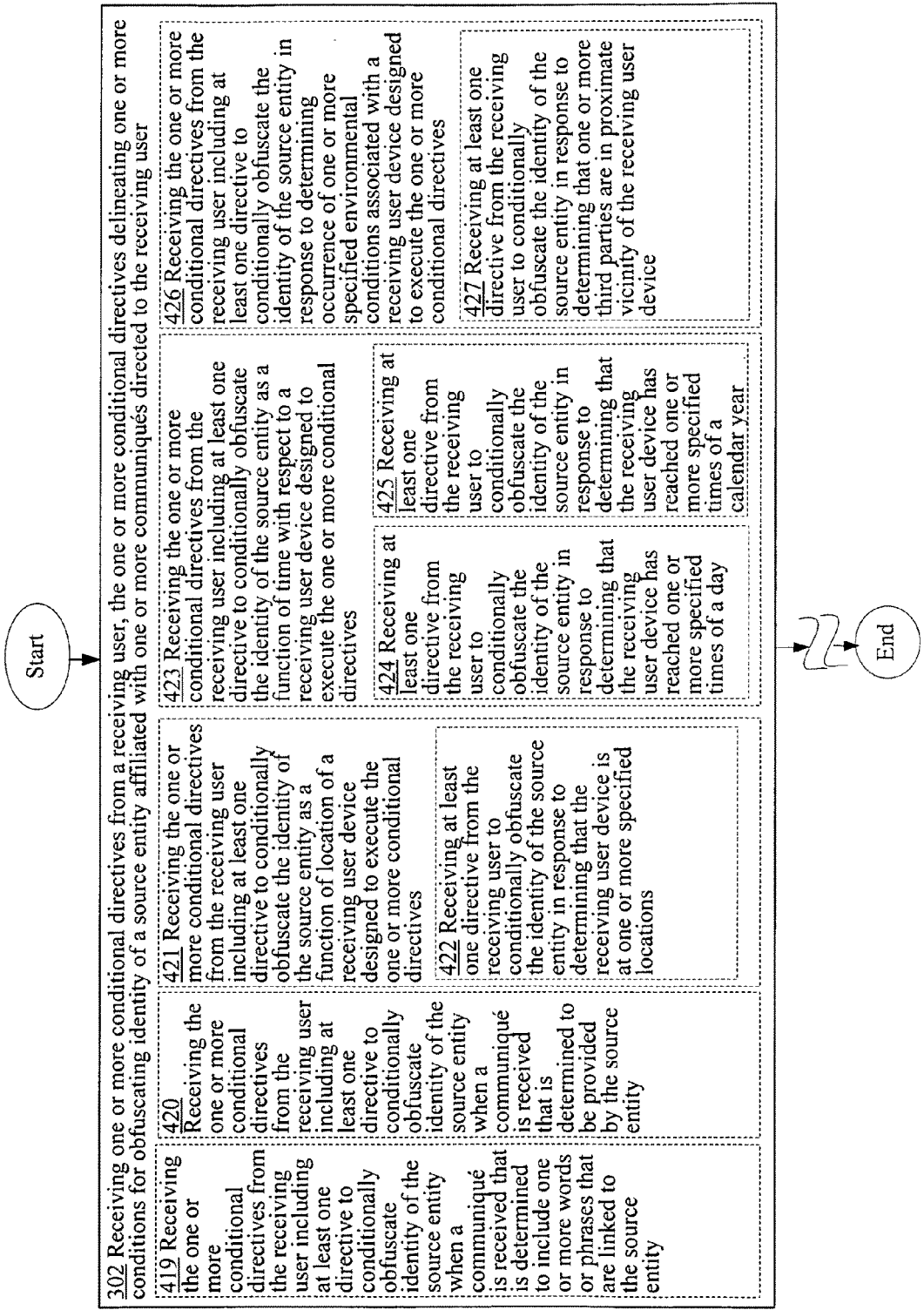
FIG. 4c is a high-level logic flowchart of a process depicting alternate implementations of the conditional directive receiving operation 302 of FIG. 3.

In some implementations, the conditional directive receiving operation 302 of FIG. 3 may include an operation 419 for receiving the one or more conditional directives from the receiving user including at least one directive to conditionally obfuscate identity of the source entity when a communiqué is received that is determined to include one or more words or phrases that are linked to the source entity as depicted in FIG. 4c. For instance, the conditional directive receiving module 102 of the computing device 10 of FIGS. 1a and 1b receiving the one or more conditional directives 50 from the receiving user 32 including at least one directive to conditionally obfuscate identity of the source entity 20 (e.g., a business or a person) when a communiqué is received that is determined to include one or more words or phrases (e.g., a business or personal motto) that are linked to the source entity 20.

In the same or different implementations, the conditional directive receiving operation 302 of FIG. 3 may include an operation 420 for receiving the one or more conditional directives from the receiving user including at least one directive to conditionally obfuscate identity of the source entity when a communiqué is received that is determined to be provided by the source entity as further depicted in FIG. 4c. For instance, the conditional directive receiving module 102 of the computing device 10 of FIGS. 1a and 1b receiving the one or more conditional directives 50 from the receiving user 32 including at least one directive to conditionally obfuscate identity of the source entity 20 when a communiqué (e.g., the first communiqué 52 as depicted in FIG. 1a) is received that is determined to be provided by the source entity 20. In other words, the conditional directive receiving module 102 of the computing device 10 receiving a conditional directive 50 that directs the obfuscation of the identity of the source entity 20 associated with a received communiqué only when the received communiqué, such as the first communiqué 52 of FIG. 1a, indicates that the source entity 20 was, for example, the originator or sender of the received communiqué (e.g., the first communiqué 52 of FIG. 1a).

In the same or different implementations, the conditional directive receiving operation 302 of FIG. 3 may include an operation 421 for receiving the one or more conditional directives from the receiving user including at least one directive to conditionally obfuscate the identity of the source entity as a function of location of a receiving user device designed to execute the one or more conditional directives as further depicted in FIG. 4c. For instance, the conditional directive receiving module 102 of the computing device 10 of FIGS. 1a and 1b receiving the one or more conditional directives 50 from the receiving user 32 including at least one directive to conditionally obfuscate the identity of the source entity 20 as a function of location of a receiving user device (e.g., the computing device 10 of FIGS. 1a and 1b) that is designed to execute the one or more conditional directives 50. In other words, and as a further illustration, if the computing device 10 of FIGS. 1a and 1b is executing the one or more conditional directives 50, then the conditional directive receiving module 102 of the computing device 10 receiving at least one directive from the receiving user 32 that directs or instructs the computing device 10 to conditionally obfuscate the identity of the source entity 20 affiliated with a received communiqué (e.g., first communiqué 52 of FIG. 1a) only when the computing device 10 is at one or more particular locations (or is not at the one or more particular locations).

In some implementations, operation 421 may further include an operation 422 for receiving at least one directive from the receiving user to conditionally obfuscate the identity of the source entity in response to determining that the receiving user device is at one or more specified locations as further depicted in FIG. 4c. For instance, the conditional directive receiving module 102 of the computing device 10 of FIGS. 1a and 1b receiving at least one directive from the receiving user 32 to conditionally obfuscate the identity of the source entity 20 in response to determining that the receiving user device (e.g., computing device 10) is at one or more specified locations (e.g., the workplace or home of the receiving user 32).

In the same or different implementations, the conditional directive receiving operation 302 of FIG. 3 may include an operation 423 for receiving the one or more conditional directives from the receiving user including at least one directive to conditionally obfuscate the identity of the source entity as a function of time with respect to a receiving user device designed to execute the one or more conditional directives as further depicted in FIG. 4c. For instance, the conditional directive receiving module 102 of the computing device 10 of FIGS. 1a and 1b receiving the one or more conditional directives 50 from the receiving user 32 including at least one directive to conditionally obfuscate the identity of the source entity 20 as a function of time with respect to a receiving user device (e.g., computing device 10) designed to execute the one or more conditional directives 50. In other words, and as a further illustration, if the computing device 10 of FIGS. 1a and 1b is executing the one or more conditional directives 50, then the conditional directive receiving module 102 of the computing device 10 receiving at least one directive from the receiving user 32 that directs or instructs the computing device 10 to conditionally obfuscate the identity of the source entity 20 affiliated with a received communiqué (e.g., first communiqué 52 of FIG. 1a) only when the computing device 10 has reached one or more specific points or intervals in time.

In some implementations, operation 423 may further include an operation 424 for receiving at least one directive from the receiving user to conditionally obfuscate the identity of the source entity in response to determining that the receiving user device has reached one or more specified times of a day as further depicted in FIG. 4c. For instance, the conditional directive receiving module 102 of the computing device 10 of FIGS. 1a and 1b receiving at least one directive from the receiving user 32 to conditionally obfuscate the identity of the source entity 20 in response to determining that the receiving user device (e.g., the computing device 10 of FIGS. 1a and 1b) has reached one or more specified times of a day (e.g., between 6 PM and 8 AM).

In the same or different implementations, operation 423 may include an operation 425 for receiving at least one directive from the receiving user to conditionally obfuscate the identity of the source entity in response to determining that the receiving user device has reached one or more specified times of a calendar year as further depicted in FIG. 4c. For instance, the conditional directive receiving module 102 of the computing device 10 of FIGS. 1a and 1b receiving at least one directive from the receiving user 32 to conditionally obfuscate the identity of the source entity 20 in response to determining that the receiving user device has reached one or more specified times of a calendar year (e.g., December 24th and 25th).

In the same or different implementations, the conditional directive receiving operation 302 of FIG. 3 may include an operation 426 for receiving the one or more conditional directives from the receiving user including at least one directive to conditionally obfuscate the identity of the source entity in response to determining occurrence of one or more specified environmental conditions associated with a receiving user device designed to execute the one or more conditional directives as further depicted in FIG. 4c. For instance, the conditional directive receiving module 102 of the computing device 10 of FIGS. 1a and 1b receiving the one or more conditional directives 50 from the receiving user 32 including at least one directive to conditionally obfuscate the identity of the source entity 20 in response to determining occurrence of one or more specified environmental conditions associated with a receiving user device (e.g., the computing device 10 of FIGS. 1a and 1b) designed to execute the one or more conditional directives 50. In other words, and as a further illustration, if the computing device 10 of FIGS. 1a and 1b is executing the one or more conditional directives 50, then the conditional directive receiving module 102 of the computing device 10 receiving at least one directive from the receiving user 32 that directs or instructs the computing device 10 to conditionally obfuscate the identity of the source entity 20 affiliated with a received communiqué (e.g., first communiqué 52 of FIG. 1a) only when the computing device 10 has determined that certain environmental conditions exists. Such environmental conditions include, for example, the computing device 10 (e.g., the receiving user device) being at a particular event such as a wedding or business, or the presence or absence of a particular third party in the vicinity of the computing device 10 of FIGS. 1a and 1b. In some cases, the computing device 10 may determine that such environmental conditions exists based on information (e.g., information that indicates that the computing device 10 is at a particular event on, for example, a particular day) provided from a variety of sources including, for example, via microblog posting by the receiving user 32 or via information provided by the receiving user 32 through a personal data management application such as Microsoft Outlook.

In some cases, operation 426 may further include an operation 427 for receiving at least one directive from the receiving user to conditionally obfuscate the identity of the source entity in response to determining that one or more third parties are in proximate vicinity of the receiving user device as further depicted in FIG. 4c. For instance, the conditional directive receiving module 102 of the computing device 10 of FIGS. 1a and 1b receiving at least one directive from the receiving user 32 to conditionally obfuscate the identity of the source entity 20 in response to determining that one or more third parties are in proximate vicinity of the receiving user device (e.g., computing device 10 of FIGS. 1a and 1b).

Figure 4D:
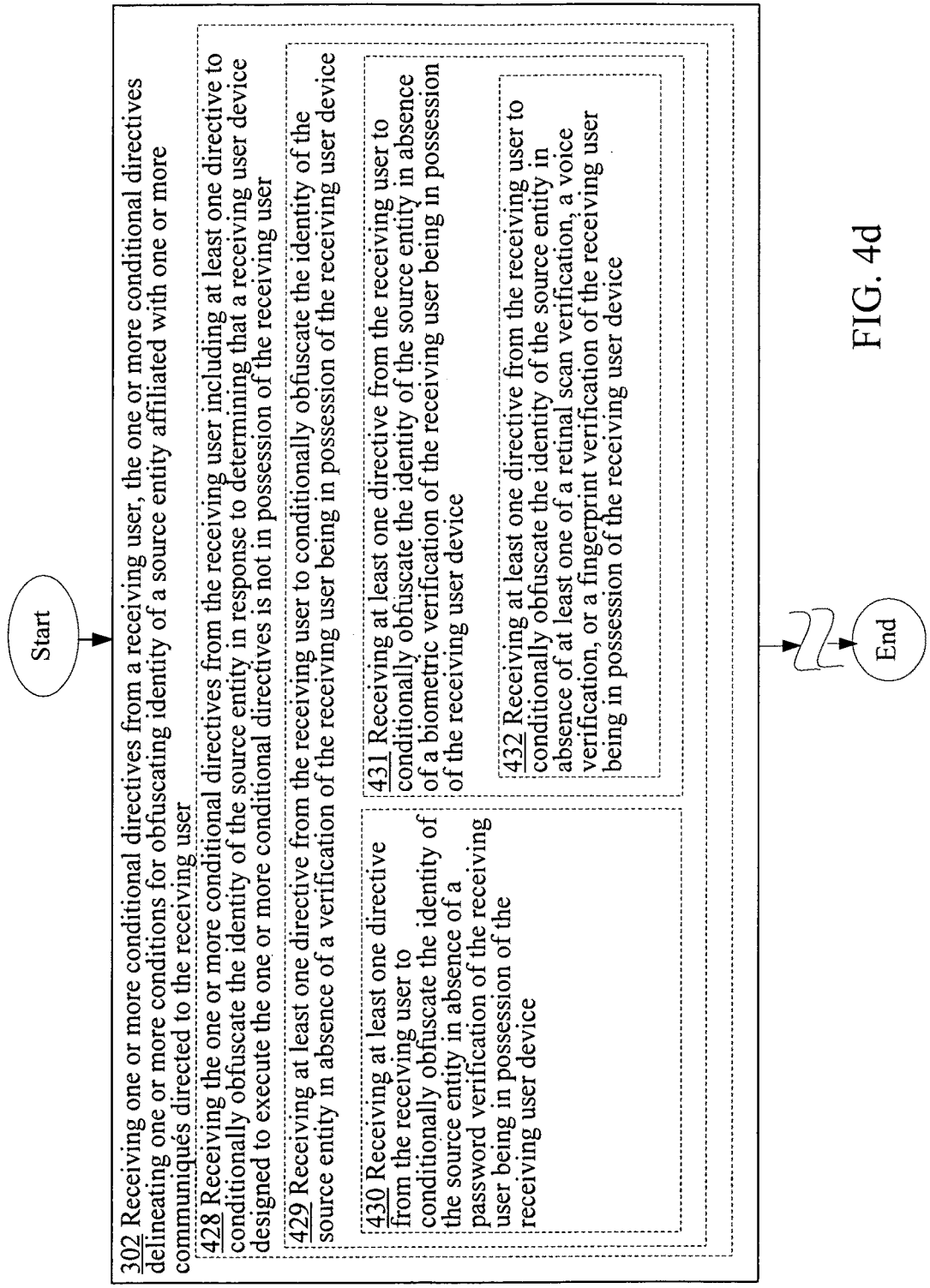
FIG. 4d is a high-level logic flowchart of a process depicting alternate implementations of the conditional directive receiving operation 302 of FIG. 3.

In various implementations, the conditional directive receiving operation 302 of FIG. 3 may include an operation 428 for receiving the one or more conditional directives from the receiving user including at least one directive to conditionally obfuscate the identity of the source entity in response to determining that a receiving user device designed to execute the one or more conditional directives is not in possession of the receiving user as depicted in FIG. 4d. For instance, the conditional directive receiving module 102 of the computing device 10 of FIGS. 1a and 1b receiving the one or more conditional directives 50 from the receiving user 32 including at least one directive to conditionally obfuscate the identity of the source entity 20 in response to determining that a receiving user device (e.g., the computing device 10 of FIGS. 1a and 1b) designed to execute the one or more conditional directives 50 is not in possession of the receiving user 32. In other words, and as a further illustration, if the computing device 10 of FIGS. 1a and 1b is executing the one or more conditional directives 50, then the conditional directive receiving module 102 of the computing device 10 receiving at least one directive from the receiving user 32 that directs or instructs the computing device 10 to conditionally obfuscate the identity of the source entity 20 affiliated with a received communiqué (e.g., first communiqué 52 of FIG. 1a) only when the computing device 10 has determined that the computing device 10 is not possessed by the receiving user 32.

As further illustrated in FIG. 4d, operation 428 may further include one or more additional operations in various alternative implementations. For example, in some implementations, operation 428 may include an operation 429 for receiving at least one directive from the receiving user to conditionally obfuscate the identity of the source entity in absence of a verification of the receiving user being in possession of the receiving user device. For instance, the conditional directive receiving module 102 of the computing device 10 of FIGS. 1a and 1b receiving at least one directive from the receiving user 32 to conditionally obfuscate the identity of the source entity 20 in absence of a verification (e.g., confirmation or proof) of the receiving user 32 being in possession of the receiving user device (e.g., the computing device 10 of FIGS. 1a and 1b).

In some cases, operation 429 may further include an operation 430 for receiving at least one directive from the receiving user to conditionally obfuscate the identity of the source entity in absence of a password verification of the receiving user being in possession of the receiving user device as depicted in FIG. 4d. For instance, the conditional directive receiving module 102 of the computing device 10 of FIGS. 1a and 1b receiving at least one directive from the receiving user 32 to conditionally obfuscate the identity of the source entity 20 in absence of a password verification of the receiving user 32 being in possession of the receiving user device (e.g., the computing device 10 of FIGS. 1a and 1b). In other words, and as a further illustration, if the computing device 10 of FIGS. 1a and 1b is executing the one or more conditional directives 50, then the conditional directive receiving module 102 of the computing device 10 receiving at least one directive from the receiving user 32 that directs or instructs the computing device 10 to conditionally obfuscate the identity of the source entity 20 affiliated with a received communiqué (e.g., first communiqué 52 of FIG. 1a) only when the computing device 10 has determined that no password that verifies the possession of the computing device 10 by the receiving user 32 has been provided.

In the same or different implementations, operation 429 may include an operation 431 for receiving at least one directive from the receiving user to conditionally obfuscate the identity of the source entity in absence of a biometric verification of the receiving user being in possession of the receiving user device as further depicted in FIG. 4d. For instance, the conditional directive receiving module 102 of the computing device 10 of FIGS. 1a and 1b receiving at least one directive from the receiving user 32 to conditionally obfuscate the identity of the source entity 20 in absence of a biometric verification of the receiving user 32 being in possession of the receiving user device (e.g., the computing device 10 of FIGS. 1a and 1b). In other words, and as a further illustration, if the computing device 10 of FIGS. 1a and 1b is executing the one or more conditional directives 50, then the conditional directive receiving module 102 of the computing device 10 receiving at least one directive from the receiving user 32 that directs or instructs the computing device 10 to conditionally obfuscate the identity of the source entity 20 affiliated with a received communiqué (e.g., first communiqué 52 of FIG. 1a) only when the computing device 10 has determined that no biometric verification of the receiving user 32 having possession of the computing device 10 has been provided.

In some implementations, operation 431 may further include an operation 432 for receiving at least one directive from the receiving user to conditionally obfuscate the identity of the source entity in absence of at least one of a retinal scan verification, a voice verification, or a fingerprint verification of the receiving user being in possession of the receiving user device as depicted in FIG. 4d. For instance, the conditional directive receiving module 102 of the computing device 10 of FIGS. 1a and 1b receiving at least one directive from the receiving user 32 to conditionally obfuscate the identity of the source entity 20 in absence of at least one of a retinal scan verification, a voice verification, or a fingerprint verification of the receiving user 32 being in possession of the receiving user device (e.g., the computing device 10 of FIGS. 1a and 1b).

Figure 5A:
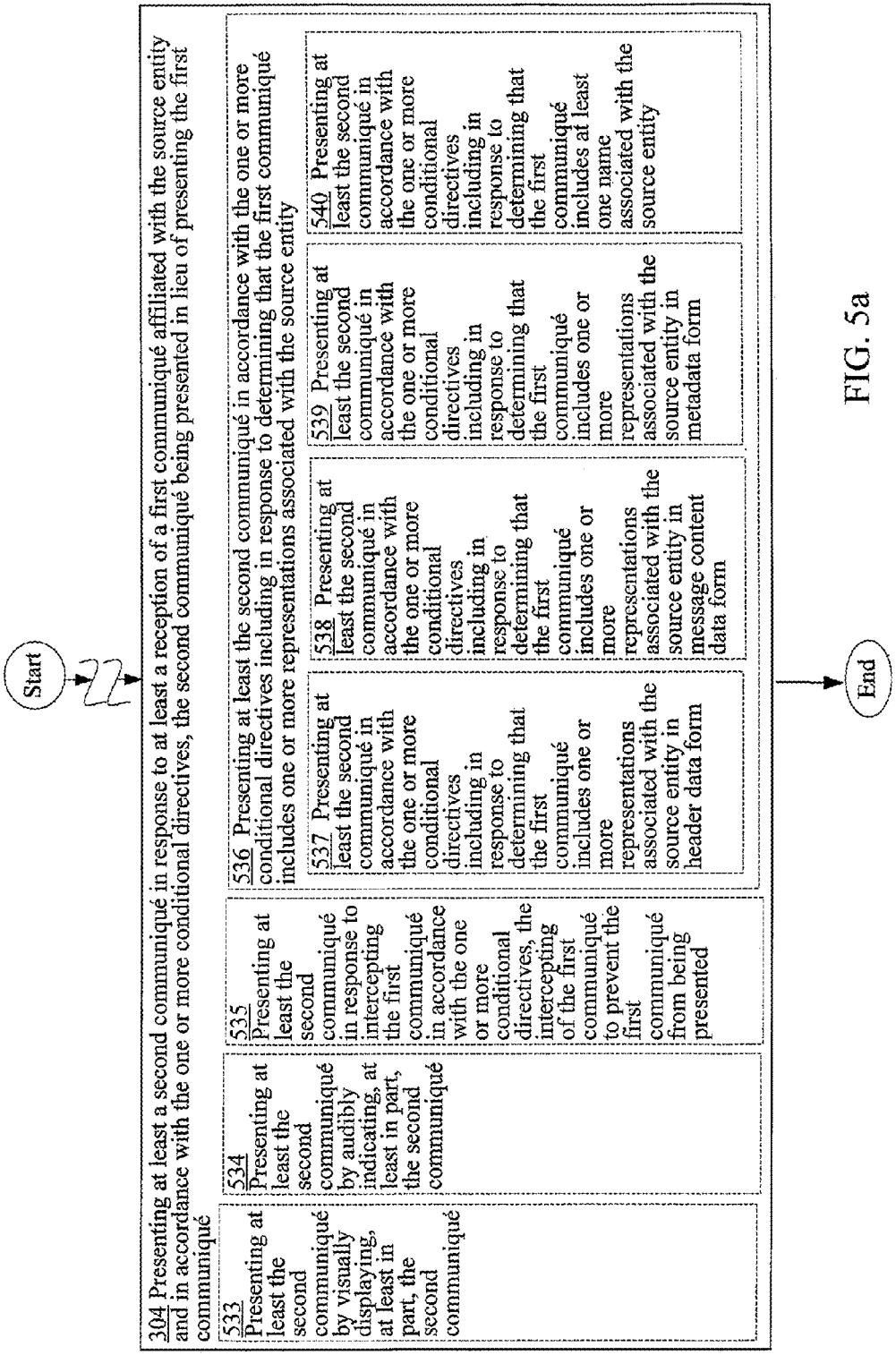
FIG. 5a is a high-level logic flowchart of a process depicting alternate implementations of the communiqué presenting operation 304 of FIG. 3.

Referring back to the communiqué presenting operation 304 of FIG. 3, the communiqué presenting operation 304 similar to the conditional directive receiving operation 302 of FIG. 3 may be executed in a number of different ways in various alternative implementations as illustrated in FIGS. 5a, 5b, 5c, 5d, 5e, 5f, 5g, 5h, and 5i. For example, in some implementations, the communiqué presenting operation 304 of FIG. 3 may include an operation 533 for presenting at least the second communiqué by visually displaying, at least in part, the second communiqué as depicted in FIG. 5a. For instance, the communiqué presenting module 104 including the visual displaying module 206 (see FIG. 2b) of the computing device 10 of FIGS. 1a and 1b presenting at least the second communiqué 54 by having the visual displaying module 206 visually displaying, at least in part, the second communiqué 54 via the display user interface 112 (e.g., a display monitor such as a touchscreen or a liquid crystal display—LCD).

In the same or different implementations, the communiqué presenting operation 304 of FIG. 3 may include an operation 534 for presenting at least the second communiqué by audibly indicating, at least in part, the second communiqué as depicted in FIG. 5a. For instance, the communiqué presenting module 104 including the audio indicating module 208 (see FIG. 2b) of the computing device 10 of FIGS. 1a and 1b presenting at least the second communiqué 54 by audibly indicating, at least in part, the second communiqué 54 via the audio user interface 110 (e.g., audio system including speaker/microphone system).

In the same or different implementations, the communiqué presenting operation 304 of FIG. 3 may include an operation 535 for presenting at least the second communiqué in response to intercepting the first communiqué in accordance with the one or more conditional directives, the intercepting of the first communiqué to prevent the first communiqué from being presented as further depicted in FIG. 5a. For instance, the communiqué presenting module 104 including the communiqué intercepting module 210 (see FIG. 2b) of the computing device 10 of FIGS. 1a and 1b presenting at least the second communiqué 54 in response to intercepting the first communiqué 52 in accordance with the one or more conditional directives 50, the intercepting of the first communiqué 52 to prevent the first communiqué 52 from being presented through, for example, the computing device 10.

In the same or different implementations, the communiqué presenting operation 304 of FIG. 3 may include an operation 536 for presenting at least the second communiqué in accordance with the one or more conditional directives including in response to determining that the first communiqué includes one or more representations associated with the source entity as depicted in FIG. 5a. For instance, the communiqué presenting module 104 including the source entity representation inclusion determining module 212 (see FIG. 2b) of the computing device 10 of FIGS. 1a and 1b presenting at least the second communiqué 54 in accordance with the one or more conditional directives 50 including in response to the source entity representation inclusion determining module 212 determining that the first communiqué 52 includes one or more representations (e.g., identifiers) associated with the source entity 20.

Figure 5B:
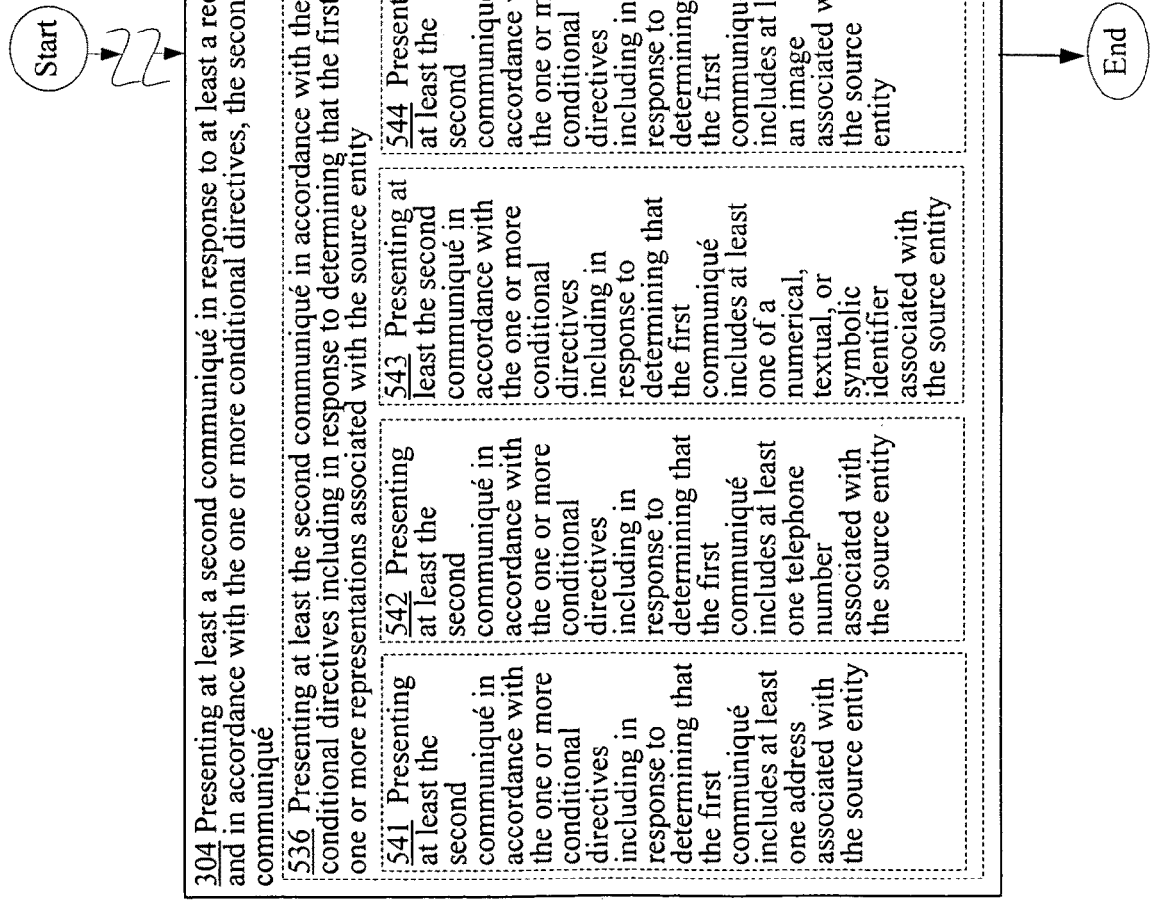
FIG. 5b is a high-level logic flowchart of a process depicting alternate implementations of the communiqué presenting operation 304 of FIG. 3.

As further illustrated in FIGS. 5a and 5b, operation 536 may include one or more additional operations in various alternative implementations. For example, in some implementations, operation 536 may include an operation 537 for presenting at least the second communiqué in accordance with the one or more conditional directives including in response to determining that the first communiqué includes one or more representations associated with the source entity in header data form as depicted in FIG. 5a. For instance, the communiqué presenting module 104 including the source entity representation inclusion determining module 212 (see FIG. 2b) of the computing device 10 of FIGS. 1a and 1b presenting at least the second communiqué 54 in accordance with the one or more conditional directives 50 including in response to source entity representation inclusion determining module 212 determining that the first communiqué 52 includes one or more representations associated with the source entity 20 in header data form.

In the same or different implementations, operation 536 may include an operation 538 for presenting at least the second communiqué in accordance with the one or more conditional directives including in response to determining that the first communiqué includes one or more representations associated with the source entity in message content data form as depicted in FIG. 5a. For instance, the communiqué presenting module 104 including the source entity representation inclusion determining module 212 (see FIG. 2b) of the computing device 10 of FIGS. 1a and 1b presenting at least the second communiqué 54 in accordance with the one or more conditional directives 50 including in response to source entity representation inclusion determining module 212 determining that the first communiqué 52 includes one or more representations associated with the source entity 20 in message content data form. The "message content data" described above is in reference to the data embodying the message being transmitted through the first communiqué 52. For example, if the first communiqué 52 is a text message, then the message content data, in this case, would be the textual/numerical data that may be included in the text message.

In the same or different implementations, operation 536 may include an operation 539 for presenting at least the second communiqué in accordance with the one or more conditional directives including in response to determining that the first communiqué includes one or more representations associated with the source entity in metadata form as depicted in FIG. 5a. For instance, the communiqué presenting module 104 including the source entity representation inclusion determining module 212 (see FIG. 2b) of the computing device 10 of FIGS. 1a and 1b presenting at least the second communiqué 54 in accordance with the one or more conditional directives 50 including in response to source entity representation inclusion determining module 212 determining that the first communiqué 52 includes one or more representations associated with the source entity 20 in metadata form.

In the same or different implementations, operation 536 may include an operation 540 for presenting at least the second communiqué in accordance with the one or more conditional directives including in response to determining that the first communiqué includes at least one name associated with the source entity as depicted in FIG. 5a. For instance, the communiqué presenting module 104 including the source entity name inclusion determining module 214 (see FIG. 2b) of the computing device 10 of FIGS. 1a and 1b presenting at least the second communiqué 54 in accordance with the one or more conditional directives 50 including in response to the source entity name inclusion determining module 214 determining that the first communiqué 52 includes at least one name (e.g., username, website name, business name, legal name, job title, and so forth) associated with the source entity 20.

In the same or different implementations, operation 536 may include an operation 541 for presenting at least the second communiqué in accordance with the one or more conditional directives including in response to determining that the first communiqué includes at least one address associated with the source entity as depicted in FIG. 5b. For instance, the communiqué presenting module 104 including the source entity address inclusion determining module 216 (see FIG. 2b) of the computing device 10 of FIGS. 1a and 1b presenting at least the second communiqué 54 in accordance with the one or more conditional directives 50 including in response to the source entity address inclusion determining module 216 determining that the first communiqué 52 includes at least one address (e.g., email address, IP address, URL, and so forth) associated with the source entity 20.

In the same or different implementations, operation 536 may include an operation 542 for presenting at least the second communiqué in accordance with the one or more conditional directives including in response to determining that the first communiqué includes at least one telephone number associated with the source entity as further depicted in FIG. 5b. For instance, the communiqué presenting module 104 including the source entity telephone number inclusion determining module 218 (see FIG. 2b) of the computing device 10 of FIGS. 1a and 1b presenting at least the second communiqué 54 in accordance with the one or more conditional directives 50 including in response to the source entity telephone number inclusion determining module 218 determining that the first communiqué 52 includes at least one telephone number associated with the source entity 20.

In the same or different implementations, operation 536 may include an operation 543 for presenting at least the second communiqué in accordance with the one or more conditional directives including in response to determining that the first communiqué includes at least one of a numerical, textual, or symbolic identifier associated with the source entity as depicted in FIG. 5b. For instance, the communiqué presenting module 104 including the source entity identifier inclusion determining module 220 (see FIG. 2b) of the computing device 10 of FIGS. 1a and 1b presenting at least the second communiqué 54 in accordance with the one or more conditional directives 50 including in response to the source entity identifier inclusion determining module 220 determining that the first communiqué 52 includes at least one of a numerical (e.g., social security number), textual (e.g., business motto), or symbolic (e.g., business or personal logo) identifier associated with the source entity 20.

In the same or different implementations, operation 536 may include an operation 544 for presenting at least the second communiqué in accordance with the one or more conditional directives including in response to determining that the first communiqué includes at least an image associated with the source entity as further depicted in FIG. 5b. For instance, the communiqué presenting module 104 including the source entity image inclusion determining module 222 (see FIG. 2b) of the computing device 10 of FIGS. 1a and 1b presenting at least the second communiqué 54 in accordance with the one or more conditional directives 50 including in response to the source entity image inclusion determining module 222 determining that the first communiqué 52 includes at least an image (e.g., a digital facial image, a iconic figure, and so forth) associated with the source entity 20.

In the same or different implementations, operation 536 may include an operation 545 for presenting at least the second communiqué in accordance with the one or more conditional directives including in response to determining that the first communiqué includes at least a voice signature associated with the source entity as depicted in FIG. 5b. For instance, the communiqué presenting module 104 including the source entity voice signature inclusion determining module 224 (see FIG. 2b) of the computing device 10 of FIGS. 1a and 1b presenting at least the second communiqué 54 in accordance with the one or more conditional directives 50 including in response to the source entity voice signature inclusion determining module 224 determining that the first communiqué 52 includes at least a voice signature (e.g., voice data that may be characterized by a particular voice signature) associated with the source entity 20.

In some implementations, the communiqué presenting operation 304 of FIG. 3 may include an operation 546 for presenting at least the second communiqué in accordance with the one or more conditional directives including in response to determining that the first communiqué includes at least one or more words or phrases identified as being associated with the source entity as further depicted in FIG. 5b. For instance, the communiqué presenting module 104 including the source entity associated word/phrase inclusion determining module 226 (see FIG. 2b) of the computing device 10 of FIGS. 1a and 1b presenting at least the second communiqué 54 in accordance with the one or more conditional directives 50 including in response to the source entity associated work/phrase inclusion determining module 226 determining that the first communiqué 52 includes at least one or more words or phrases (e.g., personal or business motto) identified as being associated with the source entity 20.

In the same or different implementations, the communiqué presenting operation 304 of FIG. 3 may include an operation 547 for presenting at least the second communiqué in accordance with the one or more conditional directives including in response to determining that the first communiqué was provided by the source entity as further depicted in FIG. 5b. For instance, the communiqué presenting module 104 including the source entity provision determining module 228 (see FIG. 2b) of the computing device 10 of FIGS. 1a and 1b presenting at least the second communiqué 54 in accordance with the one or more conditional directives 50 including in response to the source entity provision determining module 228 determining that the first communiqué 52 was provided by the source entity 20.

Figure 5C:
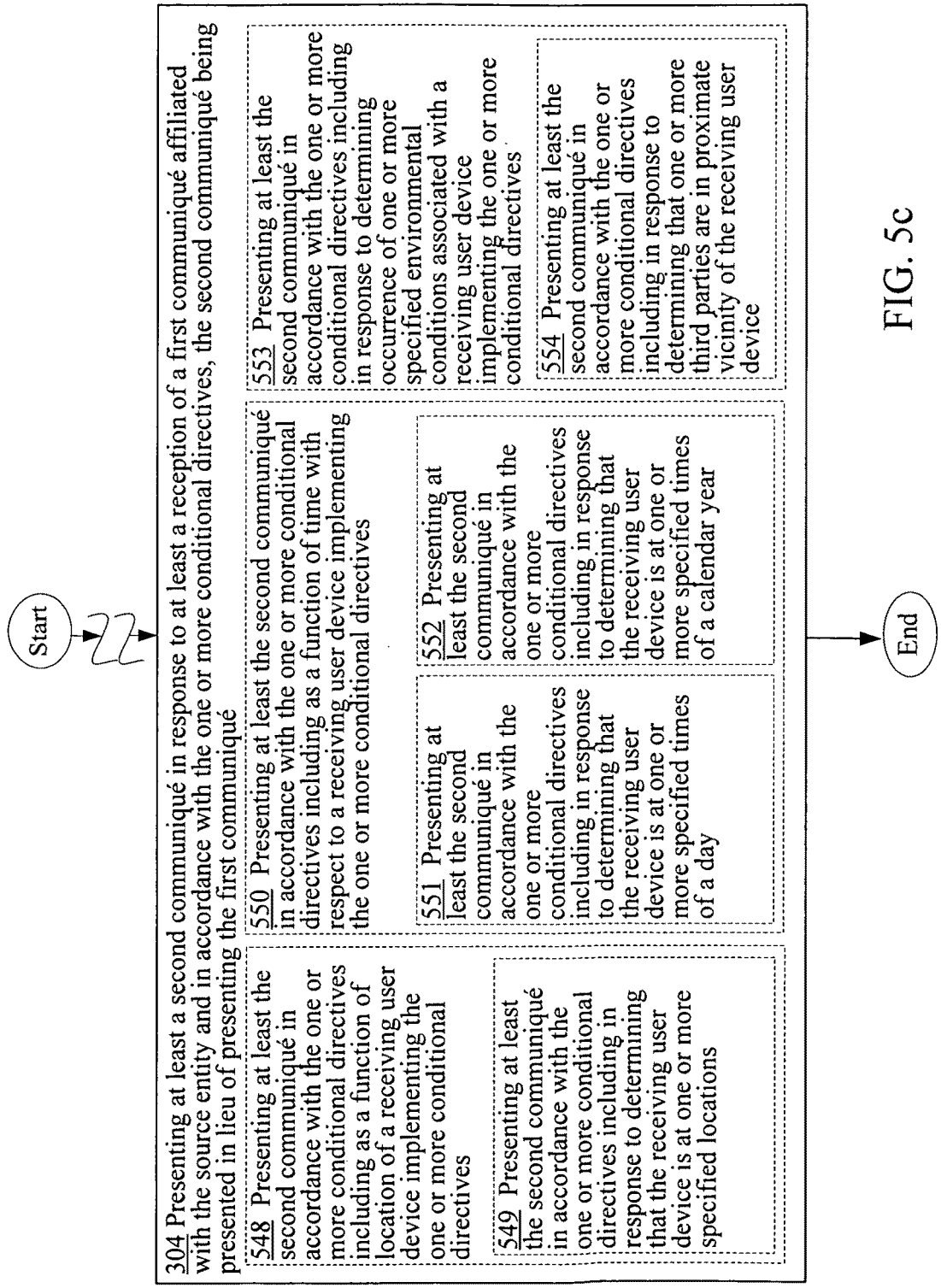
FIG. 5c is a high-level logic flowchart of a process depicting alternate implementations of the communiqué presenting operation 304 of FIG. 3.

In the same or different implementations, the communiqué presenting operation 304 of FIG. 3 may include an operation 548 for presenting at least the second communiqué in accordance with the one or more conditional directives including as a function of location of a receiving user device implementing the one or more conditional directives as depicted in FIG. 5c. For instance, the communiqué presenting module 104 including the receiving user device location determining module 230 (see FIG. 2b) of the computing device 10 of FIGS. 1a and 1b presenting at least the second communiqué 54 in accordance with the one or more conditional directives 50 including as a function of location (e.g., as determined by, for example, the receiving user device location determining module 230 using, for example, GPS provided data) of a receiving user device (e.g., the computing device 10 of FIGS. 1a and 1b) implementing the one or more conditional directives 50.

In some cases, operation 548 may, in turn, include an operation 549 for presenting at least the second communiqué in accordance with the one or more conditional directives including in response to determining that the receiving user device is at one or more specified locations as further depicted in FIG. 5c. For instance, the communiqué presenting module 104 including the receiving user device location determining module 230 (see FIG. 2b) of the computing device 10 of FIGS. 1a and 1b presenting at least the second communiqué 54 in accordance with the one or more conditional directives 50 including in response to the receiving user device location determining module 230 determining that the receiving user device (e.g., the computing device 10 of FIGS. 1a and 1b) is at one or more specified locations (e.g., one or more locations specified by, for example, the receiving user 32 as locations where the computing device 10 should obfuscate the identity of the source entity 20 affiliated with the first communiqué 52).

In various implementations, the communiqué presenting operation 304 of FIG. 3 may include an operation 550 for presenting at least the second communiqué in accordance with the one or more conditional directives including as a function of time with respect to a receiving user device implementing the one or more conditional directives as further, depicted in FIG. 5c. For instance, the communiqué presenting module 104 including the receiving user device time determining module 232 (see FIG. 2b) of the computing device 10 of FIGS. 1a and 1b presenting at least the second communiqué 54 in accordance with the one or more conditional directives 50 including as a function of time (e.g., as determined by, for example, the receiving user device time determining module 232) with respect to a receiving user device (e.g., the computing device 10 of FIGS. 1a and 1b) implementing the one or more conditional directives 50.

In some implementations, operation 550 may further include an operation 551 for presenting at least the second communiqué in accordance with the one or more conditional directives including in response to determining that the receiving user device is at one or more specified times of a day as further depicted in FIG. 5c. For instance, the communiqué presenting module 104 including the receiving user device time determining module 232 (see FIG. 2b) of the computing device 10 of FIGS. 1a and 1b presenting at least the second communiqué 54 in accordance with the one or more conditional directives 50 including in response to the receiving user device time determining module 232 determining that the receiving user device is at or has reached one or more specified times of a day (e.g., between 8 AM and 5 PM).

In the same or different implementations, operation 550 may further include an operation 552 for presenting at least the second communiqué in accordance with the one or more conditional directives including in response to determining that the receiving user device is at one or more specified times of a calendar year as depicted in FIG. 5c. For instance, the communiqué presenting module 104 including the receiving user device time determining module 232 of the computing device 10 of FIGS. 1a and 1b presenting at least the second communiqué 54 in accordance with the one or more conditional directives 50 including in response to the receiving user device time determining module 232 determining that the receiving user device (e.g., computing device 10) is at or has reached one or more specified times of a calendar year.

In the same or different implementations, the communiqué presenting operation 304 of FIG. 3 may include an operation 553 for presenting at least the second communiqué in accordance with the one or more conditional directives including in response to determining occurrence of one or more specified environmental conditions associated with a receiving user device implementing the one or more conditional directives as further depicted in FIG. 5c. For instance, the communiqué presenting module 104 including the receiving user device environmental condition determining module 234 (see FIG. 2b) of the computing device 10 of FIGS. 1a and 1b presenting at least the second communiqué 54 in accordance with the one or more conditional directives 50 including in response to the receiving user device environmental condition determining module 234 determining occurrence of one or more specified environmental conditions (e.g., as specified by the receiving user 32) associated with a receiving user device (e.g., the computing device 10) implementing the one or more conditional directives 50.

In some cases, operation 553 may further include an operation 554 for presenting at least the second communiqué in accordance with the one or more conditional directives including in response to determining that one or more third parties are in proximate vicinity of the receiving user device as further depicted in FIG. 5c. For instance, the communiqué presenting module 104 including the receiving user device third party proximity determining module 236 (see FIG. 2b) of the computing device 10 of FIGS. 1a and 1b presenting at least the second communiqué 54 in accordance with the one or more conditional directives 50 including in response to the receiving user device third party proximity determining module 236 determining that one or more third parties are in proximate vicinity (e.g., within five to ten feet) of the receiving user device (e.g., the computing device 10). Such a determination may be made based on data provided by a variety of sources. For example, data provided through microblog entries as entered by the receiving user 32, data entered by the receiving user 32 through a personal data management application such as Microsoft Outlook, or data provided by an audio device (e.g., microphone) or an imaging device (e.g., a digital camera or a webcam), and using, for example, a voice recognition application 170 or a facial recognition application 172 to determine whether a particular third party is in the proximate vicinity of the receiver user device.

Figure 5D:
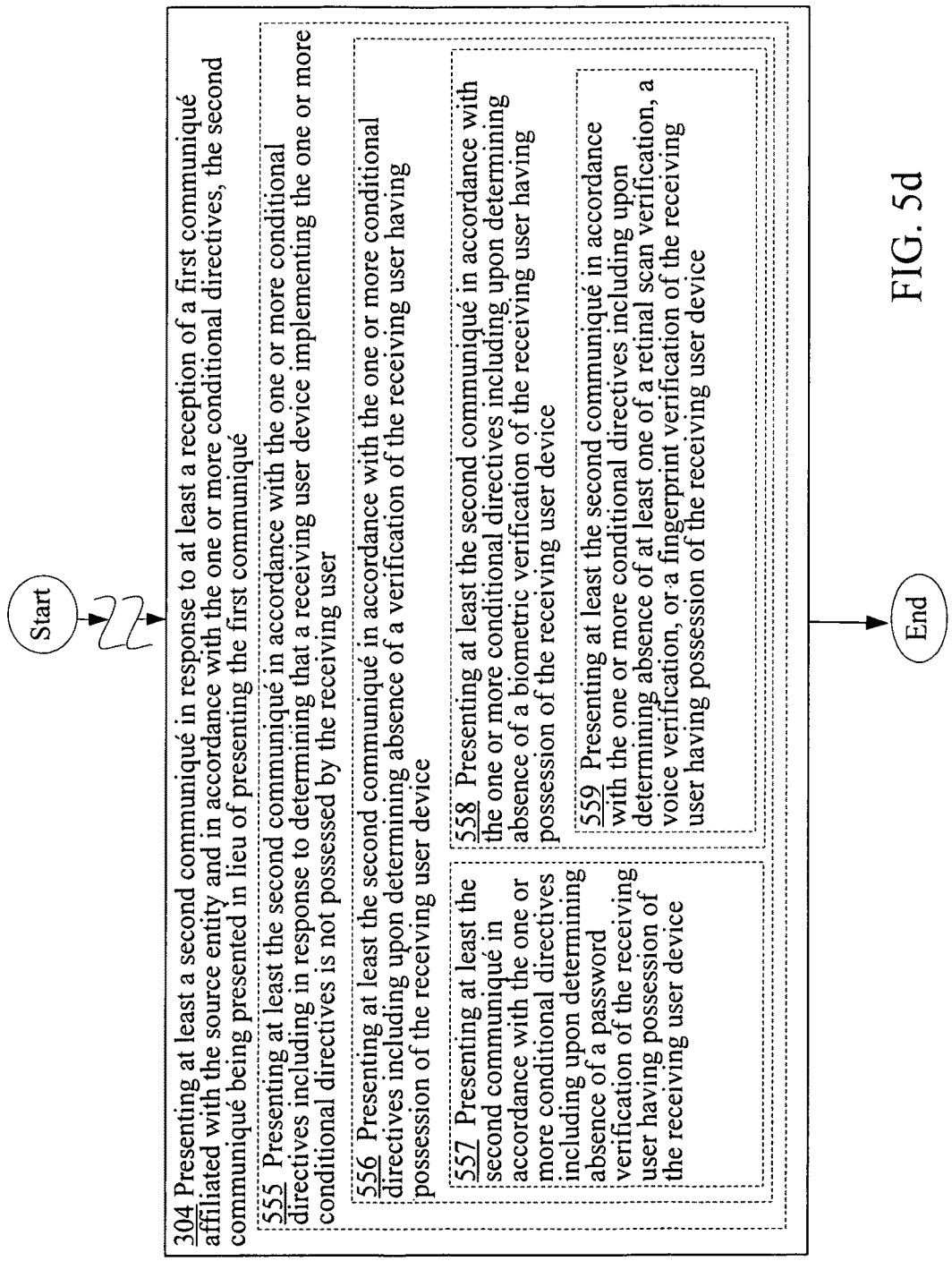
FIG. 5d is a high-level logic flowchart of a process depicting alternate implementations of the communiqué presenting operation 304 of FIG. 3.

In various implementations, the communiqué presenting operation 304 of FIG. 3 may include an operation 555 for presenting at least the second communiqué in accordance with the one or more conditional directives including in response to determining that a receiving user device implementing the one or more conditional directives is not possessed by the receiving user as depicted in FIG. 5d. For instance, the communiqué presenting module 104 including the receiving user device possession determining module 238 (see FIG. 2b) of the computing device 10 presenting at least the second communiqué 54 in accordance with the one or more conditional directives 50 including in response to the receiving user device possession determining module 238 determining that a receiving user device (e.g., computing device 10) implementing the one or more conditional directives 50 is not possessed (e.g., not held) by the receiving user 32.

In some cases, operation 555 may further include an operation 556 for presenting at least the second communiqué in accordance with the one or more conditional directives including upon determining absence of a verification of the receiving user having possession of the receiving user device as further depicted in FIG. 5d. For instance, the communiqué presenting module 104 including the receiving user device possession verification determining module 240 (see FIG. 2b) of the computing device 10 presenting at least the second communiqué 54 in accordance with the one or more conditional directives 50 including upon the receiving user device possession verification determining module 240 determining absence of a verification of the receiving user 32 having possession of the receiving user device (e.g., computing device 10 of FIGS. 1a and 1b).

Operation 556, in turn, may further include one or more additional operations in various alternative implementations. For example, in some implementations, operation 556 may further include an operation 557 for presenting at least the second communiqué in accordance with the one or more conditional directives including upon determining absence of a password verification of the receiving user having possession of the receiving user device as depicted in FIG. 5d. For instance, the communiqué presenting module 104 including the receiving user device possession password verification determining module 241 (see FIG. 2b) of the computing device 10 presenting at least the second communiqué 54 in accordance with the one or more conditional directives 50 including upon the receiving user device possession password verification determining module 241 determining absence of a password verification of the receiving user 32 having possession of the receiving user device (e.g., computing device 10). In other words, the one or more conditional directives 50 may instruct the computing device 10 to present the second communiqué 54, in lieu of the first communiqué 52, upon the receiving user device possession password verification determining module 241 determining that a proper password has not yet been provided that verifies that the computing device 10 is in the possession of the receiving user 32.

In the same or different implementations, operation 556 may also include an operation 558 for presenting at least the second communiqué in accordance with the one or more conditional directives including upon determining absence of a biometric verification of the receiving user having possession of the receiving user device as further depicted in FIG. 5d. For instance, the communiqué presenting module 104 including the receiving user device possession biometric verification determining module 242 (see FIG. 2b) of the computing device 10 presenting at least the second communiqué 54 in accordance with the one or more conditional directives 50 including upon the receiving user device possession biometric verification determining module 242 determining absence of a biometric verification of the receiving user 32 having possession of the receiving user device (e.g., computing device 10).

In some cases, operation 558 may, in turn, include an operation 559 for presenting at least the second communiqué in accordance with the one or more conditional directives including upon determining absence of at least one of a retinal scan verification, a voice verification, or a fingerprint verification of the receiving user having possession of the receiving user device as depicted in FIG. 5d. For instance, the communiqué presenting module 104 including the receiving user device possession biometric verification determining module 242 (see FIG. 2b) of the computing device 10 of FIGS. 1a and 1b presenting at least the second communiqué 54 in accordance with the one or more conditional directives 50 including upon the receiving user device possession biometric verification determining module 242 determining absence of at least one of a retinal scan verification, a voice verification, or a fingerprint verification of the receiving user 32 having possession of the receiving user device (e.g., the computing device 10).

Figure 5E:
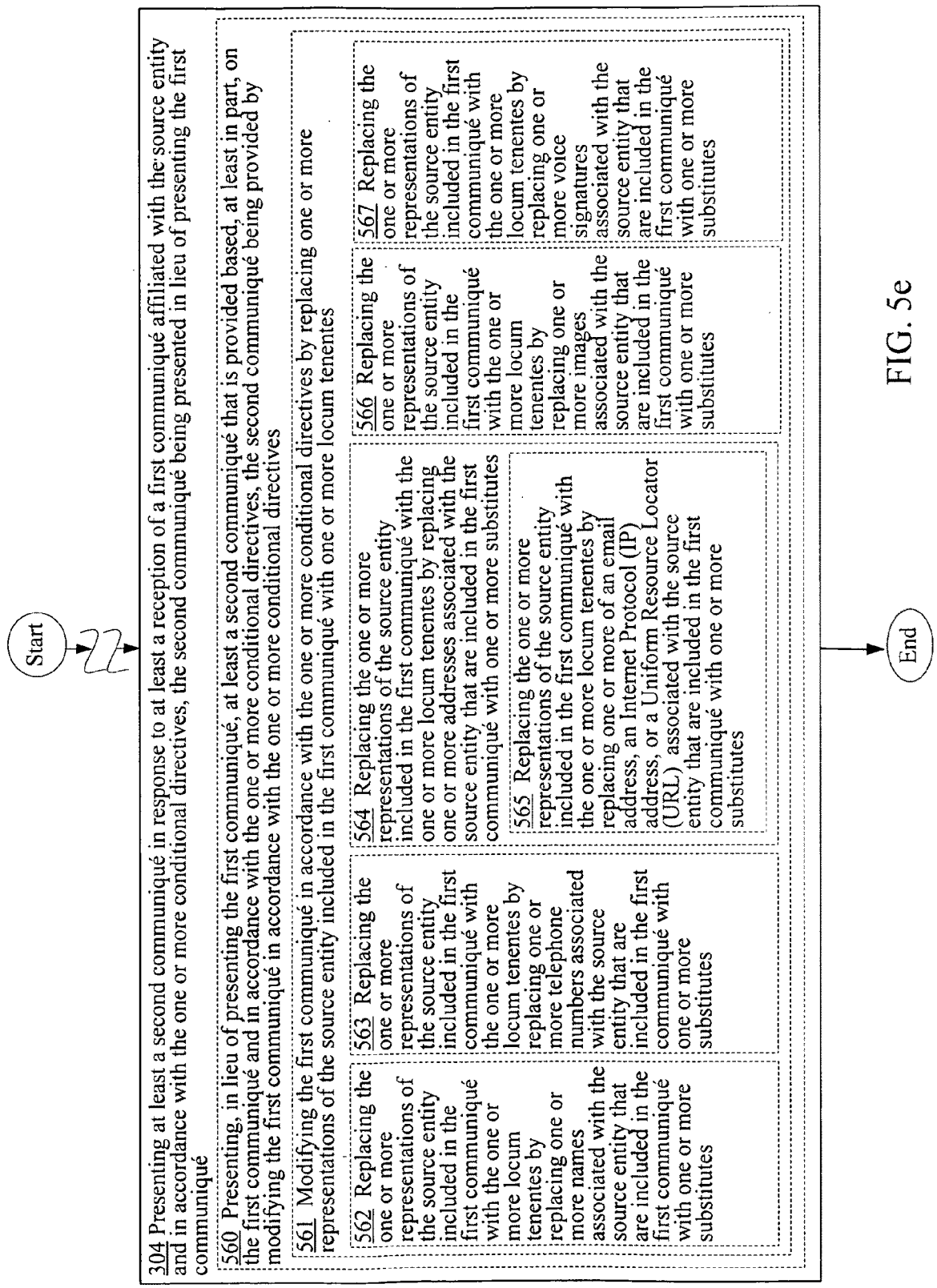
FIG. 5e is a high-level logic flowchart of a process depicting alternate implementations of the communiqué presenting operation 304 of FIG. 3.

In various implementations, the second communiqué 54 that may be presented through the communiqué presenting operation 304 of FIG. 3 may be provided by modifying the first communiqué 52. For example, the communiqué presenting operation 304 of FIG. 3 in some implementations may include an operation 560 for presenting, in lieu of presenting the first communiqué, at least a second communiqué that is provided based, at least in part, on the first communiqué and in accordance with the one or more conditional directives, the second communiqué being provided by modifying the first communiqué in accordance with the one or more conditional directives as depicted in FIG. 5e. For instance, the communiqué presenting module 104 including the communiqué modifying module 244 (see FIG. 2c) of the computing device 10 of FIGS. 1a and 1b presenting, in lieu of presenting the first communiqué 52, at least a second communiqué 54 that is provided based, at least in part, on the first communiqué 52 and in accordance with the one or more conditional directives 50, the second communiqué 54 being provided by the communiqué modifying module 244 modifying (e.g., altering, revising, adjusting, or amending) the first communiqué 52 in accordance with the one or more conditional directives 50.

As further illustrated in FIG. 5e, the first communiqué 52 may be modified in various alternative ways in various alternative implementations. For example, in some implementations, operation 560 may include an operation 561 for modifying the first communiqué in accordance with the one or more conditional directives by replacing one or more representations of the source entity included in the first communiqué with one or more locum tenentes as further depicted in FIG. 5e. For instance, communiqué modifying module 244 including the representation replacing module 245 (see FIG. 2c) of the computing device 10 of FIGS. 1a and 1b modifying the first communiqué 52 in accordance with the one or more conditional directives 50 by having the representation replacing module 245 replacing one or more representations (e.g., identifiers) of the source entity 20 included in the first communiqué 52 with one or more locum tenentes (e.g., placeholders, substitutes, proxies, surrogates, and so forth).

In some cases, operation 561 may further include an operation 562 for replacing the one or more representations of the source entity included in the first communiqué with the one or more locum tenentes by replacing one or more names associated with the source entity that are included in the first communiqué with one or more substitutes as further depicted in FIG. 5e. For instance, the representation replacing module 245 including the name replacing module 246 (see FIG. 2c) of the computing device 10 of FIGS. 1a and 1b replacing the one or more representations of the source entity 20 included in the first communiqué 52 with the one or more locum tenentes by having the name replacing module 246 replacing one or more names (e.g., username, legal name, business or website name, and so forth) associated with the source entity 20 that are included in the first communiqué 52 with one or more substitutes (e.g., substitute names or replacement words, numbers, or symbols other than substitute names).

In the same or different implementations, operation 561 may include an operation 563 for replacing the one or more representations of the source entity included in the first communiqué with the one or more locum tenentes by replacing one or more telephone numbers associated with the source entity that are included in the first communiqué with one or more substitutes as further depicted in FIG. 5e. For instance, the representation replacing module 245 including the telephone number replacing module 247 (see FIG. 2c) of the computing device 10 of FIGS. 1a and 1b replacing the one or more representations of the source entity 20 included in the first communiqué 52 (e.g., a telephone call or a VoIP call) with the one or more locum tenentes by having the telephone number replacing module 247 replacing one or more telephone numbers associated with the source entity 20 that are included in the first communiqué 52 with one or more substitutes (e.g., substitute telephone numbers or replacement words, numbers, or symbols other than telephone numbers).

In the same or different implementations, operation 561 may include an operation 564 for replacing the one or more representations of the source entity included in the first communiqué with the one or more locum tenentes by replacing one or more addresses associated with the source entity that are included in the first communiqué with one or more substitutes as further depicted in FIG. 5e. For instance, the representation replacing module 245 including the address replacing module 248 (see FIG. 2c) of the computing device 10 of FIGS. 1a and 1b replacing the one or more representations of the source entity 20 included in the first communiqué 52 with the one or more locum tenentes by having the address replacing module 248 replacing one or more addresses (e.g., email addresses, URL, and so forth) associated with the source entity 20 that are included in the first communiqué 52 with one or more substitutes (e.g., substitute addresses or replacement words, numbers, or symbols other than substitute addresses).

Various types of addresses included in the first communiqué 52 may be replaced in operation 564 in various alternative implementations. For example, in some implementations, operation 564 may include an operation 565 for replacing the one or more representations of the source entity included in the first communiqué with the one or more locum tenentes by replacing one or more of an email address, an Internet Protocol (IP) address, or a Uniform Resource Locator (URL) associated with the source entity that are included in the first communiqué with one or more substitutes as further depicted in FIG. 5e. For instance, the representation replacing module 245 including the address replacing module 248 (see FIG. 2c) of the computing device 10 of FIGS. 1a and 1b replacing the one or more representations of the source entity 20 included in the first communiqué 52 with the one or more locum tenentes by having the address replacing module 248 replacing one or more of an email address, an Internet Protocol (IP) address, or a Uniform Resource Locator (URL) associated with the source entity 20 that are included in the first communiqué 52 with one or more substitutes.

In the same or different implementations, operation 561 may include an operation 566 for replacing the one or more representations of the source entity included in the first communiqué with the one or more locum tenentes by replacing one or more images associated with the source entity that are included in the first communiqué with one or more substitutes as further depicted in FIG. 5e. For instance, the representation replacing module 245 including the image replacing module 249 (see FIG. 2c) of the computing device 10 of FIGS. 1a and 1b replacing the one or more representations of the source entity 20 included in the first communiqué 52 with the one or more locum tenentes by having the image replacing module 249 replacing one or more images (e.g., digital images including facial images, iconic figures, and so forth) associated with the source entity 20 that are included in the first communiqué 52 with one or more substitutes (e.g., substitute images or replacement words, numbers, or symbols other than substitute images).

In the same or different implementations, operation 561 may include an operation 567 for replacing the one or more representations of the source entity included in the first communiqué with the one or more locum tenentes by replacing one or more voice signatures associated with the source entity that are included in the first communiqué with one or more substitutes as further depicted in FIG. 5e. For instance, the representation replacing module 245 including the voice signature replacing module 250 (see FIG. 2c) of the computing device 10 of FIGS. 1a and 1b replacing the one or more representations of the source entity 20 included in the first communiqué 52 (e.g., a telephone call, a video call, or a VoIP call) with the one or more locum tenentes by having the voice signature replacing module 250 replacing one or more voice signatures associated with the source entity 20 (e.g., a human source user 22) that are included in the first communiqué 52 with one or more substitutes (e.g., substitute voice signatures). A "voice signature" may be in reference to the distinct patterns of speech (e.g., tone, pitch, rhythm, accent, and so forth) that may be specific to each person's voice or speech.

Figure 5F:
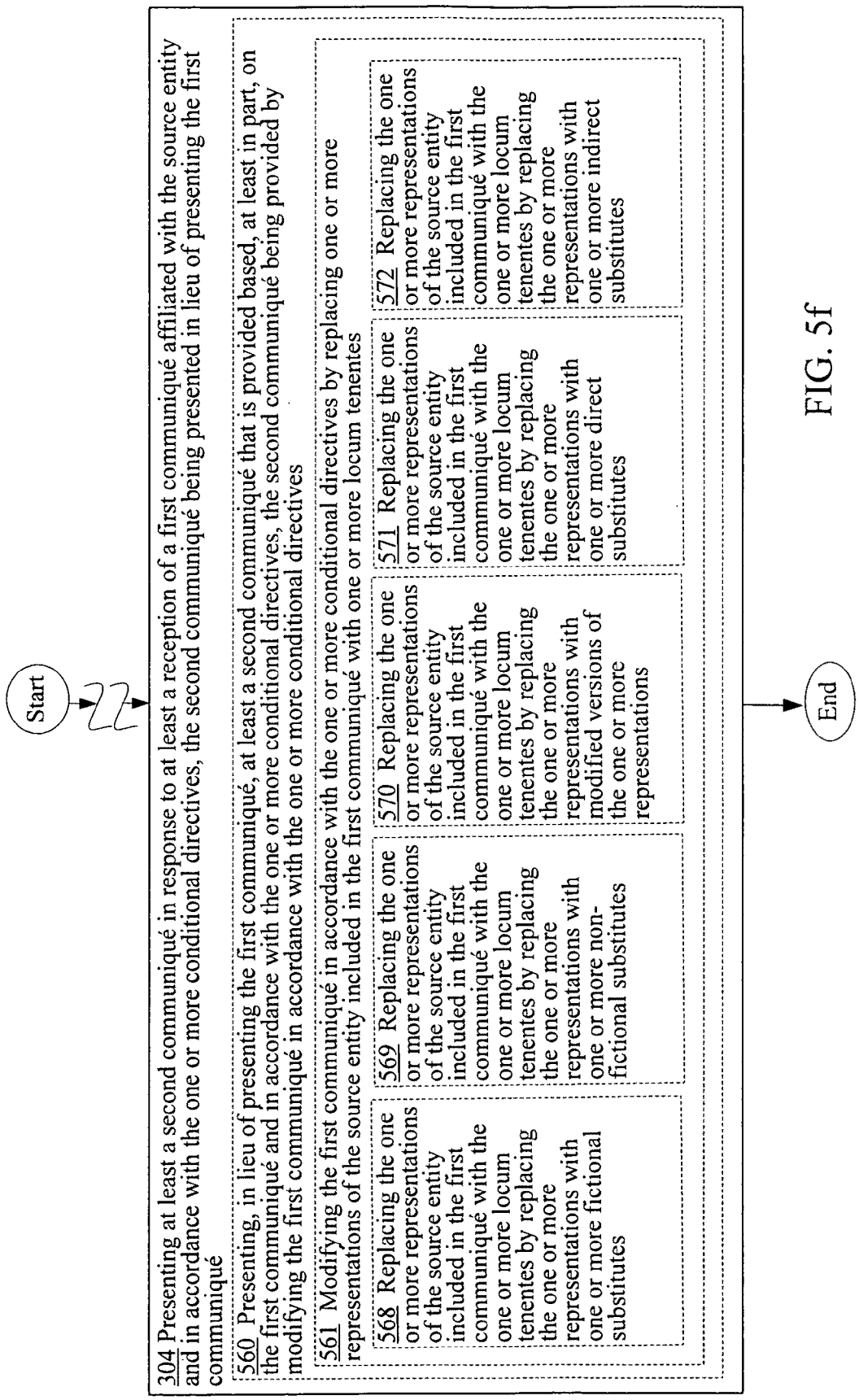
FIG. 5f is a high-level logic flowchart of a process depicting alternate implementations of the communiqué presenting operation 304 of FIG. 3.

In the same or different implementations, operation 561 may include an operation 568 for replacing the one or more representations of the source entity included in the first communiqué with the one or more locum tenentes by replacing the one or more representations with one or more fictional substitutes as depicted in FIG. 5f. For instance, the representation replacing module 245 of the computing device 10 of FIGS. 1a and 1b replacing the one or more representations (e.g., names, addresses, images, and so forth) of the source entity 20 included in the first communiqué 52 with the one or more locum tenentes by replacing the one or more representations with one or more fictional substitutes (e.g., replacing a name associated with the source entity 20 included in the first communiqué 52 with a fictional name that may have been previously provided by the receiving user 32 or provided by other means).

In the same or different implementations, operation 561 may include an operation 569 for replacing the one or more representations of the source entity included in the first communiqué with the one or more locum tenentes by replacing the one or more representations with one or more non-fictional substitutes as further depicted in FIG. 5f. For instance, the representation replacing module 245 of the computing device 10 of FIGS. 1a and 1b replacing the one or more representations of the source entity 20 included in the first communiqué 52 with the one or more locum tenentes by replacing the one or more representations (e.g., email addresses) with one or more non-fictional substitutes (e.g., actual email address of an unrelated third party).

In the same or different implementations, operation 561 may include an operation 570 for replacing the one or more representations of the source entity included in the first communiqué with the one or more locum tenentes by replacing the one or more representations with modified versions of the one or more representations as further depicted in FIG. 5f. For instance, the representation replacing module 245 of the computing device 10 of FIGS. 1a and 1b replacing the one or more representations of the source entity 20 included in the first communiqué 52 with the one or more locum tenentes by replacing the one or more representations (e.g., a telephone number including an area code) with modified versions of the one or more representations (e.g., the same telephone number but with a different area code).

In the same or different implementations, operation 561 may include an operation 571 for replacing the one or more representations of the source entity included in the first communiqué with the one or more locum tenentes by replacing the one or more representations with one or more direct substitutes as further depicted in FIG. 5f. For instance, the representation replacing module 245 of the computing device 10 of FIGS. 1a and 1b replacing the one or more representations of the source entity 20 included in the first communiqué 52 with the one or more locum tenentes by replacing the one or more representations (e.g., images) with one or more direct substitutes (e.g., substitute images).

In the same or different implementations, operation 561 may include an operation 572 for replacing the one or more representations of the source entity included in the first communiqué with the one or more locum tenentes by replacing the one or more representations with one or more indirect substitutes as depicted in FIG. 5f. For instance, the representation replacing module 245 of the computing device 10 of FIGS. 1a and 1b replacing the one or more representations of the source entity 20 included in the first communiqué 52 with the one or more locum tenentes by replacing the one or more representations (e.g., addresses associated with the source entity 20) with one or more indirect substitutes (e.g. substitute names instead of substitute addresses).

Figure 5G:
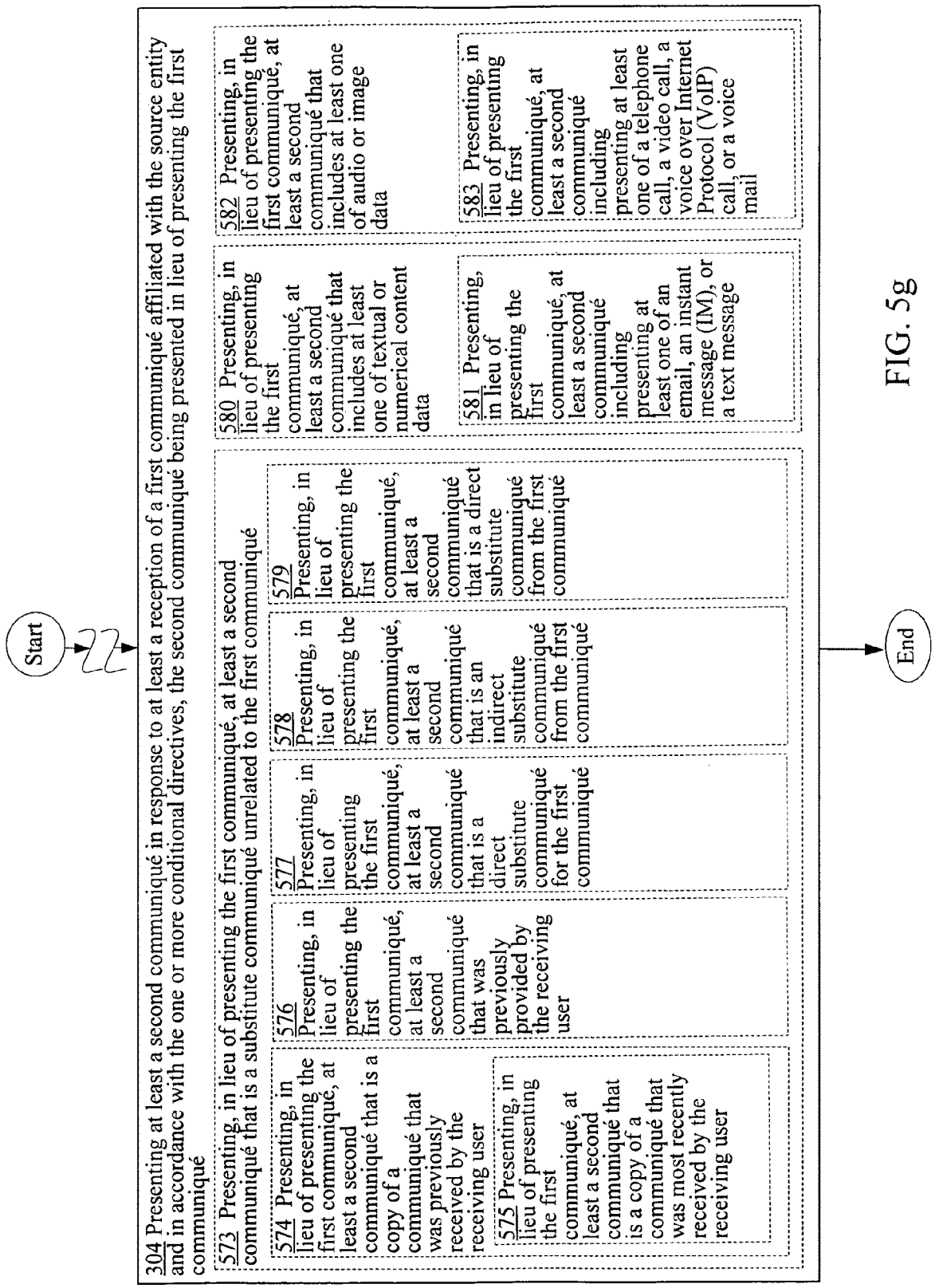
FIG. 5g is a high-level logic flowchart of a process depicting alternate implementations of the communiqué presenting operation 304 of FIG. 3.

In some cases, the second communiqué 54 presented through the communiqué presenting operation 304 of FIG. 3 may be a communiqué that is unrelated and distinct from the first communiqué 52 that is received. For example, in some implementations, the communiqué presenting operation 304 of FIG. 3 may include an operation 573 for presenting, in lieu of presenting the first communiqué, at least a second communiqué that is a substitute communiqué unrelated to the first communiqué as depicted in FIG. 5g. For instance, the communiqué presenting module 104 including the substitute communiqué providing module 252 (see FIG. 2c) of the computing device 10 of FIGS. 1a and 1b presenting, in lieu of presenting the first communiqué 52, at least a second communiqué 54 that is a substitute communiqué unrelated to the first communiqué 52 and provided by, for example, the substitute communiqué providing module 252. In other words, presenting a second communiqué 54 that is not merely a modified version of the first communiqué 52 but instead a distinct communiqué from the first communiqué 52.

As further illustrated in FIG. 5g, operation 573 may include one or more additional operations in various alternative implementations. For example, in some cases, operation 573 may further include an operation 574 for presenting, in lieu of presenting the first communiqué, at least a second communiqué that is a copy of a communiqué that was previously received by the receiving user as further depicted in FIG. 5g. For instance, the communiqué presenting module 104 including the previously received communiqué providing module 253 (see FIG. 2c) of the computing device 10 of FIGS. 1a and 1b presenting, in lieu of presenting the first communiqué 52, at least a second communiqué 54 that is a copy of a communiqué that is provided by, for example, the previously received communiqué providing module 253 and that was previously received by the receiving user 32. In some cases, the communiqué that was previously received by the receiving user 32 may be from a third party unrelated to the source entity 20.

In some implementations, operation 574 may further include an operation 575 for presenting, in lieu of presenting the first communiqué, at least a second communiqué that is a copy of a communiqué that was most recently received by the receiving user as depicted in FIG. 5g. For instance, the communiqué presenting module 104 including the previously received communiqué providing module 253 of the computing device 10 of FIGS. 1a and 1b presenting, in lieu of presenting the first communiqué 52, at least a second communiqué 54 that is provided by, for example, the previously received communiqué providing module 253 and that is a copy of a communiqué that was most recently received by the receiving user 32.

In the same or different implementations, operation 573 may include an operation 576 for presenting, in lieu of presenting the first communiqué, at least a second communiqué that was previously provided by the receiving user as further depicted in FIG. 5g. For instance, the communiqué presenting module 104 including the receiving user provided communiqué providing module 254 (see FIG. 2c) of the computing device 10 of FIGS. 1a and 1b presenting, in lieu of presenting the first communiqué 52, at least a second communiqué 54 that is provided by, for example, the receiving user provided communiqué providing module 254 and that was previously provided by the receiving user 32.

In the same or different implementations, operation 573 may include an operation 577 for presenting, in lieu of presenting the first communiqué, at least a second communiqué that is a direct substitute communiqué for the first communiqué as depicted in FIG. 5g. For instance, the communiqué presenting module 104 including the substitute communiqué providing module 252 of the computing device 10 presenting, in lieu of presenting the first communiqué 52, at least a second communiqué 54 that is a direct substitute communiqué (e.g., a substitute email) for the first communiqué 52 (e.g., an email) and that is provided by the substitute communiqué providing module 252.

In the same or different implementations, operation 573 may include an operation 578 for presenting, in lieu of presenting the first communiqué, at least a second communiqué that is an indirect substitute communiqué from the first communiqué as illustrated in FIG. 5g. For instance, the communiqué presenting module 104 including the substitute communiqué providing module 252 of the computing device 10 presenting, in lieu of presenting the first communiqué 52, at least a second communiqué 54 (e.g., text message) that is an indirect substitute communiqué from the first communiqué 52 (e.g., a voice or telephone message) and that is provided by the substitute communiqué providing module 252.

In the same or different implementations, operation 573 may include an operation 579 for presenting, in lieu of presenting the first communiqué, at least a second communiqué that is a direct substitute communiqué from the first communiqué as depicted in FIG. 5g. For instance, the communiqué presenting module 104 including the substitute communiqué providing module 252 of the computing device 10 presenting, in lieu of presenting the first communiqué 52, at least a second communiqué 54 (e.g., a substitute email) that is a direct substitute communiqué from the first communiqué 52 (e.g., an email) and that is provided by the substitute communiqué providing module 252.

In various implementations, the communiqué presenting operation 304 of FIG. 3 may include an operation 580 for presenting, in lieu of presenting the first communiqué, at least a second communiqué that includes at least one of textual or numerical content data as further depicted in FIG. 5g. For instance, the communiqué presenting module 104 of the computing device 10 of FIGS. 1a and 1b presenting, in lieu of presenting the first communiqué 52, at least a second communiqué 54 that includes at least one of textual or numerical content data. "Content data," as referred to herein, is in reference to data that embodies the message or message content (as opposed to, for example, header data or metadata).

In some cases, operation 580 may further include an operation 581 for presenting, in lieu of presenting the first communiqué, at least a second communiqué including presenting at least one of an email, an instant message (IM), or a text message as depicted in FIG. 5g. For instance, the communiqué presenting module 104 of the computing device 10 of FIGS. 1a and 1b presenting, in lieu of presenting the first communiqué 52, at least a second communiqué 54 including presenting at least one of an email, an instant message (IM), or a text message.

In some implementations, the communiqué presenting operation 304 of FIG. 3 may include an operation 582 for presenting, in lieu of presenting the first communiqué, at least a second communiqué that includes at least one of audio or image data as further depicted in FIG. 5g. For instance, the communiqué presenting module 104 of the computing device 10 of FIGS. 1a and 1b presenting, in lieu of presenting the first communiqué 52, at least a second communiqué 54 that includes at least one of audio or image data.

In some cases, operation 582 may further include an operation 583 for presenting, in lieu of presenting the first communiqué, at least a second communiqué including presenting at least one of a telephone call, a video call, a voice over Internet Protocol (VoIP) call, or a voice mail as further depicted in FIG. 5g. For instance, the communiqué presenting module 104 of the computing device 10 of FIGS. 1a and 1b presenting, in lieu of presenting the first communiqué 52, at least a second communiqué 54 including presenting at least one of a telephone call, a video call, a voice over Internet Protocol (VoIP) call, or a voice mail.

Figure 5H:
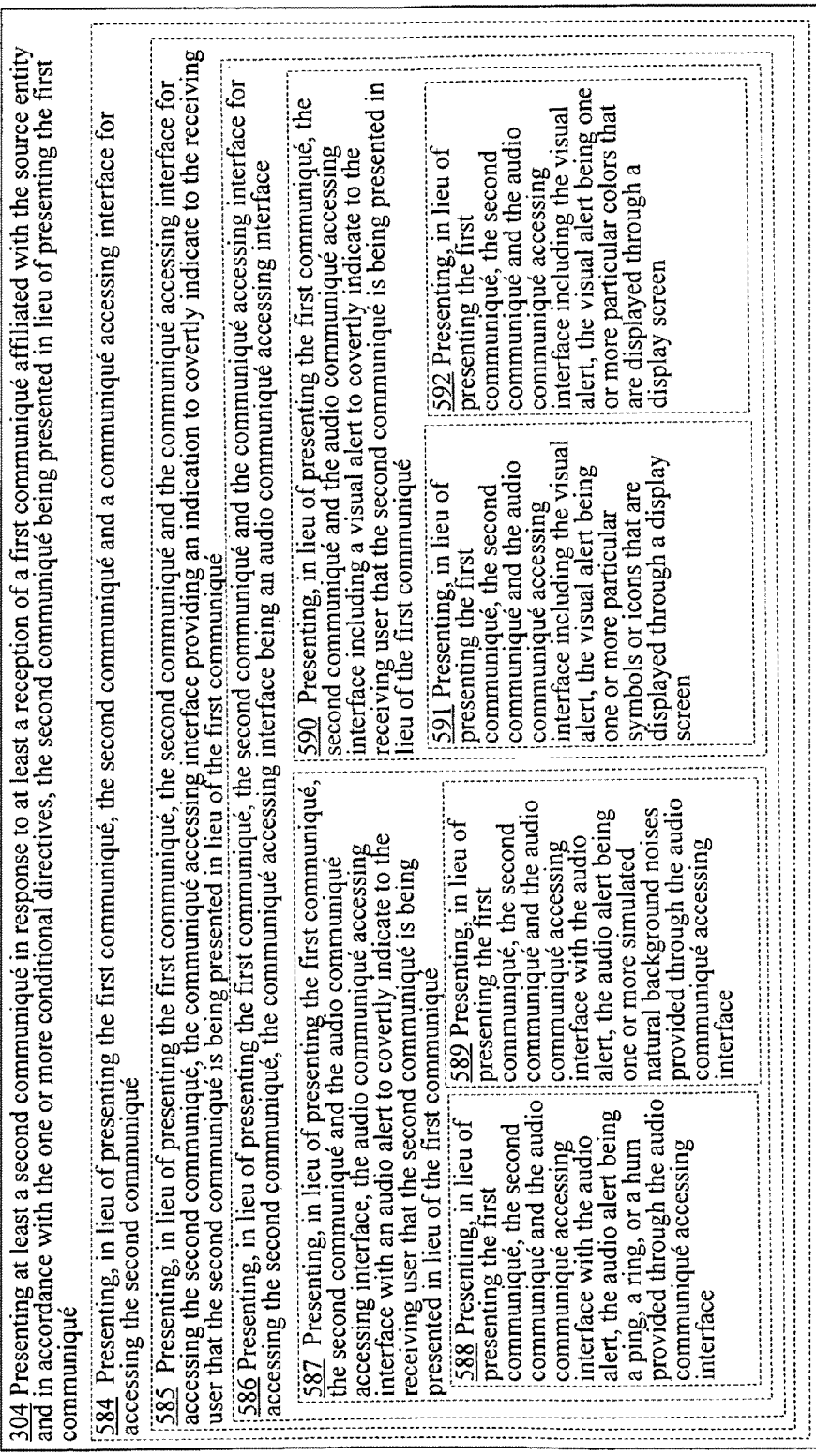
FIG. 5h is a high-level logic flowchart of a process depicting alternate implementations of the communiqué presenting operation 304 of FIG. 3.

In various implementations, the communiqué presenting operation 304 of FIG. 3 may involve the presentation of a communiqué accessing interface for accessing the second communiqué 54. For example, in some implementations, the communiqué presenting operation 304 of FIG. 3 may include an operation 584 for presenting, in lieu of presenting the first communiqué, the second communiqué and a communiqué accessing interface for accessing the second communiqué as depicted in FIG. 5h. For instance, the communiqué presenting module 104 including the communiqué accessing interface presenting module 255 (see FIG. 2c) of the computing device 10 of FIGS. 1a and 1b presenting, in lieu of presenting the first communiqué 52, the second communiqué 54 and a communiqué accessing interface (e.g., as presented by the communiqué accessing interface presenting module 255) for accessing the second communiqué 54. In various implementations, the communiqué accessing interface may be one of a variety communication application interface for accessing communiqués including, for example, email application interface, text message application interface, IM application interface, VoIP interface, and so forth.

In some cases, operation 584 may further include an operation 585 for presenting, in lieu of presenting the first communiqué, the second communiqué and the communiqué accessing interface for accessing the second communiqué, the communiqué accessing interface providing an indication to covertly indicate to the receiving user that the second communiqué is being presented in lieu of the first communiqué as depicted in FIG. 5h. For instance, the communiqué presenting module 104 including the communiqué accessing interface presenting module 255 of the computing device 10 of FIGS. 1a and 1b presenting, in lieu of presenting the first communiqué 52, the second communiqué 54 and the communiqué accessing interface (e.g., as presented by the communiqué accessing interface presenting module 255) for accessing the second communiqué 54, the communiqué accessing interface providing an indication (e.g., an audio and/or visual indication) to covertly or secretly indicate to the receiving user 32 that the second communiqué 54 is being presented in lieu of the first communiqué 52.

Operation 585 may, in turn, include an operation 586 for presenting, in lieu of presenting the first communiqué, the second communiqué and the communiqué accessing interface for accessing the second communiqué, the communiqué accessing interface being an audio communiqué accessing interface as depicted in FIG. 5h. For instance, the communiqué presenting module 104 including the audio communiqué accessing interface presenting module 256 (see FIG. 2c) of the computing device 10 of FIGS. 1a and 1b presenting, in lieu of presenting the first communiqué 52, the second communiqué 54 and the communiqué accessing interface for accessing the second communiqué 54, the communiqué accessing interface being an audio communiqué accessing interface (e.g., an audio interface for a VoIP application) as presented by the audio communiqué accessing interface presenting module 256. In some instances, such an audio communiqué accessing interface may be presented to the receiving user 32 through an audio user interface 110 such as a speaker/microphone system.

As further depicted in FIG. 5h, operation 586 may include one or more additional operations in various alternative implementations. For example, in some cases, operation 586 may include an operation 587 for presenting, in lieu of presenting the first communiqué, the second communiqué and the audio communiqué accessing interface, the audio communiqué accessing interface with an audio alert to covertly indicate to the receiving user that the second communiqué is being presented in lieu of the first communiqué as depicted in FIG. 5h. For instance, the communiqué presenting module 104 of the computing device 10 of FIGS. 1a and 1b presenting, in lieu of presenting the first communiqué 52, the second communiqué 54 and the audio communiqué accessing interface (e.g., as presented by the audio communiqué accessing interface presenting module 256), the audio communiqué accessing interface with an audio alert (e.g., as provided by the audio alert providing module 257 of FIG. 2c) to covertly indicate to the receiving user 32 that the second communiqué 54 is being presented in lieu of the first communiqué 52. In some cases, this may be done when the meaning of the audio alert is known only by the receiving user 32.

In some implementations, operation 587 may further include an operation 588 for presenting, in lieu of presenting the first communiqué, the second communiqué and the audio communiqué accessing interface with the audio alert, the audio alert being a ping, a ring, or a hum provided through the audio communiqué accessing interface as depicted in FIG. 5h. For instance, the communiqué presenting module 104 of the computing device 10 of FIGS. 1a and 1b presenting, in lieu of presenting the first communiqué 52, the second communiqué 54 and the audio communiqué accessing interface (e.g., as presented by the audio communiqué accessing interface presenting module 256) with the audio alert (e.g., as provided by the audio alert providing module 257 of FIG. 2c), the audio alert being a ping, a ring, or a hum provided through the audio communiqué accessing interface.

In the same or different implementations, operation 587 may include an operation 589 for presenting, in lieu of presenting the first communiqué, the second communiqué and the audio communiqué accessing interface with the audio alert, the audio alert being one or more simulated natural background noises provided through the audio communiqué accessing interface as depicted in FIG. 5h. For instance, the communiqué presenting module 104 of the computing device 10 of FIGS. 1a and 1b presenting, in lieu of presenting the first communiqué 52, the second communiqué 54 and the audio communiqué accessing interface (e.g., as presented by the audio communiqué accessing interface presenting module 256) with the audio alert (e.g., as provided by the audio alert providing module 257 of FIG. 2c), the audio alert being one or more simulated natural background noises (e.g., noise of train passing, a child's cry, a dog's bark, and so forth) provided through the audio communiqué accessing interface.

In the same or different implementations, the operation 586 for presenting the second communiqué 54 and the audio communiqué accessing interface may include an operation 590 for presenting, in lieu of presenting the first communiqué, the second communiqué and the audio communiqué accessing interface including a visual alert to covertly indicate to the receiving user that the second communiqué is being presented in lieu of the first communiqué as further depicted in FIG. 5h. For instance, the communiqué presenting module 104 of the computing device 10 of FIGS. 1a and 1b presenting, in lieu of presenting the first communiqué 52, the second communiqué 54 and the audio communiqué accessing interface (e.g., as presented by the audio communiqué accessing interface presenting module 256) including a visual alert (e.g., as provided by the visual alert providing module 258 of FIG. 2c) to covertly indicate to the receiving user 32 that the second communiqué 54 is being presented in lieu of the first communiqué 52.

In some implementations, operation 590 may further include an operation 591 for presenting, in lieu of presenting the first communiqué, the second communiqué and the audio communiqué accessing interface including the visual alert, the visual alert being one or more particular symbols or icons that are displayed through a display screen as further depicted in FIG. 5h. For instance, the communiqué presenting module 104 of the computing device 10 of FIGS. 1a and 1b presenting, in lieu of presenting the first communiqué 52, the second communiqué 54 and the audio communiqué accessing interface (e.g., as presented by the audio communiqué accessing interface presenting module 256) including the visual alert (e.g., as provided by the visual alert providing module 258 of FIG. 2c), the visual alert being one or more particular symbols or icons that are displayed through a display screen (e.g., display user interface 112).

In the same or different implementations, operation 590 may include an operation 592 for presenting, in lieu of presenting the first communiqué, the second communiqué and the audio communiqué accessing interface including the visual alert, the visual alert being one or more particular colors that are displayed through a display screen as further depicted in FIG. 5h. For instance, the communiqué presenting module 104 of the computing device 10 of FIGS. 1a and 1b presenting, in lieu of presenting the first communiqué 52, the second communiqué 54 and the audio communiqué accessing interface (e.g., as presented by the audio communiqué accessing interface presenting module 256) including the visual alert (e.g., as provided by the visual alert providing module 258 of FIG. 2*c*), the visual alert being one or more particular colors that are displayed through a display screen (e.g., display user interface 112).

In some alternative implementations, rather than presenting a visual alert or an audio alert, the operation 585 for presenting an audio communiqué accessing interface (e.g., as presented by the audio communiqué accessing interface presenting module 256) may also involve the presentation of other forms of alerts. For example, since many communication/computing devices such as cellular phones and Smart phones include the capacity to vibrate when a telephone call is received, in some implementations, the operation 585 for presenting the audio communiqué accessing interface may also include an operation for presenting a vibrating alert (e.g., as provided by the vibrating alert providing module 259) to covertly indicate to the receiving user 32 that the second communiqué 54 is being presented in lieu of the first communiqué 52.

Figure 5I:
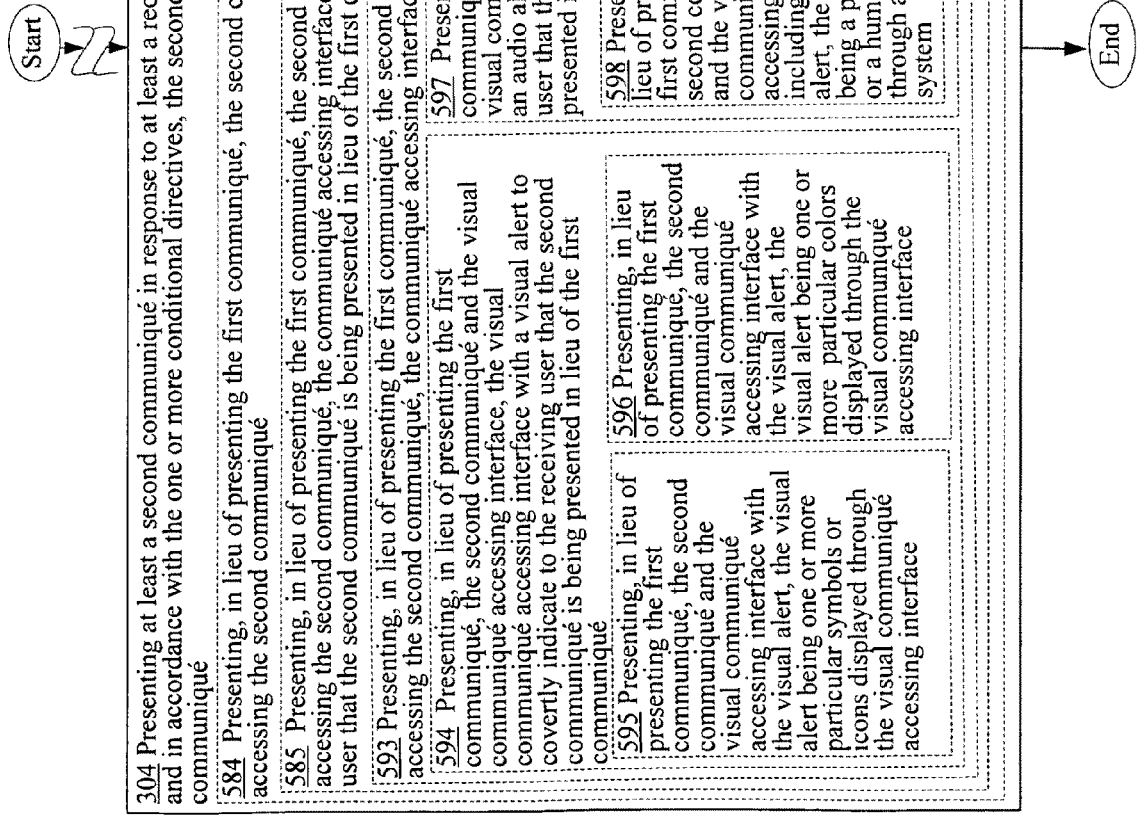
FIG. 5i is a high-level logic flowchart of a process depicting alternate implementations of the communiqué presenting operation 304 of FIG. 3.

In various implementations, the operation 585 for presenting, in lieu of presenting the first communiqué, the second communiqué and the communiqué accessing interface for accessing the second communiqué, the communiqué accessing interface providing an indication to covertly indicate to the receiving user that the second communiqué is being presented in lieu of the first communiqué may include an operation 593 for presenting, in lieu of presenting the first communiqué, the second communiqué and the communiqué accessing interface for accessing the second communiqué, the communiqué accessing interface being a visual communiqué accessing interface as depicted in FIG. 5*i*. For instance, the communiqué presenting module 104 including the visual communiqué accessing interface presenting module 260 (see FIG. 2*c*) of the computing device 10 of FIGS. 1*a* and 1*b* presenting, in lieu of presenting the first communiqué 52, the second communiqué 54 and the communiqué accessing interface for accessing the second communiqué 54, the communiqué accessing interface being a visual communiqué accessing interface as presented by the visual communiqué accessing interface presenting module 260. In various implementations, the visual communiqué accessing interface may be a communication application interface such as an interface for an email application, a text message application, an IM application, and so forth.

As further illustrated in FIG. 5*i*, operation 593 may include one or more additional operations in various alternative implementations. For example, in some implementations, operation 593 may include an operation 594 for presenting, in lieu of presenting the first communiqué, the second communiqué and the visual communiqué accessing interface, the visual communiqué accessing interface with a visual alert to covertly indicate to the receiving user that the second communiqué is being presented in lieu of the first communiqué as further depicted in FIG. 5*i*. For instance, the communiqué presenting module 104 of the computing device 10 of FIGS. 1*a* and 1*b* presenting, in lieu of presenting the first communiqué 52, the second communiqué 54 and the visual communiqué accessing interface (e.g., as presented by the visual communiqué accessing interface presenting module 260), the visual communiqué accessing interface with a visual alert (e.g., as provided by the visual alert providing module 261 of FIG. 2*c*) to covertly indicate to the receiving user 32 that the second communiqué 54 is being presented in lieu of the first communiqué 52. In some cases, this may be done when the meaning of the visual alert is known only by the receiving user 32.

In some cases, operation 594 may further include an operation 595 for presenting, in lieu of presenting the first communiqué, the second communiqué and the visual communiqué accessing interface with the visual alert, the visual alert being one or more particular symbols or icons displayed through the visual communiqué accessing interface as further depicted in FIG. 5*i*. For instance, the communiqué presenting module 104 of the computing device 10 of FIGS. 1*a* and 1*b* presenting, in lieu of presenting the first communiqué 52, the second communiqué 54 and the visual communiqué accessing interface (e.g., as presented by the visual communiqué accessing interface presenting module 260) with the visual alert (e.g., as provided by the visual alert providing module 261 of FIG. 2*c*), the visual alert being one or more particular symbols or icons displayed through the visual communiqué accessing interface.

In the same or different implementations, operation 594 may include an operation 596 for presenting, in lieu of presenting the first communiqué, the second communiqué and the visual communiqué accessing interface with the visual alert, the visual alert being one or more particular colors displayed through the visual communiqué accessing interface as further depicted in FIG. 5*i*. For instance, the communiqué presenting module 104 of the computing device 10 of FIGS. 1*a* and 1*b* presenting, in lieu of presenting the first communiqué 52, the second communiqué 54 and the visual communiqué accessing interface (e.g., as presented by the visual communiqué accessing interface presenting module 260) with the visual alert (e.g., as provided by the visual alert providing module 261 of FIG. 2*c*), the visual alert being one or more particular colors displayed through the visual communiqué accessing interface.

In the same or different implementations, the operation 593 for presenting the second communiqué and the visual communiqué accessing interface may include an operation 597 for presenting, in lieu of presenting the first communiqué, the second communiqué and the visual communiqué accessing interface including an audio alert to covertly indicate to the receiving user that the second communiqué is being presented in lieu of the first communiqué as depicted in FIG. 5*i*. For instance, the communiqué presenting module 104 of the computing device 10 of FIGS. 1*a* and 1*b* presenting, in lieu of presenting the first communiqué 52, the second communiqué 54 and the visual communiqué accessing interface (e.g., as presented by the visual communiqué accessing interface presenting module 260) including an audio alert (e.g., as provided by the audio alert providing module 262 of FIG. 2*c*) to covertly indicate to the receiving user 32 that the second communiqué 54 is being presented in lieu of the first communiqué 52.

In some implementations, operation 597 may include an operation 598 for presenting, in lieu of presenting the first communiqué, the second communiqué and the visual communiqué accessing interface including the audio alert, the audio alert being a ping, a ring, or a hum provided through a speaker system as further depicted in FIG. 5*i*. For instance, the communiqué presenting module 104 of the computing device 10 of FIGS: 1*a* and 1*b* presenting, in lieu of presenting the first communiqué 52, the second communiqué 54 and the visual communiqué accessing interface (e.g., as presented by the visual communiqué accessing interface presenting module 260) including the audio alert (e.g., as provided by the audio alert providing module 262 of FIG. 2*c*), the audio alert being a ping, a ring, or a hum provided through a speaker system (e.g., audio user interface 110).

In some implementations, operation 597 may include an operation 599 for presenting, in lieu of presenting the first communiqué, the second communiqué and the visual communiqué accessing interface including the audio alert, the audio alert being one or more simulated natural background noises provided through a speaker system as further depicted in FIG. 5i. For instance, the communiqué presenting module 104 of the computing device 10 of FIGS. 1a and 1b presenting, in lieu of presenting the first communiqué 52, the second communiqué 54 and the visual communiqué accessing interface (e.g., as presented by the visual communiqué accessing interface presenting module 260) including the audio alert (e.g., as provided by the audio alert providing module 262 of FIG. 2c), the audio alert being one or more simulated natural background noises provided through a speaker system (e.g., audio user interface 110).

In some implementations, the operation 593 for presenting the second communiqué and the visual communiqué accessing interface may further include an operation 600 for presenting, in lieu of presenting the first communiqué, the second communiqué and the visual communiqué accessing interface including a vibrating alert to covertly indicate to the receiving user that the second communiqué is being presented in lieu of the first communiqué as further depicted in FIG. 5i. For instance, the communiqué presenting module 104 of the computing device 10 of FIGS. 1a and 1b presenting, in lieu of presenting the first communiqué 52, the second communiqué 54 and the visual communiqué accessing interface (e.g., as presented by the visual communiqué accessing interface presenting module 260) including a vibrating alert (e.g., as provided by the vibrating alert providing module 263) to covertly indicate to the receiving user 32 that the second communiqué 54 is being presented in lieu of the first communiqué 52.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A computationally-implemented system, comprising:
    (a) circuitry for receiving one or more conditional directives from a receiving user, the one or more conditional directives delineating one or more conditions for obfuscating identity of a source entity affiliated with one or more communiqués directed to the receiving user, the circuitry for receiving including at least:
        (1) circuitry for prompting the receiving user to input the one or more conditional directives by presenting a conditional directive input interface to the receiving user to permit the receiving user to input the one or more conditional directives; and
        (2) circuitry for receiving at least one conditional directive, of the one or more conditional directives, from the receiving user to conditionally obfuscate the identity of the source entity in absence of a biometric verification of the receiving user being in possession of a receiving user device; and
    (b) circuitry for presenting at least a second communiqué in response to at least a reception of a first communiqué affiliated with the source entity and in accordance with the one or more conditional directives, the second communiqué being presented in lieu of presenting the first communiqué, including at least:
        (1) circuitry for presenting, in lieu of presenting the first communiqué, at least the second communiqué that is a substitute communiqué unrelated to the first communiqué and a communiqué accessing interface for accessing the second communiqué, the second communiqué including at least one of an email, an instant message ("IM"), a short message service ("SMS") message, a multimedia messaging service ("MMS") message, a telephone call, a video call, a VoIP call, or a voice mail and that is from a communication device that is affiliated with a third party that is other than the receiving user, the communiqué accessing interface configured to provide an alert to covertly indicate to the receiving user that the second communiqué is being presented in lieu of the first communiqué, wherein the communiqué accessing interface is configured to provide an alert that covertly indicates to the receiving user that the second communiqué is being presented in lieu of the first communiqué at least in part by not specifically indicating to the receiving user that the second communiqué is being presented in lieu of the first communiqué.

2. The computationally-implemented system of claim 1, wherein said circuitry for receiving one or more conditional directives from a receiving user, the one or more conditional directives delineating one or more conditions for obfuscating identity of a source entity affiliated with one or more communiqués directed to the receiving user comprises:
circuitry for receiving the one or more conditional directives from the receiving user including at least one directive to conditionally obfuscate identity of the source entity when a communiqué is received that is determined to include at least one representation associated with the source entity.

3. The computationally-implemented system of claim 2, wherein said circuitry for receiving the one or more conditional directives from the receiving user including at least one directive to conditionally obfuscate identity of the source entity when a communiqué is received that is determined to include at least one representation associated with the source entity comprises:
circuitry for receiving at least one directive from the receiving user that indicates at least one image associated with the source entity and that directs conditionally obfuscating identity of the source entity when a communiqué is received that is determined to include the at least one image.

4. The computationally-implemented system of claim 2, wherein said circuitry for receiving the one or more conditional directives from the receiving user including at least one directive to conditionally obfuscate identity of the source entity when a communiqué is received that is determined to include at least one representation associated with the source entity comprises:
circuitry for receiving at least one directive from the receiving user that indicates at least a voice signature associated with the source entity and that directs conditionally obfuscating identity of the source entity when a communiqué is received that is determined to include at least the voice signature.

5. The computationally-implemented system of claim 1, wherein said circuitry for receiving one or more conditional directives from a receiving user, the one or more conditional directives delineating one or more conditions for obfuscating identity of a source entity affiliated with one or more communiqués directed to the receiving user comprises:
circuitry for receiving the one or more conditional directives from the receiving user including at least one directive to conditionally obfuscate the identity of the source entity as a function of location of the receiving user device configured to execute the one or more conditional directives.

6. The computationally-implemented system of claim 5, wherein circuitry for receiving the one or more conditional directives from the receiving user including at least one directive to conditionally obfuscate the identity of the source entity as a function of location of the receiving user device configured to execute the one or more conditional directives comprises:
circuitry for receiving at least one directive from the receiving user to conditionally obfuscate the identity of the source entity in response to determining that the receiving user device is at one or more specified locations.

7. The computationally-implemented system of claim 1, wherein said circuitry for receiving one or more conditional directives from a receiving user, the one or more conditional directives delineating one or more conditions for obfuscating identity of a source entity affiliated with one or more communiqués directed to the receiving user comprises:
circuitry for receiving the one or more conditional directives from the receiving user including at least one directive to conditionally obfuscate the identity of the source entity as a function of time with respect to the receiving user device configured to execute the one or more conditional directives.

8. The computationally-implemented system of claim 1, wherein said circuitry for presenting at least a second communiqué in response to at least a reception of a first communiqué affiliated with the source entity and in accordance with the one or more conditional directives, the second communiqué being presented in lieu of presenting the first communiqué comprises:
circuitry for presenting at least the second communiqué in response to intercepting the first communiqué in accordance with the one or more conditional directives, the intercepting of the first communiqué to prevent the first communiqué from being presented.

9. The computationally-implemented system of claim 1, wherein said circuitry for presenting at least a second communiqué in response to at least a reception of a first communiqué affiliated with the source entity and in accordance with the one or more conditional directives, the second communiqué being presented in lieu of presenting the first communiqué comprises:
circuitry for presenting at least the second communiqué in accordance with the one or more conditional directives including in response to determining that the first communiqué includes one or more representations associated with the source entity.

10. The computationally-implemented system of claim 9, wherein said circuitry for presenting at least the second communiqué in accordance with the one or more conditional directives including in response to determining that the first communiqué includes one or more representations associated with the source entity comprises:
circuitry for presenting at least the second communiqué in accordance with the one or more conditional directives including in response to determining that the first communiqué includes at least an image associated with the source entity.

11. The computationally-implemented system of claim 9, wherein said circuitry for presenting at least the second communiqué in accordance with the one or more conditional directives including in response to determining that the first communiqué includes one or more representations associated with the source entity comprises:
circuitry for presenting at least the second communiqué in accordance with the one or more conditional directives including in response to determining that the first communiqué includes at least a voice signature associated with the source entity.

12. The computationally-implemented system of claim 1, wherein said circuitry for presenting at least a second communiqué in response to at least a reception of a first communiqué affiliated with the source entity and in accordance with the one or more conditional directives, the second communiqué being presented in lieu of presenting the first communiqué comprises:
circuitry for presenting at least the second communiqué in accordance with the one or more conditional directives including as a function of location of the receiving user device configured to implement the one or more conditional directives.

13. The computationally-implemented system of claim 12, wherein said circuitry for presenting at least the second communiqué in accordance with the one or more conditional directives including as a function of location of the receiving user device configured to implement the one or more conditional directives comprises:
circuitry for presenting at least the second communiqué in accordance with the one or more conditional directives including in response to determining that the receiving user device is at one or more specified locations.

14. The computationally-implemented system of claim 1, wherein said circuitry for presenting at least a second communiqué in response to at least a reception of a first communiqué affiliated with the source entity and in accordance with the one or more conditional directives, the second communiqué being presented in lieu of presenting the first communiqué comprises:
circuitry for presenting at least the second communiqué in accordance with the one or more conditional directives including as a function of time with respect to the receiving user device configured to implement the one or more conditional directives.

15. The computationally-implemented system of claim 14, wherein said circuitry for presenting at least the second communiqué in accordance with the one or more conditional directives including as a function of time with respect to the receiving user device configured to implement the one or more conditional directives comprises:
circuitry for presenting at least the second communiqué in accordance with the one or more conditional directives including in response to determining that the receiving user device is at one or more specified times of a day.

16. The computationally-implemented system of claim 14, wherein said circuitry for presenting at least the second communiqué in accordance with the one or more conditional directives including as a function of time with respect to the receiving user device configured to implement the one or more conditional directives comprises:
circuitry for presenting at least the second communiqué in accordance with the one or more conditional directives including in response to determining that the receiving user device is at one or more specified times of a calendar year.

17. The computationally-implemented system of claim 1, wherein said circuitry for presenting at least a second communiqué in response to at least a reception of a first communiqué affiliated with the source entity and in accordance with the one or more conditional directives, the second communiqué being presented in lieu of presenting the first communiqué comprises:
circuitry for presenting at least the second communiqué in accordance with the one or more conditional directives including in response to determining occurrence of the one or more specified environmental conditions associated with the receiving user device configured to implement the one or more conditional directives.

18. The computationally-implemented system of claim 17, wherein said circuitry for presenting at least the second communiqué in accordance with the one or more conditional directives including in response to determining occurrence of the one or more specified environmental conditions associated with the receiving user device configured to implement the one or more conditional directives comprises:
circuitry for presenting at least the second communiqué in accordance with the one or more conditional directives including in response to determining that one or more particular third parties are in proximate vicinity of the receiving user device.

19. The computationally-implemented system of claim 1, wherein said circuitry for presenting, in lieu of presenting the first communiqué, at least the second communiqué that is a substitute communiqué unrelated to the first communiqué and a communiqué accessing interface for accessing the second communiqué comprises:
circuitry for presenting, in lieu of presenting the first communiqué, at least a second communiqué that is a copy of a communiqué that was previously received by the receiving user.

20. The computationally-implemented system of claim 19, wherein said circuitry for presenting, in lieu of presenting the first communiqué, at least a second communiqué that is a copy of a communiqué that was previously received by the receiving user comprises:
circuitry for presenting, in lieu of presenting the first communiqué, at least a second communiqué that is a copy of a communiqué that was most recently received by the receiving user.

21. The computationally-implemented system of claim 1, wherein said circuitry for presenting at least a second communiqué in response to at least a reception of a first communiqué affiliated with the source entity and in accordance with the one or more conditional directives, the second communiqué being presented in lieu of presenting the first communiqué comprises:
circuitry for presenting, in lieu of presenting the first communiqué, at least a second communiqué that includes at least one of textual or numerical content data.

22. The computationally-implemented system of claim 1, wherein said circuitry for presenting at least a second communiqué in response to at least a reception of a first communiqué affiliated with the source entity and in accordance with the one or more conditional directives, the second communiqué being presented in lieu of presenting the first communiqué comprises:
circuitry for presenting, in lieu of presenting the first communiqué, at least a second communiqué that includes at least one of audio or image data.

23. The computationally-implemented system of claim 1, wherein said circuitry for presenting, in lieu of presenting the first communiqué, at least the second communiqué that is a substitute communiqué unrelated to the first communiqué and a communiquéaccessing interface for accessing the second communiqué, the second communiqué including at least one of an email, an instant message ("IM"), a short message service ("SMS") message, a multimedia messaging service ("MMS") message, a telephone call, a video call, a VoIP call, or a voice mail and that is from a communication device that is affiliated with a third party that is other than the receiving user, the communiqué accessing interface configured to provide an alert to covertly indicate to the receiving user that the second communiqué is being presented in lieu of the first communiqué, wherein the communiquéaccessing interface is configured to provide an alert that covertly indicates to the receiving user that the second communiqué is being presented in lieu of the first communiqué at least in part by not specifically indicating to the receiving user that the second communiqué is being presented in lieu of the first communiqué comprises:

circuitry for presenting, in lieu of presenting the first communiqué, the second communiqué and the communiqué accessing interface for accessing the second communiqué, the communiqué accessing interface being an audio communiqué accessing interface.

24. The computationally-implemented system of claim 23, wherein said circuitry for presenting, in lieu of presenting the first communiqué, the second communiqué and the communiqué accessing interface for accessing the second communiqué, the communiqué accessing interface being an audio communiqué accessing interface comprises:

circuitry for presenting, in lieu of presenting the first communiqué, the second communiqué and the audio communiqué accessing interface, the audio communiqué accessing interface with an audible audio alert to covertly and audibly indicate to the receiving user that the second communiqué is being presented in lieu of the first communiqué.

25. The computationally-implemented system of claim 24, wherein said circuitry for presenting, in lieu of presenting the first communiqué, the second communiqué and the audio communiqué accessing interface, the audio communiqué accessing interface with an audible audio alert to covertly and audibly indicate to the receiving user that the second communiqué is being presented in lieu of the first communiqué comprises:

circuitry for presenting, in lieu of presenting the first communiqué, the second communiqué and the audio communiqué accessing interface with the audio alert, the audio alert being a ping, a ring, or a hum provided through the audio communiqué accessing interface.

26. The computationally-implemented system of claim 24, wherein said circuitry for presenting, in lieu of presenting the first communiqué, the second communiqué and the audio communiqué accessing interface, the audio communiqué accessing interface with an audible audio alert to covertly and audibly indicate to the receiving user that the second communiqué is being presented in lieu of the first communiqué comprises:

circuitry for presenting, in lieu of presenting the first communiqué, the second communiqué and the audio communiqué accessing interface with the audio alert, the audio alert being one or more simulated natural background noises provided through the audio communiqué accessing interface.

27. The computationally-implemented system of claim 23, wherein said circuitry for presenting, in lieu of presenting the first communiqué, the second communiqué and the communiqué accessing interface for accessing the second communiqué, the communiqué accessing interface being an audio communiqué accessing interface comprises:

circuitry for presenting, in lieu of presenting the first communiqué, the second communiqué and the audio communiqué accessing interface including a visual alert to covertly indicate to the receiving user that the second communiqué is being presented in lieu of the first communiqué.

28. The computationally-implemented system of claim 27, wherein said circuitry for presenting, in lieu of presenting the first communiqué, the second communiqué and the audio communiqué accessing interface including a visual alert to covertly indicate to the receiving user that the second communiqué is being presented in lieu of the first communiqué comprises:

circuitry for presenting, in lieu of presenting the first communiqué, the second communiqué and the audio communiqué accessing interface including the visual alert, the visual alert being one or more particular symbols or icons that are displayed through a display screen.

29. The computationally-implemented system of claim 27, wherein said circuitry for presenting, in lieu of presenting the first communiqué, the second communiqué and the audio communiqué accessing interface including a visual alert to covertly indicate to the receiving user that the second communiqué is being presented in lieu of the first communiqué comprises:

circuitry for presenting, in lieu of presenting the first communiqué, the second communiqué and the audio communiqué accessing interface including the visual alert, the visual alert being one or more particular colors that are displayed through a display screen.

30. A method, comprising:

(a) receiving one or more conditional directives from a receiving user, the one or more conditional directives delineating one or more conditions for obfuscating identity of a source entity affiliated with one or more communiqués directed to the receiving user, the receiving including at least:

(1) prompting the receiving user to input the one or more conditional directives by presenting a conditional directive input interface to the receiving user to permit the receiving user to input the one or more conditional directives; and (2) receiving at least one conditional directive, of the one or more conditional directives, from the receiving user to conditionally obfuscate the identity of the source entity in absence of a biometric verification of the receiving user being in possession of a receiving user device; and (b) presenting, using one or more processors, at least a second communiqué in response to at least a reception of a first communiqué affiliated with the source entity and in accordance with the one or more conditional directives, the second communiqué being presented in lieu of presenting the first communiqué, including at least:

(1) presenting, in lieu of presenting the first communiqué, at least a second communiqué that is a substitute communiqué unrelated to the first communiqué and a communiqué accessing interface for accessing the second communiqué, the second communiqué including at least one of an email, an instant message ("IM"), a short message service ("SMS") message, a multimedia messaging service ("MMS") message, a telephone call, a video call, a VoIP call, or a voice mail and that is from a communication device that is affiliated with a third party that is other than the receiving user, the communiqué accessing interface configured to provide an alert to covertly indicate to the receiving user that the second communiqué is being presented in lieu of the first communiqué, wherein the communiqué accessing interface is configured to provide an alert that covertly indicates to the receiving user that the second communiqué is being presented in lieu of the first communiqué at least in part by not specifically indicating to the receiving user that the second communiqué is being presented in lieu of the first communiqué.

31. A system, comprising:
a computing device; and
a non-transitory medium bearing at least one or more executable instructions that when executed on the computing device cause the computing device to perform one or more operations that include at least:
(a) receive one or more conditional directives from a receiving user, the one or more conditional directives delineating one or more conditions for obfuscating identity of a source entity affiliated with one or more communiqués directed to the receiving user, including at least:
  (1) prompt the receiving user to input the one or more conditional directives by presenting a conditional directive input interface to the receiving user to permit the receiving user to input the one or more conditional directives; and
  (2) receive at least one conditional directive, of the one or more conditional directives, from the receiving user to conditionally obfuscate the identity of the source entity in absence of a biometric verification of the receiving user being in possession of a receiving user device; and
(b) present at least a second communiqué in response to at least a reception of a first communiqué affiliated with the source entity and in accordance with the one or more conditional directives, the second communiqué being presented in lieu of presenting the first communiqué, including at least:
  (1) present, in lieu of presenting the first communiqué, at least a second communiqué that is a substitute communiqué unrelated to the first communiqué and a communiqué accessing interface for accessing the second communiqué, wherein the second communiqué includes at least one of an email, an instant message ("IM"), a short message service ("SMS") message, a multimedia messaging service ("MMS") message, a telephone call, a video call, a VoIP call, or a voice mail and that is from a communication device that is affiliated with a third party that is other than the receiving user, and wherein the communiqué accessing interface is configured to provide an alert to covertly indicate to the receiving user that the second communiqué is being presented in lieu of the first communiqué, wherein the communiqué accessing interface is further configured to provide an alert that covertly indicates to the receiving user that the second communiqué is being presented in lieu of the first communiqué at least in part by not specifically indicating to the receiving user that the second communiqué is being presented in lieu of the first communiqué.

* * * * *